(12) United States Patent
Ou et al.

(10) Patent No.: US 10,401,609 B2
(45) Date of Patent: Sep. 3, 2019

(54) EMBEDDED PUPIL FUNCTION RECOVERY FOR FOURIER PTYCHOGRAPHIC IMAGING DEVICES

(71) Applicant: California Institute of Technology, Pasadena, CA (US)

(72) Inventors: Xiaoze Ou, Pasadena, CA (US); Jaebum Chung, Pasadena, CA (US); Roarke Horstmeyer, Palo Alto, CA (US); Guoan Zheng, Vernon, CT (US); Changhuei Yang, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/820,295

(22) Filed: Nov. 21, 2017

(65) Prior Publication Data

US 2018/0088309 A1  Mar. 29, 2018

Related U.S. Application Data

(63) Continuation of application No. 14/572,493, filed on Dec. 16, 2014, now Pat. No. 9,864,184, which is a continuation-in-part of application No. 14/065,280, filed on Oct. 28, 2013, and a continuation-in-part of application No. 14/466,481, filed on Aug. 22, 2014, now Pat. No. 9,497,379.

(Continued)

(51) Int. Cl.
| | | |
|---|---|---|
| *G01B 9/02* | (2006.01) | |
| *G02B 21/36* | (2006.01) | |
| *G02B 21/00* | (2006.01) | |
| *G02B 27/58* | (2006.01) | |
| *G06K 9/00* | (2006.01) | |
| *G21K 7/00* | (2006.01) | |

(52) U.S. Cl.
CPC ......... *G02B 21/367* (2013.01); *G02B 21/002* (2013.01); *G02B 21/365* (2013.01); *G02B 27/58* (2013.01); *G06K 9/00134* (2013.01); *G21K 7/00* (2013.01)

(58) Field of Classification Search
CPC ............ G01B 9/02043; G01B 9/02085; G01B 2290/50
USPC ........................................ 356/511, 512, 515
See application file for complete search history.

(56) References Cited

U.S. PATENT DOCUMENTS

| | | |
|---|---|---|
| 5,475,527 A | 12/1995 | Hackel et al. |
| 6,144,365 A | 11/2000 | Young et al. |

(Continued)

FOREIGN PATENT DOCUMENTS

| | | |
|---|---|---|
| CN | 1688254 A | 10/2005 |
| CN | 1932565 A | 3/2007 |

(Continued)

OTHER PUBLICATIONS

Preliminary Amendment dated Mar. 17, 2014 filed in U.S. Appl. No. 14/065,280.

(Continued)

*Primary Examiner* — Jonathan M Hansen
(74) *Attorney, Agent, or Firm* — Sheila Martinez-Lemke; Weaver Austin Villeneuve & Sampson LLP

(57) ABSTRACT

Certain aspects pertain to Fourier ptychographic imaging systems, devices, and methods that implement an embedded pupil function recovery.

36 Claims, 37 Drawing Sheets

Related U.S. Application Data

(60) Provisional application No. 61/720,258, filed on Oct. 30, 2012, provisional application No. 61/847,472, filed on Jul. 17, 2013, provisional application No. 61/968,833, filed on Mar. 21, 2014, provisional application No. 61/944,380, filed on Feb. 25, 2014, provisional application No. 61/916,981, filed on Dec. 17, 2013, provisional application No. 61/899,715, filed on Nov. 4, 2013, provisional application No. 61/868,967, filed on Aug. 22, 2013, provisional application No. 62/000,722, filed on May 20, 2014.

(56) References Cited

U.S. PATENT DOCUMENTS

| | | |
|---|---|---|
| 6,154,196 A | 11/2000 | Fleck et al. |
| 6,320,174 B1 | 11/2001 | Tafas et al. |
| 6,320,648 B1 | 11/2001 | Brueck et al. |
| 6,747,781 B2 | 6/2004 | Trisnadi |
| 6,905,838 B1 | 6/2005 | Bittner |
| 7,436,503 B1 | 10/2008 | Chen et al. |
| 7,460,248 B2 | 12/2008 | Kurtz et al. |
| 7,706,419 B2 | 4/2010 | Wang et al. |
| 7,787,588 B1 | 8/2010 | Yun et al. |
| 8,271,251 B2 | 9/2012 | Schwartz et al. |
| 8,313,031 B2 | 11/2012 | Vinogradov |
| 8,497,934 B2 | 7/2013 | Milnes et al. |
| 8,624,968 B1 | 1/2014 | Hersee et al. |
| 8,942,449 B2 | 1/2015 | Maiden |
| 9,029,745 B2 | 5/2015 | Maiden |
| 9,426,455 B2 | 8/2016 | Horstmeyer et al. |
| 9,497,379 B2 | 11/2016 | Ou et al. |
| 9,829,695 B2 | 11/2017 | Kim et al. |
| 9,864,184 B2 | 1/2018 | Ou et al. |
| 9,892,812 B2 | 2/2018 | Zheng et al. |
| 9,983,397 B2 | 5/2018 | Horstmeyer et al. |
| 9,993,149 B2 | 6/2018 | Chung et al. |
| 9,998,658 B2 | 6/2018 | Ou et al. |
| 10,162,161 B2 | 12/2018 | Horstmeyer et al. |
| 10,168,525 B2 | 1/2019 | Kim et al. |
| 10,222,605 B2 | 3/2019 | Kim et al. |
| 10,228,550 B2 | 3/2019 | Ou et al. |
| 2001/0055062 A1 | 12/2001 | Shioda et al. |
| 2002/0141051 A1 | 10/2002 | Vogt et al. |
| 2003/0116436 A1 | 6/2003 | Amirkhanian et al. |
| 2003/0118223 A1 | 6/2003 | Rahn et al. |
| 2004/0057094 A1 | 3/2004 | Olszak et al. |
| 2004/0146196 A1 | 7/2004 | Van Heel |
| 2004/0190762 A1* | 9/2004 | Dowski, Jr. ............ G02B 5/284 |
| | | 382/128 |
| 2005/0211912 A1 | 9/2005 | Fox |
| 2006/0098293 A1 | 5/2006 | Garoutte et al. |
| 2006/0158754 A1 | 7/2006 | Tsukagoshi et al. |
| 2006/0173313 A1 | 8/2006 | Liu et al. |
| 2006/0291707 A1 | 12/2006 | Kothapalli et al. |
| 2007/0057184 A1 | 3/2007 | Uto et al. |
| 2007/0133113 A1 | 6/2007 | Minabe et al. |
| 2007/0159639 A1 | 7/2007 | Teramura et al. |
| 2007/0171430 A1 | 7/2007 | Tearney et al. |
| 2007/0189436 A1 | 8/2007 | Goto et al. |
| 2007/0206200 A1 | 9/2007 | Lindner et al. |
| 2008/0101664 A1 | 5/2008 | Perez |
| 2008/0182336 A1 | 7/2008 | Zhuang et al. |
| 2009/0046164 A1 | 2/2009 | Shroff et al. |
| 2009/0079987 A1 | 3/2009 | Ben-Ezra et al. |
| 2009/0125242 A1 | 5/2009 | Choi et al. |
| 2009/0284831 A1 | 11/2009 | Schuster et al. |
| 2009/0316141 A1 | 12/2009 | Feldkhun |
| 2010/0135547 A1 | 6/2010 | Lee et al. |
| 2010/0271705 A1 | 10/2010 | Hung |
| 2011/0075928 A1 | 3/2011 | Jeong et al. |
| 2011/0181869 A1 | 7/2011 | Yamaguchi et al. |
| 2011/0192976 A1 | 8/2011 | Own et al. |
| 2011/0235863 A1 | 9/2011 | Maiden |
| 2011/0255163 A1 | 10/2011 | Merrill et al. |
| 2012/0069344 A1 | 3/2012 | Liu |
| 2012/0099803 A1 | 4/2012 | Ozcan et al. |
| 2012/0105618 A1 | 5/2012 | Brueck et al. |
| 2012/0118967 A1 | 5/2012 | Gerst |
| 2012/0157160 A1 | 6/2012 | Ozcan et al. |
| 2012/0176673 A1 | 7/2012 | Cooper |
| 2012/0218379 A1 | 8/2012 | Ozcan et al. |
| 2012/0248292 A1 | 10/2012 | Ozcan et al. |
| 2012/0250032 A1 | 10/2012 | Wilde et al. |
| 2012/0281929 A1 | 11/2012 | Brand et al. |
| 2013/0057748 A1 | 3/2013 | Duparre et al. |
| 2013/0083886 A1 | 4/2013 | Carmi et al. |
| 2013/0093871 A1 | 4/2013 | Nowatzyk et al. |
| 2013/0094077 A1 | 4/2013 | Brueck et al. |
| 2013/0100525 A1 | 4/2013 | Chiang et al. |
| 2013/0170767 A1 | 7/2013 | Choudhury et al. |
| 2013/0182096 A1 | 7/2013 | Boccara et al. |
| 2013/0223685 A1 | 8/2013 | Maiden |
| 2014/0007307 A1 | 1/2014 | Routh, Jr. et al. |
| 2014/0029824 A1 | 1/2014 | Shi et al. |
| 2014/0043616 A1 | 2/2014 | Maiden et al. |
| 2014/0050382 A1* | 2/2014 | Adie ............ G02B 21/0056 |
| | | 382/131 |
| 2014/0085629 A1 | 3/2014 | Bodkin et al. |
| 2014/0118529 A1 | 5/2014 | Zheng et al. |
| 2014/0126691 A1 | 5/2014 | Zheng et al. |
| 2014/0133702 A1 | 5/2014 | Zheng et al. |
| 2014/0152801 A1 | 6/2014 | Fine et al. |
| 2014/0153692 A1 | 6/2014 | Larkin et al. |
| 2014/0160236 A1 | 6/2014 | Ozcan et al. |
| 2014/0160488 A1 | 6/2014 | Zhou |
| 2014/0217268 A1 | 8/2014 | Schleipen et al. |
| 2014/0267674 A1 | 9/2014 | Mertz et al. |
| 2014/0347672 A1 | 11/2014 | Pavillon et al. |
| 2014/0368812 A1 | 12/2014 | Humphry et al. |
| 2015/0036038 A1 | 2/2015 | Horstmeyer et al. |
| 2015/0054979 A1 | 2/2015 | Ou et al. |
| 2015/0160450 A1 | 6/2015 | Ou et al. |
| 2015/0264250 A1 | 9/2015 | Ou et al. |
| 2015/0286042 A1 | 10/2015 | Hilbert et al. |
| 2015/0331228 A1 | 11/2015 | Horstmeyer et al. |
| 2016/0088205 A1 | 3/2016 | Horstmeyer et al. |
| 2016/0110584 A1 | 4/2016 | Remiszewski et al. |
| 2016/0178883 A1 | 6/2016 | Horstmeyer et al. |
| 2016/0202460 A1 | 7/2016 | Zheng |
| 2016/0210763 A1 | 7/2016 | Horstmeyer et al. |
| 2016/0216208 A1 | 7/2016 | Kim et al. |
| 2016/0216503 A1 | 7/2016 | Kim et al. |
| 2016/0266366 A1 | 9/2016 | Chung et al. |
| 2016/0320595 A1 | 11/2016 | Horstmeyer et al. |
| 2016/0320605 A1 | 11/2016 | Ou et al. |
| 2016/0341945 A1 | 11/2016 | Ou et al. |
| 2017/0061599 A1 | 3/2017 | Remiszewski et al. |
| 2017/0178317 A1 | 6/2017 | Besley et al. |
| 2017/0188853 A1 | 7/2017 | Nakao et al. |
| 2017/0273551 A1 | 9/2017 | Chung et al. |
| 2017/0299854 A1 | 10/2017 | Kim et al. |
| 2017/0354329 A1 | 12/2017 | Chung et al. |
| 2017/0363853 A1 | 12/2017 | Besley |
| 2017/0371141 A1 | 12/2017 | Besley |
| 2018/0048811 A1 | 2/2018 | Waller et al. |
| 2018/0088309 A1 | 3/2018 | Ou et al. |
| 2018/0231761 A1 | 8/2018 | Dai et al. |
| 2018/0307017 A1 | 10/2018 | Horstmeyer et al. |
| 2018/0316855 A1 | 11/2018 | Ou et al. |
| 2019/0049712 A1 | 2/2019 | Kim et al. |
| 2019/0056578 A1 | 2/2019 | Horstmeyer et al. |
| 2019/0137753 A1 | 5/2019 | Chan et al. |

FOREIGN PATENT DOCUMENTS

| | | |
|---|---|---|
| CN | 1311392 C | 4/2007 |
| CN | 101408623 A | 4/2009 |
| CN | 101680848 A | 3/2010 |
| CN | 101743519 A | 6/2010 |
| CN | 101868740 A | 10/2010 |
| CN | 101872033 A | 10/2010 |
| CN | 101957183 A | 1/2011 |
| CN | 102608597 A | 7/2012 |

(56) References Cited

FOREIGN PATENT DOCUMENTS

| | | |
|---|---|---|
| CN | 102753935 A | 10/2012 |
| CN | 103096804 A | 5/2013 |
| CN | 103154662 A | 6/2013 |
| CN | 103201648 A | 7/2013 |
| CN | 103377746 A | 10/2013 |
| CN | 104181686 A | 12/2014 |
| CN | 104200449 A | 12/2014 |
| JP | 2007-299604 A | 11/2007 |
| JP | 2008-147629 A | 6/2008 |
| JP | 2010-012222 A | 1/2010 |
| KR | 10-1998-0075050 A | 11/1998 |
| TW | 201428339 A | 7/2014 |
| WO | WO 99/53469 A1 | 10/1999 |
| WO | WO 2002/102128 A1 | 12/2002 |
| WO | WO 2003/062744 A1 | 7/2003 |
| WO | WO 2008/116070 A1 | 9/2008 |
| WO | WO 2011/093043 A1 | 8/2011 |
| WO | WO 2012/037182 A1 | 3/2012 |
| WO | WO 2014/070656 A1 | 5/2014 |
| WO | WO 2015/017730 A1 | 2/2015 |
| WO | WO 2015/027188 A1 | 2/2015 |
| WO | WO 2016/090331 A1 | 6/2016 |
| WO | WO 2016/106379 A1 | 6/2016 |
| WO | WO 2016/118761 A1 | 7/2016 |
| WO | WO 2016/123156 A1 | 8/2016 |
| WO | WO 2016/123157 A1 | 8/2016 |
| WO | WO 2016/149120 A1 | 9/2016 |
| WO | WO 2016/187591 A1 | 11/2016 |
| WO | WO 2017/066198 A1 | 4/2017 |
| WO | WO 2017081539 A1 | 5/2017 |
| WO | WO 2017081540 A1 | 5/2017 |
| WO | WO 2017081542 A2 | 5/2017 |

OTHER PUBLICATIONS

Preliminary Amendment dated Apr. 25, 2016 filed in U.S. Appl. No. 14/710,947.
Preliminary Amendment dated Nov. 28, 2016 filed in U.S. Appl. No. 15/206,859.
Preliminary Amendment dated Mar. 17, 2014 filed in U.S. Appl. No. 14/065,305.
Preliminary Amendment dated Nov. 28, 2016 filed in U.S. Appl. No. 15/209,604.
U.S. Office Action dated Oct. 5, 2015 in U.S. Appl. No. 14/065,305.
U.S. Notice of Allowance dated Dec. 4, 2015 in U.S. Appl. No. 14/065,305.
U.S. Notice of Allowance dated Jan. 14, 2016 in U.S. Appl. No. 14/448,850.
U.S. Notice of Allowance dated Jan. 22, 2016 in U.S. Appl. No. 14/466,481.
U.S. Notice of Allowance dated Apr. 13, 2016 in U.S. Appl. No. 14/448,850.
U.S. Notice of Allowance dated Apr. 22, 2016 in U.S. Appl. No. 14/466,481.
U.S. Office Action dated Jul. 14, 2016 in U.S. Appl. No. 15/007,196.
U.S. Notice of Allowance dated Aug. 23, 2016 in U.S. Appl. No. 14/466,481.
U.S. Office Action dated Aug. 16, 2016 in U.S. Appl. No. 14/065,280.
U.S. Office Action dated Sep. 16, 2016 I U.S. Appl. No. 14/065,305.
U.S. Notice of Allowance dated Nov. 2, 2016 in U.S. Appl. No. 14,572,493.
U.S. Office Action dated Nov. 22, 2016 in U.S. Appl. No. 15/003,559.
U.S. Supplemental Notice of Allowance dated Dec. 12, 2016 in U.S. Appl. No. 14/572,493.
U.S. Notice of Allowance dated Jan. 13, 2017 in U.S. Appl. No. 14/065,305.
U.S. Final Office Action dated Jan. 23, 2017 in U.S. Appl. No. 15/007,196.
U.S. Office Action dated Feb. 21, 2017 in U.S. Appl. No. 14/960,252.
U.S. Supplemental Notice of Allowability dated Mar. 2, 2017 in U.S. Appl. No. 14/065,305.
U.S. Notice of Allowance dated Mar. 8, 2017 in U.S. Appl. No. 14/572,493.
U.S. Office Action dated Mar. 13, 2017 in U.S. Appl. No. 14/658,019.
U.S. Notice of Allowance dated Mar. 22, 2017 in U.S. Appl. No. 15/007,196.
U.S. Office Action dated Mar. 24, 2017 in U.S. Appl. No. 14/710,947.
U.S. Notice of Allowance dated Mar. 31, 2017 in U.S. Appl. No. 14/572,493.
U.S. Final Office Action dated Apr. 3, 2017 in U.S. Appl. No. 14/065,280.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Jun. 9, 2017 in U.S. Appl. No. 15/007,196.
U.S. Notice of Allowance dated Jun. 20, 2017 in U.S. Appl. No. 14/572,493.
U.S. Supplemental Notice of Allowance dated Jun. 28, 2017 in U.S. Appl. No. 15/206,859.
U.S. Final Office Action dated Jul. 27, 2017 in U.S. Appl. No. 15/003,559.
U.S. Notice of Allowance dated Aug. 16, 2017 in U.S. Appl. No. 15/209,604.
Office Action dated Aug. 31, 2017 in U.S. Appl. No. 15/636,494.
U.S. Notice of Allowance dated Sep. 1, 2017 in U.S. Appl. No. 15/206,859.
Office Action dated May 19, 2017 in U.S. Appl. No. 15/081,659.
Notice of Allowance dated Sep. 20, 2017 in U.S. Appl. No. 15/007,196.
Notice of Allowance dated Oct. 11, 2017 in U.S. Appl. No. 14/572,493.
Notive of Allowance dated Oct. 20, 2017 in U.S. Appl. No. 15/081,659.
Office Action dated Nov. 3, 2017 in U.S. Appl. No. 15/068,389.
International Search Report and Written Opinion dated Feb. 21, 2014 in PCT/US2013/067068.
International Preliminary Report on Patentability dated May 14, 2015 in PCT/US2013/067068.
European Third-Party Observations, dated Jan. 20, 2016 in EP Application No. 13851670.3.
European Extended Search Report dated Mar. 31, 2016 in EP Application No. 13851670.3.
International Preliminary Report on Patentability dated Mar. 3, 2016 issued in PCT/US2014/052351.
International Search Report and Written Opinion dated Dec. 5, 2014 issued in PCT/US2014/052351.
International Search Report and Written Opinion dated Nov. 13, 2014 issued in PCT/US2014/049297.
International Preliminary Report on Patentability dated Feb. 11, 2016 issued in PCT/US2014/049297.
International Search Report and Written Opinion dated Feb. 22, 2016 issued in PCT/US2015/064126.
International Search Report and Written Opinion dated Apr. 19, 2016 issued in PCT/US2015/067498.
International Search Report and Written Opinion dated May 4, 2016 issued in PCT/US2016/015001.
International Search Report and Written Opinion dated May 11, 2016 issued in PCT/US2016/015002.
International Search Report and Written Opinion dated Jun. 27, 2016 issued in PCT/US2016/022116.
International Search Report and Written Opinion dated Jun. 30, 2016 issued in PCT/US2016/014343.
International Search Report and Wrtitten Opinion dated Sep. 5, 2016 issued in PCT/US2016/033638.
Chinese Office Action [Description in English] dated May 31, 2016 issued in Application No. CN 201380068831.6.
Chinese Office Action [Description in English] dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Applicatoin No. 14832857.8.

(56) References Cited

OTHER PUBLICATIONS

Chinese Second Office Action [Description in English] dated Jan. 22, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.
Chinese First Office Action [Summary in English] dated Aug. 2, 2017 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
Japanese Office Action dated Oct. 17, 2017 issued in Application No. 2015-539884.
Chinese Office Action [Summary in English] dated Oct. 26, 2017 issued in CN 201480057911.6.
About Molemap, About Us—Skin Cancer Mole Check NZ, pp. 1-2. [retrieved Oct. 23, 2015 ] <URL: http://molemap.net.au/about-us/>.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Abramowitz, M. et al, "Immersion Media," Olympus Microscopy Resource Center: Microscope Optical Components, Published 2012, pp. 1-6.[retrieved on Feb. 6, 2012] <URL: http://www.olympusmicro.com/primer/anatomy/immersion.html>.
Abramowitz, M., et al, "Field Curvature," Olympus Microscopy Resource Center, 2012 Olympus America Inc., pp. 1-3. [retrieved on Feb. 24, 2016] <URL:http://www.olympusmicro.com/primer/anatomy/fieldcurvature.html>.
Age-Related Macular Degeneration (AMD) | National Eye Institute. 2010 Table, pp. 1-8. [retrieved Apr. 5, 2016] <URL: https://www.nei.nih.gov/eyedata/amd#top>.
Alexandrov, S., et al, "Spatial information transmission beyond a system's diffraction limit using optical spectral encoding of the spatial frequency," Journal of Optics A: Pure and Applied Optics 10, Feb. 4, 2008, 025304, pp. 1-5. <doi:10.1088/1464-4258/10/2/025304> [retrieved Dec. 2, 2015] <URL: http://www.stacks.iop.org/JOptA/10/025304>.
Alexandrov, S.A., et al, "Synthetic Aperture Fourier Holographic Optical Microscopy," Physical Review Letters, vol. 97, No. 16, Oct. 20, 2006, pp. 168102-1-168102-4. <doi: 0.1103/PhysRevLett.97.168102>.
Arimoto, H., et al, "Integral three-dimensional imaging with digital reconstruction," Optics Letters, Optical Society of America, Feb. 1, 2001, vol. 26, No. 3, pp. 157-159. <doi: 10.1364/OL.26.000157>.
Balan, R., et al, "On signal reconstruction without phase," Applied and Computational Harmonic Analysis, vol. 20, Issue 3, May 2006, pp. 345-356. <doi:10.1016/j.acha.2005.07.001>.
Balan, R., et al, "Painless Reconstruction from Magnitudes of Frame Coefficients," Journal Fourier Analysis and Applications, vol. 15, Issue 4, Mar. 25, 2009, pp. 488-501. <doi:10.1007/s00041-009-9065-1>.
Bauschke, H., et al, "Phase retrieval, error reduction algorithm, and Fienup variants: a view from convex optimization," Journal of the Optical Society America, A., vol. 19, No. 7, Jul. 2002, pp. 1334-1345. <doi: 10.1364/JOSAA.19.001334>.

Becker, S.R., et al, "Templates for Convex Cone Problems with Applications to Sparse Signal Recovery," Mathematical Programming Computation, Sep. 2010, vol. 3, No. 3, pp. 1-49. <doi: 10.1007/s12532-011-0029-5>.
Betti, R., et al, "Observational study on the mitotic rate and other prognostic factors in cutaneous primary melanoma arising from naevi and from melanoma de novo," Journal of the European Academy of Dermatology and Venereology (JEADV), Dec. 2014, vol. 28, No. 12, pp. 1738-1741. <doi: 10.1111/jdv.12395>.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. <doi: 10.1038/srep27384>.
Bian, L., et al, "Fourier ptychographic reconstruction using Wirtinger flow optimization," Optics Express, vol. 23, No. 4, Feb. 23, 2015, pp. 4856-4866. <doi: 10.1364/OE.23.004856>.
Bian, Z., et al, "Adaptive system correction for robust Fourier ptychographic imaging," Optics express, Dec. 30, 2013, vol. 21, No. 26, pp. 32400-32410. <doi: 10.1364/OE.21.032400>.
BioTek® Brochure: BioTek's Multi-Mode Microplate Reading Techonologies, BioTek Instruments, Inc. pp. 2. [retrieved on Mar. 14, 2016] <URL: http://www.biotek.com>.
Bishara, W., et al, "Holographic pixel super-resolution in portable lensless on-chip microscopy using a fiber-optic array," NIH-PA, Lab Chip, *Author manuscript*; available in PMC Aug. 8, 2011, pp. 1-9. (Published in final edited form as: Lab Chip. Apr. 7, 2011; 11(7): 1276-1279. <doi:10.1039/c01c00684j>).
Bishara, W., et al, "Lensfree on-chip microscopy over a wide field-of-view using pixel super-resolution," Optics Express, vol. 18, No. 11, May 24, 2010, pp. 11181-11191. <doi: 10.1364/OE.18.011181>.
Blum, A., et al, "Clear differences in hand-held dermoscopes," Journal der Deutschen Dermatologischen Gesellschaft (JDDG); Case Reports, Dec. 2006, vol. 4, No. 12, pp. 1054-1057. <doi:10.1111/j.1610-0387.2006.06128.x>.
Blum, A., et al, "Dermatoskopisch sichtbare Strukturen," Chapter 4.1 Grundlagen, Dermatoskopie von Hauttumoren: Auflichtmikroskopie; Dermoskopie; Digitale Bildanalyse; mit 28 Tabellen. Springer-Verlag Berlin Heidelberg 2003, pp. 15-66. (English Translation of Summary) <doi: 10.1007/978-3-642-57446-7_4>.
Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].
Brady, D., et al, "Multiscale gigapixel photography," Nature|Letters, vol. 486, Jun. 21, 2012, pp. 386-389. <doi:10.1038/nature11150>.
Bunk, O., et al, "Influence of the overlap parameter on the convergence of the ptychographical iterative engine," Ultramicroscopy, vol. 108, (2008), pp. 481-487. <doi: 10.1016/j.ultramic.2007.08.003>.
Burer, S., et al, "A nonlinear programming algorithm for solving semidefinite programs via low-rank factorization," Mathematical Programming, Series B., vol. 95, No. 2, Feb. 2003, pp. 329-357. <doi:10.1007/s10107-002-0352-8>.
Burer, S., et al, "Local Minima and Convergence in Low-Rank Semidefinite Programming," Mathematical Programming, Series A., vol. 103, Issue 3, Jul. 1, 2005, pp. 427-444. <doi:10.1007/s10107-004-0564-1>.
Candes, E.J., et al, "Phase Retrieval via Wirtinger Flow: Theory and Algorithms," IEEE Transaction on Information Theory, vol. 61, No. 4, Apr. 2015, pp. 1985-2007. <doi: 10.1109/TIT.2015.2399924>.
Candes, E.J., et al, pre-published manuscript of "Phase Retrieval via Matrix Completion," ArXiv e-prints, 24 pages (Submitted on Sep. 2, 2011 (v1), last revised Sep. 20, 2011 (this version, v2)). [retrieved Nov. 9, 2015] <URL: arXiv:1109.0573v2 [cs.IT] Sep. 20, 2011>.
Candes, E.J., et al, pre-published Manuscript of "PhaseLift: Exact and Stable Signal Recovery from Magnitude Measurements via Convex Programming," ArXiv e-prints, 31 pages (Submitted Sep. 2011 (v1)). [retrieved Nov. 9, 2015] <URL: arXiv:1109.4499v1 [cs.IT] Sep. 21, 2011>.

(56) References Cited

OTHER PUBLICATIONS

Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] <doi:10.1001/archopht.126.6.857>.
Chai, A., et al, "Array imaging using intensity-only measurements," IOP Publishing: Inverse Problems, vol. 27, No. 1, Jan. 2011, pp. 1-16. <doi:10.1088/0266-5611/27/1/015005>.
Chao, W. et al, "Soft X-ray microscopy at a spatial resolution better than 15 nm," Nature|Letters, vol. 435, Jun. 30, 2005, pp. 1210-1213. <doi:10.1038/nature03719>.
Chen, T., et al, "Polarization and Phase-Shifting for 3D Scanning of Translucent Objects," 2007 IEEE Conference on Computer Vision and Pattern Recognition; on Jun. 17-22, 2007, pp. 1-8. <doi:10.1109/CVPR.2007.383209>.
Chin, L., et al, "Malignant melanoma: genetics and therapeutics in the genomic era," CSH Press: Genes & Development, Aug. 15, 2006, vol. 20, pp. 2149-2182. <doi: 10.1101/gad.1437206> [retrieved Sep. 9, 2015] <URL:http://genesdev.cshlp.org/content/20/16/2149>.
Choi, W., et al, "Tomographic phase microscopy," NPG: Nature Methods | Advance Online Publication, Aug. 12, 2007, pp. 1-3. <doi:10.1038/NMETH1078>.
Chung, J., et al, "Counting White Blood Cells from a Blood Smear Using Fourier Ptychographic Microscopy," PLoS One, vol. 10, No. 7, Jul. 17, 2015, pp. 1-10. <doi:10.1371/journal.pone.0133489>.
Chung, J., et al, "Wide field-of-view fluorescence image deconvolution with aberration-estimation from Fourier ptychography," Biomedical Optics Express, vol. 7, No. 2, Feb. 1, 2016, pp. 352-368. <doi: 10.1364/BOE.7.000352>.
Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] <URL:arXiv:1602.02901v2 [physics.optics] Mar. 23, 2016>.
Colomb, T., et al, "Automatic procedure for aberration compensation in digital holographic microscopy and applications to specimen shape compensation," Applied Optics, vol. 45, No. 5, Feb. 10, 2006, pp. 851-863. <doi: 10.1364/AO.45.000851>.
De Sa, C., et al, "Global Convergence of Stochastic Gradient Descent for Some Non-convex Matrix Problems," Proceedings of the 32nd International Conference on Machine Learning, Lille, France, 2015. JMLR: W&CP, vol. 37, pp. 10. [retrieved on Nov. 9, 2015]<URL: https://arxiv.org/abs/1411.1134>.
Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. <doi: 10.1364/OL.34.000079>.
Denis, L., et al, "Inline hologram reconstruction with sparsity constraints," Optics Letters, Optical Society of America, vol. 34, No. 22, Oct. 12, 2009, pp. 3475-3477. <doi:10.1364/OL.34.003475> <ujm-00397994v2>.
Di, J., et al, "High resolution digital holographic microscopy with a wide field of view based on a synthetic aperture technique and use of linear CCD scanning," Applied Optics, vol. 47, No. 30, Oct. 20, 2008, pp. 5654-5659. <doi: 10.1364/AO.47.005654>.
Dierolf, M., et al, "Ptychographic X-ray computed tomography at the nanoscale," Nature|Letter, vol. 467, Sep. 23, 2010, pp. 436-439. <doi:10.1038/nature09419>.
Dierolf, M., et al, "Ptychographic coherent diffractive imaging of weakly scattering specimens," New Journal of Physics, vol. 12, Mar. 31, 2010, 035017, pp. 14. <doi: 10.1088/1367-2630/12/3/035017>.
Doctor Mole—Skin Cancer App, App to check skin cancer by Dr. Mole, p. 1. (Webpage) [retrieved on Oct. 23, 2015] <URL: http://www.doctormole.com>.
Dong, S., et al, "FPscope: a field-portable high-resolution microscope using a cellphone lens," Biomedical Optics Express, vol. 5, No. 10, Oct. 1, 2014, pp. 3305-3310. <doi:10.1364/BOE.5.003305>.
Dong, S., et al, "High-resolution fluorescence imaging via pattern-illuminated Fourier ptychography," Optics Express, vol. 22, No. 17, Aug. 25, 2014, pp. 20856-20870. <doi:10.1364/OE.22.020856>.
Dong, S., et al, "Aperture-scanning Fourier ptychography for 3D refocusing and super-resolution macroscopic imaging," Optics Express, vol. 22, No. 11, Jun. 2, 2014, pp. 13586-13599. <doi:10.1364/OE.22.013586>.
Eldar, Y.C., et al, "Sparse Phase Retrieval from Short-Time Fourier Measurements," IEEE Signal Processing Letters, vol. 22, No. 5, May 2015, pp. 638-642. <doi:10.1109/LSP.2014.2364225>.
Emile, O., et al, "Rotating polarization imaging in turbid media," Optics Letters, vol. 21, No. 20, Oct. 15, 1996, pp. 1706-1708. <doi: 10.1364/OL.21.001706>.
Essen BioScience, "Real-time, quantitative live-cell analysis, IncuCyte® Zoom System," IncuCyte Zoom System Brochure 2016, pp. 1-4. [retrieved Feb. 25, 2016] [URL: http://www.essenbioscience.com/IncuCyte].
Faulkner, H.M.L., et al, "Error tolerance of an iterative phase retrieval algorithm for moveable illumination microscopy," Ultramicroscopy, vol. 103, No. 2, May 2005, pp. 153-164. <doi: 10.1016/j.ultramic.2004.11.006>.
Faulkner, H.M.L., et al., "Movable Aperture Lensless Transmission Microscopy: A Novel Phase Retrieval Algorithm," Physical Review Letters, vol. 93, No. 2, Jul. 9, 2004, pp. 023903-1-023903-4. <doi:10.1103/PhysRevLett.93.023903>.
Fazel, M., "Matrix rank minimization with applications," PhD dissertation submitted to the Dept. of Electrical Engineering and Committee on Graduate Studies of Stanford University, Mar. 2002, pp. 1-117. [retrieved on Nov. 9, 2015] <URL:http://faculty.washington.edu/mfazel/thesis-final.pdf>.
Feng, P., et al, "Long-working-distance synthetic aperture Fresnel off-axis digital holography," Optics Express, vol. 17, No. 7, Mar. 30, 2009, pp. 5473-5480. <doi: 10.1364/OE.17.005473>.
Fienup, J. R., "Invariant error metrics for image reconstruction," Applied Optics, vol. 36, No. 32, Nov. 10, 1997, pp. 8352-8357. <doi: 10.1364/AO.36.008352>.
Fienup, J. R., "Lensless coherent imaging by phase retrieval with an illumination pattern constraint," Optics Express, vol. 14, No. 2, Jan. 23, 2006, pp. 498-508. <doi: 10.1364/OPEX.14.000498>.
Fienup, J. R., "Phase retrieval algorithms: a comparison," Applied Optics, vol. 21, No. 15, Aug. 1, 1982, pp. 2758-2769. <doi: 10.1364/AO.21.002758>.
Fienup, J. R., "Reconstruction of a complex-valued object from the modulus of its Fourier transform using a support constraint," Journal of the Optical Society of America A, vol. 4, No. 1, Jan. 1987, pp. 118-123. <doi: 10.1364/JOSAA.4.000118>.
Fienup, J. R., "Reconstruction of an object from the modulus of its Fourier transform," Optics Letter, vol. 3, No. 1, Jul. 1978, pp. 27-29. <doi: 10.1364/OL.3.000027>.
Gan, X., et al, "Image enhancement through turbid media under a microscope by use of polarization gating methods," Journal of the Optical Society of America A, vol. 16, No. 9, Sep. 1999, pp. 2177-2184. <doi: 10.1364/JOSAA.16.002177>.
Gerke T.D., et al, "Aperiodic volume optics," Nature Photonics, vol. 4, Feb. 7, 2010, pp. 188-193. <doi:10.1038/nphoton.2009.290>.
Ghosh, A., et al, pre published manuscript of "Multiview Face Capture using Polarized Spherical Gradient Illumination," via USC Institute for Creative Technologies; To appear in ACM Transactions on Graphics (TOG), vol. 30, No. 6, Dec. 2011, pp. 1-10. [Retrieved Sep. 28, 2011]<URL: http://doi.acm.org/10.1145/2024156.2024163>.
Godara, P., et al, "Adaptive Optics Retinal Imaging: Emerging Clinical Applications," *NIH-PA Author Manuscript*; available in PMC Dec. 1, 2011. Published in final edited form as: Optom. Vis. Sci.. Dec. 2010; 87(12): 930-941. <doi: 10.1097/OPX.0b013e3181ff9a8b>.
Goodman, J.W., "Introduction to Fourier Optics," Third Ed., Roberts & Company Publishers (Englewood, Colorado 2005) pp. 1-172. <ISBN 0-9747077-2-4>.
Goodson, A.G., et al, "Comparative analysis of total body vs. dermatoscopic photographic monitoring of nevi in similar patient populations at risk for cutaneous melanoma," NIH-PA *Author Manuscript*; available in PMC Jul. 1, 2011. Published in final edited form as: Dermatol. Surg. Jul. 2010; 36(7): 1087-1098. <doi: 10.1111/j.1524-4725.2010.01589.x>.

(56) References Cited

OTHER PUBLICATIONS

Granero, L., et al, "Synthetic aperture superresolved microscopy in digital lensless Fourier holography by time and angular multiplexing of the object information," Applied Optics, vol. 49, No. 5, Feb. 10, 2010, pp. 845-857. <doi: 10.1364/AO.49.000845>.

Grant, M., et al, "CVX: Matlab Software for Disciplined Convex Programming," CVX Research Inc., pp. 1-3. [Webpage] [retrieved on Dec. 18, 2015] <URL: http://cvxr.com/cvx>.

Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] <URL:http://dx.doi.org/10.1039/C2LC21072J>.

Greenbaum, A., et al, "Increased space—bandwidth product in pixel super-resolved lensfree on-chip microscopy," Scientific Reports, vol. 3, No. 1717, Apr. 24, 2013, pp. 1-8. [doi: 10.1038/srep01717].

Gruev, V., et al, "Dual-tier thin film polymer polarization imaging sensor," Optics Express, vol. 18, No. 18, Aug. 30, 2010, pp. 19292-19303. <doi: 10.1364/OE.18.019292>.

Guizar-Sicairos, M., and Fienup, J.R.,"Phase retrieval with transverse translation diversity: a nonlinear optimization approach," Optics Express, vol. 16, No. 10, May 12, 2008, pp. 7264-7278. <doi: 10.1364/OE.16.007264>.

Gunturk, B.K., et al, "Restoration in the Presence of Unknown Spatially Varying Blur," Ch. 3, in *Image Restoration: Fundamentals and Advances* (CRC Press 2012), pp. 63-68. <ISBN 978-1-4398-6955-0>.

Guo, K., et al, "Optimization of sampling pattern and the design of Fourier ptychographic illuminator," Optics Express, vol. 23, No. 5, Mar. 9, 2015, pp. 6171-6180. <doi: 10.1364/OE.23.006171>.

Gustafsson, M.G.L., "Surpassing the lateral resolution limit by a factor of two using structured illumination microscopy," Journal of Microscopy, vol. 198, Pt. 2, May 2000, pp. 82-87. <doi:10.1046/j.1365-2818.2000.00710.x>.

Gutzler, T., et al, "Coherent aperture-synthesis, wide-field, high-resolution holographic microscopy of biological tissue," Optics Letters, vol. 35, No. 8, Apr. 15, 2010, pp. 1136-1138. <doi: 10.1364/OL.35.001136>.

Haigh, S. J., et al, "Atomic Structure Imaging beyond Conventional Resolution Limits in the Transmission Electron Microscope," Physical Review Letters, vol. 103, Issue 12, Sep. 18, 2009, pp. 126101.1-126101.4. <doi:10.1103/PhysRevLett.103.126101>.

Han, C., et al, "Wide Field-of-View On-Chip Talbot Fluorescence Microscopy for Longitudinal Cell Culture Monitoring from within the Incubator" Analytical Chemistry, vol. 85, No. 4, Jan. 28, 2013, pp. 2356-2360. <doi:10.1021/ac303356v>.

Hillman, T.R., et al, "High-resolution, wide-field object reconstruction with synthetic aperture Fourier holographic optical microscopy," Optics Express, vol. 17, No. 10, May 11, 2009, pp. 7873-7892. <doi:10.1364/OE.17.007873>.

Hofer, H., et al, "Dynamics of the eye's wave aberration," Journal of Optical Society of America A., vol. 18, No. 3, Mar. 2001, pp. 497-506. <doi: 10.1364/JOSAA.18.000497>.

Hofer, H., et al, "Organization of the Human Trichromatic Cone Mosaic," The Journal of Neuroscience, vol. 25, No. 42, Oct. 19, 2005, pp. 9669-9679. <doi: 10.1523/JNEUROSCI.2414-05.2005>.

Hong, S-H., et al, "Three-dimensional volumetric object reconstruction using computational integral imaging," OSA Publishing: Optics Express, vol. 12, No. 3, Feb. 9, 2004, pp. 483-491. <doi:10.1364/OPEX.12.000483>.

Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).

Hoppe, W., "Diffraction in inhomogeneous primary wave fields. 1. Principle of phase determination from electron diffraction interfrence," Acta Crystallogr. A25, 495-501 1969.

Horstmeyer, R., et al, "A phase space model of Fourier ptychographic microscopy," Optics Express, vol. 22, No. 1, Jan. 13, 2014, pp. 338-358. <doi:10.1364/OE.22.000338>.

Horstmeyer, R., et al, "Diffraction tomography with Fourier ptychography," Optica, Optical Society of America, vol. 3, No. 8, Aug. 2016, pp. 827-835. <doi:10.1364/OPTICA.3.000827>.

Horstmeyer, R., et al, "Digital pathology with Fourier Ptychography," Computerized Medical Imaging and Graphics, vol. 42, Jun. 2015, pp. 38-43. <doi: 10.1016/j.compmedimag.2014.11.005>.

Horstmeyer, R., et al, "Overlapped Fourier coding for optical aberration removal," Optics Express, vol. 22, No. 20, Oct. 6, 2014, pp. 24062-24080. <doi: 10.1364/OE.22.024062>.

Horstmeyer, R., et al, "Solving ptychography with a convex relaxation," New Journal of Physics, vol. 17, May 27, 2015, pp. 1-14. <doi: 10.1088/1367-2630/17/5/053044> [URL: http://iopscience.iop.org/1367-2630/17/5/053044].

Horstmeyer, R., et al, "Standardizing the resolution claims for coherent microscopy," Nature Photonics I Commentary, vol. 10, No. 2, Feb. 2016, pp. 68-71. <doi:10.1038/nphoton.2015.279> [URL: http://dx.doi.org/10.1038/nphoton.2015.279].

Hüe, F., et al, "Wave-front phase retrieval in transmission electron microscopy via ptychography," Rapid Comunications: Physical Review B, vol. 82, No. 12, Sep. 15, 2010, pp. 121415-1-121415-4. <doi:10.1103/PhysRevB.82.121415>.

Humphry, M., et al, "Ptychographic electron microscopy using high-angle dark-field scattering for sub-nanometre resolution imaging," Nature Communications, vol. 3, Mar. 6, 2012, pp. 1-7. <doi: 10.1038/ncomms1733>.

Jaganathan, K., et al, "Recovery of sparse 1-D signals from the magnitudes of their Fourier transform," *2012 IEEE International Symposium on Information Theory Proceedings*, Cambridge, MA, 2012, pp. 1473-1477. <doi: 10.1109/ISIT.2012.6283508.>.

Jaganathan, K., et al, "Phase retrieval with masks using convex optimization," 2015 IEEE International Symposium on Information Theory (ISIT), Hong Kong, 2015, pp. 1655-1659. <doi: 10.1109/ISIT.2015.7282737>.

Jaganathan, K., et al, pre published manuscript of"STFT Phase retrieval: uniqueness guarantees and recovery algorithms," ArXiv e-prints, 10 pages, (Submitted on Aug. 12, 2015 (v1). <doi: 10.1109/JSTSP.2016.2549507> [retrieved Nov. 9, 2015] <URL: https://arxiv.org/abs/1508.02820v1>.

Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL: http://archopht.jamanetwork.com/].

Jung, J.H., et al, Author Manuscript of"Microfluidic-integrated laser-controlled microactuators with on-chip microscopy imaging functionality," Published in final edited form as: Lab Chip, Oct. 7, 2014, vol. 14, No. 19, pp. 3781-3789. <doi: 10.1039/c4lc00790e>.

Kawata, S. et al, "Optical microscope tomography. I. Support constraint," Journal Optical Society America A, vol. 4, No. 1, Jan. 1987, pp. 292-297. <doi:10.1364/JOSAA.4.000292>.

Kay, D. B., et al, Author Manuscript of"Outer Retinal Structure in Best Vitelliform Macular Dystrophy," Published in final edited form as: JAMA Ophthalmol., Sep. 2013, vol. 131, No. 9, pp. 1207-1215. <doi: 10.1001/jamaophthalmol.2013.387>.

Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. <doi: 10.1364/BOE.7.003097>.

Kim, M., et al, "High-speed synthetic aperture microscopy for live cell imaging," Optics Letters, vol. 36, No. 2, Jan. 15, 2011, pp. 148-150. <doi:10.1364/OL.36.000148>.

Kim, M., et al, "High-speed synthetic aperture microscopy for live cell imaging," NIH-PA, *Author Manuscript* available in PMC Mar. 30, 2011. Published in final edited form as: Opt Lett. Jan. 15, 2011; 36(2): pp. 148-150. <PMCID: PMC3068016>.

Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro.a023486].

(56) References Cited

OTHER PUBLICATIONS

Kirkland, A.I., et al, "Super-resolution by aperture synthesis: tilt series reconstruction in CTEM," Elsevier Science B.V., Ultramicroscopy 57, Mar. 1995, pp. 355-374. <doi: 10.1016/0304-3991(94)00191-O>.

Kittler, H., et al, "Morphologic changes of pigmented skin lesions: A useful extension of the ABCD rule for dermatoscopy," Journal of the American Academy of Dermatology (JAAD), Apr. 1999. vol. 40, No. 4, pp. 558-562. <doi: 10.1016/S0190-9622(99)70437-8>.

Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.

Kozak, I., "Retinal imaging using adaptive optics technology," Saudi Journal of Ophthalmology, vol. 28, No. 2, Feb. 25, 2014, pp. 117-122. <doi:10.1016/j.sjopt.2014.02.005>.

Lauer, V., "New Approach to optical diffraction tomography yielding a vector equation of diffraction tomography and a novel tomographic microscope," Journal of Microscopy, Feb. 2002, vol. 205, No. 2, pp. 165-176. <doi: 10.1046/j.0022-2720.2001.00980.x>.

Lee, K., et al, "Synthetic Fourier transform light scattering," Optics Express, vol. 21, No. 19, Sep. 23, 2013, pp. 22453-22463. <doi:10.1364/OE.21.022453>.

Levoy, M., et al, "Light field microscopy," ACM Transactions Graphics, vol. 25, No. 3, proceedings of ACM SIGGRAPH Jul. 2006, pp. 1-11. [doi: 10.1145/1141911.1141976].

Levoy, M., et al, "Recording and controlling the 4D light field in a microscope using microlens arrays," Journal of Microscopy, vol. 235, Pt. 2, Aug. 2009, pp. 144-162. <doi:10.1111/j.1365-2818.2009.03195.x>.

Li, X., et al, "Sparse Signal Recovery from Quadratic Measurements via Convex Programming," SIAM Journal on Mathematical Analysis, vol. 45, No. 5, Sep. 26, 2013, pp. 3019-3033. [doi:10.1137/120893707] [retrieved Feb. 13, 2014] <URL: http://dx.doi.org/10.1137/120893707>.

Lohmann, A. W., et al, "Space—bandwidth product of optical signals and systems," Journal of the Optical Society of America A, vol. 13, No. 3, Mar. 1996, pp. 470-473. <doi: 10.1364/JOSAA.13.000470>.

Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.

Lue, N., et al, "Live Cell Refractometry Using Hilbert Phase Microscopy and Confocal Reflectance Microscopy," NIH-PA *Author Manuscript*, available in PMC Apr. 22, 2010. Published in final edited form as: J Phys Chem A. Nov. 26, 2009; 113(47); 13327-13330. <PMCID: PMC2858636>.

Luxexcel® Brochure, "Luxexcel: 3D Printing Service Description" pp. 1-5 [retrieved on Mar. 7, 2016] <URL: http://www.luxexcel.com>.

Lytro | Illum, Lytro-Products [webpages], pp. 1-6. [Online] [retrieved Oct. 23, 2015] <URL:https://www.lytro.com/>.

Ma, W., et al, "Rapid Acquisition of Specular and Diffuse Normal Maps from Polarized Spherical Gradient Illumination," EGSR'07 Proceedings of the 18th Eurographics conference on Rendering Techniques, Eurographics Association, Aire-la-Ville, Switzerland 2007, pp. 183-194. <doi: 10.2312/EGWR/EGSR07/183-194>.

Mahajan, V. N., "Zernike Circle Polynomials and Optical Aberrations of Systems with Circular Pupils," Engineering Laboratory Notes: Supplemental to *Applied Optics*, vol. 33 No. 34, Dec. 1, 1994, pp. 8121-8124. <doi: 10.1364/AO.33.008121>.

Maiden, A. M., et al, "A new method of high resolution, quantitative phase scanning microscopy," in Proceedings of SPIE, Jun. 2, 2010, vol. 7729, pp. 77291I-1-77291I-8. <doi: 10.1117/12.853339> [retrieved on Dec. 16, 2015] <URL: proceedings.spiedigitallibrary.org>.

Maiden, A. M., et al, "An improved ptychographical phase retrieval algorithm for diffractive imaging," Ultramicroscopy, vol. 109, No. 10, Sep. 2009, pp. 1256-1262. <doi: 10.1016/j.ultramic.2009.05.012>.

Maiden, A. M., et al, "Superresolution imaging via ptychography," Journal of the Optical Society of America A. (JOSAA), vol. 28, No. 4, Apr. 1, 2011, pp. 604-612. <doi: 10.1364/JOSAA.28.000604>.

Maiden, A. M., et al, "Optical ptychography: a practical implementation with useful resolution," Optics Letters, vol. 35, No. 15, Aug. 1, 2010, pp. 2585-2587. <doi: 10.1364/OL.35.002585>.

Marchesini S., "Invited Article: A unified evaluation of iterative projection algorithms for phase retrieval," Review of Scientific Instruments, vol. 78, No. 1, Apr. 19, 2007, pp. 011301-1-011301-10. <doi: 10.1063/1.2403783> [retrieved May 7, 2014] <URL: http://dx.doi.org/10.1063/1.2403783>.

Marchesini S., et al, pre-published manuscript of "Augmented projections for ptychographic imaging," (Submitted on Sep. 21, 2012 (v1), last revised Aug. 29, 2013 (this version, v5)) pp. 1-18. Published in Inverse Problems vol. 29, No. 11 (2013). [retrieved on Nov. 9, 2015] <URL: https://arxiv.org/pdf/1209.4924>.

Marrison, J., et al, "Ptychography—a label free, high-contrast imaging technique for live cells using quantitative phase information," Scientific Reports, vol. 3, No. 2369, Aug. 6, 2013, pp. 1-7. <doi: 10.1038/srep02369>.

Medoff, B.P., et al, "Iterative convolution backprojection algorithms for image reconstruction from limited data," Journal of the Optical Society of America, vol. 73, No. 11, Nov. 1, 1983, pp. 1493-1500. <doi: 10.1364/JOSA.73.001493>.

Melafind, Optics by Carl Zeiss, MELA Sciences 2015, pp. 1-4. [Webpage] [retrieved Oct. 23, 2015] <URL: http://www.melafind.com/>.

Meyer, R.R., et al, "A new method for the determination of the wave aberration function of high-resolution TEM. 2. Measurement of the antisymmetric aberrations," Ultramicroscopy, vol. 99, No. 2-3, May 2004, pp. 115-123. <doi: 10.1016/j.ultramic.2003.11.001>.

Miao, J., et al, "High Resolution 3D X-Ray Diffraction Microscopy," Physical Review Letters, vol. 89, No. 8, Aug. 19, 2002, pp. 088303-1-088303-4. <doi: 10.1103/PhysRevLett.89.088303>.

Mico, V., et al, "Synthetic aperture microscopy using off-axis illumination and polarization coding," Optics Communications, vol. 276, No. 2, Aug. 15, 2007, pp. 209-217. <doi: 10.1016/j.optcom.2007.04.020>.

Mico, V., et al, "Synthetic aperture superresolution with multiple off-axis holograms," Journal of the Optical Society of America A, vol. 23, No. 12, Dec. 1, 2006, pp. 3162-3170. <doi:10.1364/JOSAA.23.003162>.

Mir, M. et al, "Optical measurement of cycle-dependent cell growth," Proceedings of the National Academy of Sciences (PNAS) vol. 108, No. 32, Aug. 9, 2011, pp. 13124-13129. <doi:10.1073/pnas.1100506108>.

Mir, M., et al, "Blood screening using diffraction phase cytometry," Journal of Biomedical Optics: vol. 15, No. 2, Mar./Apr. 2010, pp. 027016-1-027014-4. <doi:10.1117/1.3369965> [retrieved on Feb. 6, 2015] <URL:http://dx.doi.org/10.1117/1.3369965>.

Moreno, I., "Creating a desired lighting pattern with an LED array," Proceedings of SPIE, Eighth International Conference on Solid State Lighting, vol. 705811, Sep. 2, 2008, pp. 9. <doi:10.1117/12.795673>.

Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. <doi: 10.3928/23258160-20141118-12>.

Nayar, S. K., et al, pre published manuscript of "Fast separation of direct and global components of a scene using high frequency illumination," (Submitted 2006, this one (v.1)), Published in: ACM SIGGRAPH 2006 Papers, Boston, Massachusetts Jul.-Aug. 3, 2006, pp. 935-944. <doi: http://dx.doi.org/10.1145/1179352.1141977>.

Ng, R., et al, "Light Field Photography with a Hand-held Plenoptic Camera," Stanford Tech Report, Computer Science Technical Report (CSTR) Apr. 20, 2005, vol. 2, No. 11, pp. 1-11. <URL: https://classes.soe.ucsc.edu/cmps290b/Fall05/readings/lfcamera-150dpi.pdf>.

Nomura, H., et al., "Techniques for measuring aberrations in lenses used in photolithography with printed patterns," Applied Optics, vol. 38, No. 13, May 1, 1999, pp. 2800-2807. <doi: 10.1364/AO.38.002800>.

(56) References Cited

OTHER PUBLICATIONS

Ohlsson, H., et al, "Compressive Phase Retrieval From Squared Output Measurements Via Semidefinite Programming," arXiv:1111.6323, Technical Report; Nov. 28, 2011, pp. 6. <URL: http://cds.cern.ch/record/1402765>.

Ou, X., et al, "High numerical aperture Fourier ptychography: principle, implementation and characterization," Optics Express, vol. 23, No. 3, Feb. 9, 2015, pp. 3472-3491. <doi: 10.1364/oe.23.003472>.

Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.

Ou, X., et al, "Quantitative phase imaging via Fourier ptychographic microscopy," NIH-PA *Author Manuscript*; available in PMC Dec. 26, 2014. Published in final edited form as: Opt Lett. Nov. 15, 2013; 38(22): 4845-4848. <doi: 10.1364/OL.38.004845>.

Ou. X., et al, "Embedded pupil function recovery for Fourier ptychographic microscopy," Optics Express, vol. 22, No. 5, Mar. 10, 2014, pp. 4960-4972. <doi:10.1364/OE.22.004960> *Erratum Attached*, dated Dec. 28, 2015, vol. 23, No. 26, p. 33027. <doi:10.1364/OE.23.033027>.

Ou. X., et al, pre-published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. <doi: 10.1364/OE.22.004960>.

Pacheco, S., et al, "Reflective Fourier Ptychography," Journal of Biomedical Optics, vol. 21, No. 2, Feb. 18, 2016, pp. 026010-1-026010-7. <doi: 10.1117/1.JBO.21.2.026010> [retrieved on Mar. 8, 2016] <URL: http://biomedicaloptics.spiedigitallibrary.org>.

Phillips, Z., et al, "Multi-Contrast Imaging and Digital Refocusing on a Mobile Microscope with a Domed LED Array," PLoS One, vol. 10, No. 5, May 13, 2015, pp. 1-13. <doi:10.1371/journal.pone.0124938>.

Recht, B., et al, "Guaranteed Minimum-Rank Solutions of Linear Matrix Equations via Nuclear Norm Minimization," SIAM Review, vol. 52, No. 3, Aug. 5, 2010, pp. 471-501. <doi: 10.1137/070697835> [retrieved on Nov. 20, 2015] <URL: https://doi.org/10.1137/070697835>.

Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.

Rodenburg, J. M., et al, "A phase retrieval algorithm for shifting illumination," Applied Physics Letters, vol. 85, No. 20, Nov. 15, 2004, pp. 4795-4797. <doi: 10.1063/1.1823034>.

Rodenburg, J. M., et al, "Hard-X-ray Lensless Imaging of Extended Objects," Physical Review Letters, vol. 98, No. 3, Jan. 19, 2007, pp. 034801-1-034801-4. <doi: 10.1103/PhysRevLett.98.034801>.

Rodenburg, J. M., et al, "The Theory of Super-Resolution Electron Microscopy Via Wigner-Distribution Deconvolution," Philosophical Transactions of the Royal Society A, vol. 339, No. 1655, Jun. 15, 1992, pp. 521-553. <doi: 10.1098/rsta.1992.0050>.

Rodenburg, J.M., "Ptychography and related Diffractive Imaging Methods," Adv. Imaging Electron Phys., vol. 150, Dec. 31, 2008, pp. 87-184. <doi: 10.1016/S1076-5670(07)00003-1>.

Rossi, E.A., et al, "In vivo imaging of retinal pigment epithelium cells in age related macular degeneration," Biomedical Optics Express, vol. 4, No. 11, Nov. 1, 2013, pp. 2527-2539. <doi: 10./1364/BOE.4.002527].

Rowe, M., et al, "Polarization-difference imaging: a biologically inspired technique for observation through scattering media," Optics Letters, vol. 20, No. 6, Mar. 15, 1995, pp. 608-610. <doi:10.1364/OL.20.000608>.

Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.

Schechner, Y., "Multiplexing for Optimal Lighting," IEEE Transactions on Pattern Analysis and Machine Intelligence, vol. 29, No. 8, Aug. 2007, pp. 1339-1354. <doi: 10.1109/TPAMI.2007.1151.>.

Schnars, U., et al, "Digital recording and numerical reconstruction of holograms," Measurement Science and Technology, vol. 13, No. 9, Aug. 7, 2002, pp. R85-R101. <doi: 10.1088/0957-0233/13/9/201>.

Schwarz, C., et al, "Imaging interferometric microscopy," Optics letters, vol. 28, No. 16, Aug. 15, 2003, pp. 1424-1426. <doi: 10.1364/OL.28.001424>.

Shechner, Y., et al, "Polarization-based vision through haze," Applied Optics, vol. 42, No. 3, Jan. 20, 2003, pp. 511-525. <doi: 10.1364/AO.42.000511>.

Shechtman, Y., et al, "Sparsity based sub-wavelength imaging with partially incoherent light via quadratic compressed sensing," Optics Express, vol. 19, No. 16, Aug. 1, 2011, pp. 14807-14822. <doi:10.1364/OE.19.014807>.

Siegel, R., et al, "Cancer Statistics 2013," CA: A Cancer Journal for Clinicians, vol. 63, No. 1, Jan. 1, 2013, pp. 11-30. <doi:10.3322/caac.21166>.

Stoecker, W., et al, "Diagnostic Inaccuracy of Smartphone Applications for Melanoma Detection: Representative Lesion Sets and the Role for Adjunctive Technologies," JAMA Dermatology, vol. 149, No. 7, Jul. 1, 2013, pp. 884-884. <doi:10.1001/jamadermatol.2013.4334>.

Sun, D., et al, "Estimating a signal from a magnitude spectrogram via convex optimization," arXiv preprint arXiv:1209.2076, Sep. 10, 2012, pp. 1-7. [retrieved Nov. 9, 2015] <URL: https://arxiv.org/abs/1209.2076>.

Sun, J., "Coded multi-angular illumination for Fourier ptychography based on Hadamard codes," In Proc. SPIE, vol. 9524, Jul. 17, 2015, pp. 95242C-1-94242C-5. <doi:10.1117/12.2189655> [retrieved Jul. 23, 2015] <URL: http://proceedings.spiedigitallibrary.org>.

Tam, K., et al, "Tomographical imaging with limited-angle input," Journal of the Optical Society of America, vol. 71, No. 5, May 1981, pp. 582-592. <doi:doi.org/10.1364/JOSA.71.000582>.

Thibault, P. et al, "Probe retrieval in ptychographic coherent diffractive imaging," Ultramicroscopy, vol. 109, No. 4, Mar. 2009, pp. 338-343. <doi:10.1016/j.ultramic.2008.12.011>.

Thibault, P., et al, "High-resolution scanning X-ray diffraction microscopy," Science AAAS, vol. 321, No. 5887, Jul. 18, 2008, pp. 379-382. <doi:10.1126/science.1158573>.

Thomas, L., et al, "Semiological Value of ABCDE Criteria in the Diagnosis of Cutaneous Pigmented Tumors," Dermatology, vol. 197, No. 1, Jul. 13, 1998, p. 11-17. <doi:10.1159/000017969>.

Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.

Tian, L., et al, "Computional illumination for high-speed in vitro Fourier ptychographic microscropy," Optica: Research Article, vol. 2, No. 10, Oct. 14, 2015, pp. 904-911. <doi:10.1364/OPTICA.2.000904>.

Tian, L., et al, "Multiplexed Coded Illumination for Fourier Ptychography with an LED Array Microscope," Biomedical Optics Express, vol. 5, No. 7, Jul. 1, 2014, pp. 14. <doi:10.1364/BOE.5.002376>.

Tippie, A.E., et al, "High-resolution synthetic-aperture digital holography with digital phase and pupil correction," Optics Express, vol. 19, No. 13, Jun. 20, 2011, pp. 12027-12038. <doi:10.1364/OE.19.012027>.

Turpin, T., et al, "Theory of the synthetic aperture microscope," SPIE Proceedings, vol. 2566: Advanced Imaging Technologies and Commercial Applications, Aug. 23, 1995, pp. 230-240. [retrieved Mar. 16, 2015] <URL: http://dx.doi.org/10.1117/12.217378>.

Tyson, R., "Principles of Adaptive Optics" Third Ed., Series in Optics and Optoelectronics, CRC Press, Sep. 14, 2010, pp. 1-299. <ISBN: 13: 978-1-4398-0859-7>.

Vulovic, M., et al, "When to use the projection assumption and the weak-phase object approximation in phase contrast cryo-EM," Ultramicroscopy, vol. 136, Jan. 2014, pp. 61-66.<doi:10.1016/j.ultramic.2013.08.002>.

(56) References Cited

OTHER PUBLICATIONS

Waldspurger, I., et al, "Phase recovery, MaxCut and complex semidefinite programming," Mathematical Programming, vol. 149, No. 1-2, Feb. 2015, pp. 47-81. <doi:10.1007/s10107-013-0738-9>.

Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. <doi:10.1167/iovs.14-15576> [retrieved on Apr. 5, 2016] [URL: http://iovs.arvojournals.org].

Wang, Z., et al, "Tissue refractive index as marker of disease," Journal of Biomedical Optics, vol. 16, No. 11, Nov. 2011, pp. 116017-1-16017-7. <doi: 10.1117/1.3656732>.

Watanabe, M., et al, "Telecentric optics for focus analysis," IEEE Transactions on Pattern Analysis and Machine Intelligence: Short Papers, vol. 19, No. 12, Dec. 1997, pp. 1360-1365. <doi:10.1109/34.643894>.

Wesner, J., et al, "Reconstructing the pupil function of microscope objectives from the intensity PSF," Proc. SPIE 4767, Current Developments in Lens Design and Optical Engineering III, 32 (Oct. 1, 2002), pp. 32-43. <doi:10.1117/12.451320> [retrieved Dec. 16, 2015] <URL:http://proceedings.spiedigitallibrary.org>.

Williams, A., et al, "Fourier ptychographic microscopy for filtration-based circulating tumor cell enumeration and analysis," Journal of Biomedical Optics, vol. 19, No. 6, Jun. 20, 2014, pp. 066007.1-66007.8. <doi:10.1117/1.JBO.19.6.066007> [retrieved Feb. 10, 2016] <URL:http://biomedicaloptics.spiedigitallibrary.org>.

Wolf, J., et al, "Diagnostic Inaccuracy of Smartphone Applications for Melanoma Detection," JAMA Dermatol. *Author Manuscript*; available in PMC May 13, 2014. Published in final edited form as: JAMA Dermatol. Apr. 2013; 149(4): 422-426. <doi:10.1001/jamadermatol.2013.2382>.

Wu, J., et al, "Focal plane tuning in wide-field-of-view microscope with Talbot pattern illumination," Optics Letters, vol. 36, No. 12, Jun. 15, 2011, pp. 2179-2181. <doi: 145985>.

Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. <doi:10.1364/OE.15.018141>.

Wu, J., et al, "Paired-angle-rotation scanning optical coherence tomography forward-imaging probe," Optics Letters, vol. 31, No. 9, May 1, 2006, pp. 1265-1267. <doi:10.1364/OL.31.001265>.

Wu, J., et al, "Wide field-of-view microscope based on holographic focus grid illumination," Optics Letters, vol. 35, No. 13, Jul. 1, 2010, pp. 2188-2190. <doi:10.1364/OL.35.002188>.

Xu, W., et al, "Digital in-line holography for biological applications," Proceedings of the National Academy of Sciences of the USA (PNAS), vol. 98, No. 20, Sep. 25, 2001, pp. 11301-11305. <doi:10.1073/pnas.191361398>.

Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.

Yuan, C., et al, "Angular multiplexing in pulsed digital holography for aperture synthesis," Optics Letters, vol. 33, No. 20, Oct. 15, 2008, pp. 2356-2358. <doi:10.1364/OL.33.002356>.

Zeiss, C., "Microscopy: Cells Need the Perfect Climate. System Solutions for Live Cell Imaging under Physiological Conditions," ZEISS Product Brochure, Carl Zeiss Microscopy GmbH Co., Feb. 2008, pp. 42. <URL: http://www.zeiss.de/incubation>.

Zhang, Y., et al, "Self-learning based Fourier ptychographic microscopy," Optics Express, vol. 23, No. 14, Jul. 13, 2015, pp. 18471-18486. <doi: 10.1364/OE.23.018471>.

Zhang, Y., et al, "Photoreceptor perturbation around subretinal drusenoid deposits as revealed by adaptive optics scanning laser ophthalmoscopy," HHS Public Access, Am J Ophthalmol. *Author Manuscript*, Sep. 1, 2015, pp. 22. (Published in final edited form as: Am J Ophthalmol. Sep. 2014; 158(3): 584-96.e1.).

Zheng, G. "The ePetri dish, an on-chip cell imaging platform based on subpixel perspective sweeping microscopy (SPSM)," PNAS Early Edition, Published online before print Oct. 3, 2011, pp. 6. <doi:10.1073/pnas.1110681108>.

Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi: 10.1088/978-1-6817-4273-1>.

Zheng, G., et al, "Characterization of spatially varying aberrations for wide field-of-view microscopy," Optics Express, vol. 21, No. 13, Jul. 1, 2013, pp. 15131-15143. <doi:10.1364/OE.21.015131>.

Zheng, G., et al, "Microscopy refocusing and dark-field imaging by using a simple LED array," Optics Letters, vol. 36, No. 20, Oct. 15, 2011, pp. 3987-3989. <doi: 10.1364/OL.36.003987>.

Zheng, G., et al, "0.5 gigapixel microscopy using a flatbed scanner," Biomedical Optics Express, vol. 5, No. 1, Jan. 1, 2014, pp. 1-8. <doi: 10.1364/BOE.5.000001>.

Zheng, G., et al, "Sub-pixel resolving optofluidic microscope for on-chip cell imaging," Lab Chip, vol. 10, Sep. 29, 2010, pp. 3125-3129. <doi:10.1039/c0Lc00213e> [retrieved on Oct. 4, 2010] <URL: http://pubs.rsc.org>.

Zheng, G., et al, "Wide-field, high-resolution Fourier ptychographic microscopy," HHS Public Access, Nat. Photonics. *Author Manuscript*;available in PMC Sep. 19, 2014, pp. 1-16. (Published in final edited form as: Nat Photonics. Sep. 1, 2013; 7(9): 739-745. <doi:10.1038/nphoton.2013.187>).

Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.

U.S. Appl. No. 15/620,674, filed Jun. 12, 2017, Chung, J. et al.

Office Action Interview Summary dated May 3, 2018 in U.S. Appl. No. 15/068,389.

Final Office Action dated Jun. 6, 2018 issued in U.S. Appl. No. 15/068,389.

Office Action dated Nov. 30, 2017 in U.S. Appl. No. 15/007,159.

Notice of Allowance dated Dec. 4, 2017 in U.S. Appl. No. 14/065,305.

Final Office Action dated Dec. 14, 2017 in U.S. Appl. No. 14/960,252.

Final Office Action dated Dec. 28, 2017 in U.S. Appl. No. 14/710,947.

Final Office Action dated Jan. 17, 2018 in U.S. Appl. No. 14/658,019.

Notice of Allowance dated Jan. 23, 2018 in U.S. Appl. No. 15/206,859.

Office Action dated Jan. 25, 2018 in U.S. Appl. No. 14/065,280.

Notice of Allowance dated Jan. 26, 2018 in U.S. Appl. No. 15/209,604.

Notice of Allowance dated Feb. 9, 2018 in U.S. Appl. No. 15/081,659.

Office Action dated Apr. 4, 2018 issued in U.S. Appl. No. 15/003,559.

Office Action dated Apr. 13, 2018 issued in U.S. Appl. No. 15/160,941.

International Preliminary Report on Patentability dated Nov. 30, 2017 issued in PCT/US2016/033638.

Australian Examination Report 1/Office Action dated Jan. 18, 2018 issued in AU 2014308673.

Chinese First Office Action dated Feb. 24, 2018 issued in CN 201680003937.1.

Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.

Jenson, et al. "Types of imaging, Part 2: An Overview of Fluorescence Microscopy." The Anatomical Record, vol. 295, No. 10, Oct. 1, 2012, pp. 1621-1627.

Sarder, et al. "Deconvolution Methods for 3-D Fluorescence Microscopy Images," IEEE Signal Processing Magazine, vol. 23, No. 3, May 2006, pp. 32-45.

Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/2017/april/synthetic_apertures_for_the_optical_domain/>.

U.S. Appl. No. 15/963,966, filed Apr. 26, 2018, Ou et al.

U.S. Appl. No. 15/959,050, filed Apr. 20, 2018, Horstmeyer et al.

Notice of Allowance dated Oct. 19, 2018 issued in U.S. Appl. No. 15/160,941.

U.S. Final Office Action dated Nov. 29, 2018 in U.S. Appl. No. 14/065,280.

U.S. Office Action dated Dec. 26, 2018 in U.S. Appl. No. 15/963,966.

(56) References Cited

OTHER PUBLICATIONS

U.S. Office Action dated Dec. 26, 2018 in U.S. Appl. No. 15/959,050.
U.S. Office Action dated Oct. 4, 2018 in U.S. Appl. No. 14/658,019.
U.S. Notice of Allowance dated Jul. 25, 2018 in U.S. Appl. No. 14/710,947.
U.S. Office Action dated Dec. 13, 2018 in U.S. Appl. No. 14/960,252.
U.S. Notice of Allowance dated Jun. 27, 2018 in U.S. Appl. No. 15/636,494.
U.S. Notice of Allowance dated Oct. 5, 2018 in U.S. Appl. No. 15/636,494.
U.S. Notice of Allowance dated Jul. 16, 2018 in U.S. Appl. No. 15/007,159.
U.S. Office Action dated Sep. 7, 2018 in U.S. Appl. No. 14/979,154.
U.S. Final Office Action dated Dec. 10, 2018 issued in U.S. Appl. No. 15/003,559.
U.S. Notice of Allowance dated Oct. 19, 2018 issued in U.S. Appl. No. 15/160,941.
Japanese First Office Action dated Jul. 31, 2018 issued in Application No. JP 2016531919.
European Extended Search Report dated Jun. 6, 2018 issued in Application No. 15865492.1.
Extended European Search Report dated Aug. 8, 2018 issued in Application No. EP 16744002.3.
European Extended Search Report dated Aug. 14, 2018 issued in EP 16744003.1.
Extended European Search Report dated Jul. 3, 2018 issued in Application No. EP 15874344.3.
Extended European Search Report dated Sep. 12, 2018 issued in Application No. Ep 16740769.1.
Chinese Second Office Action dated Jul. 3, 2018 issued in Application No. CN 201480054301.0.
Extended European Search Report dated Oct. 25, 2018 issued in Application No. EP 16765505.9.
Chinese Third Office Action dated Jul. 13, 2018 issued in CN 201480057911.6.
Godden, T.M. et al., "Ptychographic microscope for three-dimensional imaging," Optics Express, vol. 22, No. 10, May 19, 2014, pp. 12513-12523.
Jacques, et al., "Imaging Superficial Tissues With Polarized Light," Lasers in Surgery and Medicine, vol. 26, No. 2, Apr. 25, 2000, pp. 119-129.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
U.S. Appl. No. 16/162,271, dated Oct. 16, 2018, Kim et al.
U.S. Appl. No. 16/171,270, dated Oct. 25, 2018, Horstmeyer et al.
U.S. Appl. No. 16/179,688, dated Nov. 2, 2018, Chan et al.
U.S. Appl. No. 16/242,934, dated Jan. 8, 2019, Kim et al.
U.S. Office Action dated Mar. 8, 2019 in U.S. Appl. No. 16/171,270.
U.S. Office Action dated Jan. 17, 2019 issued in U.S. Appl. No. 15/068,389.
U.S. Notice of Allowance dated Jan. 15, 2019 issued in U.S. Appl. No. 15/620,674.
Chinese First Office Action dated Jan. 28, 2019 issued in CN 201580072950.8.
Chinese First Office Action dated Dec. 28, 2018 issued in Application No. CN 201680005491.6.
Chinese First Office Action dated Dec. 26, 2018 issued in Application No. CN 201580067354.0.
International Search Report and Written Opinion dated Feb. 22, 2019 issued in PCT/US2018/059059.
Pankajakshan, P., "Blind Deconvolution for Confocal Laser Scanning Microscopy," Doctoral dissertation, Universite Nice Sophia Antipolis, 2009. <URL: https://tel.archives-ouvertes.fr/tel-00474264>.
U.S. Appl. No. 16/252,465, dated Jan. 18, 2019, Ou et al.
U.S. Office Action dated Apr. 4, 2019 in U.S. Appl. No. 16/162,271.
U.S. Notice of Allowance dated Apr. 19, 2019 in U.S. Appl. No. 15/963,966.
Chinese First Office Action dated Apr. 19, 2019 issued in Application No. CN 201680006738.6.
Chinese First Office Action dated Apr. 19, 2019 issued in Application No. CN 201680014898.5.
U.S. Office Action dated Jun. 26, 2019 issued in U.S. Appl. No. 14/065,280.
U.S. Final Office Action dated Jun. 3, 2019 in U.S. Appl. No. 15/959,050.
U.S. Final Office Action dated May 30, 2019 in U.S. Appl. No. 14/658,019.
U.S. Final Office Action dated May 30, 2019 in U.S. Appl. No. 14/979,154.
U.S. Office Action dated Jun. 26, 2019 in U.S. Appl. No. 15/003,559.
U.S. Final Office Action dated Jun. 19, 2019 issued in U.S. Appl. No. 15/068,389.
U.S. Notice of Allowance dated Apr. 29, 2019 issued in U.S. Appl. No. 15/620,674.

* cited by examiner

EMBEDDED PUPIL FUNCTION RECOVERY FOR FOURIER PTYCHOGRAPHIC IMAGING DEVICES

CROSS-REFERENCES TO RELATED APPLICATIONS

This application is a continuation of U.S. patent application Ser. No. 14/572,493, titled "EMBEDDED PUPIL FUNCTION RECOVERY FOR FOURIER PTYCHOGRAPHIC IMAGING DEVICES," filed on Dec. 16, 2014, which is a continuation-in-part application of U.S. patent application Ser. No. 14/065,280, titled "FOURIER PTYCHOGRAPHIC IMAGING SYSTEMS, DEVICES, AND METHODS" and filed on Oct. 28, 2013, which claims priority to U.S. Provisional Patent Application No. 61/720,258, titled "Breaking the Spatial Product Barrier via Non-Interferometric Aperture-Synthesizing Microscopy (NAM)" and filed on Oct. 30, 2012 and to U.S. Provisional Patent Application No. 61/847,472, titled "Fourier Ptychographic Microscopy" and filed on Jul. 17, 2013; U.S. patent application Ser. No. 14/572,493 is also a continuation-in-part application of U.S. patent application Ser. No. 14/466,481 titled "VARIABLE-ILLUMINATION FOURIER PTYCHOGRAPHIC IMAGING DEVICES, SYSTEMS, AND METHODS," filed on Aug. 22, 2014 (now U.S. Pat. No. 9,497,379), which claims priority to U.S. Provisional Patent Application No. 61/899,715, titled "Increasing Numerical Aperture of Dry Objective to Unity via Fourier Ptychographic Microscopy" and filed on Nov. 4, 2013, U.S. Provisional Patent Application No. 61/868,967, titled "Alternative Optical Implementations for Fourier Ptychographic Microscopy" and filed on Aug. 22, 2013, and U.S. Provisional Patent Application No. 62/000,722, titled "Ultra-High NA Microscope via Fourier Ptychographic Microscopy" and filed on May 20, 2014; and U.S. patent application Ser. No. 14/572,493 also claims benefit of U.S. Provisional Patent Application No. 61/968,833 titled "Sharp Focus Generation via EPRY-FPM and Adaptive Optics," filed on Mar. 21, 2014, U.S. Provisional Patent Application No. 61/916,981, titled "Embedded Pupil Function Recovery for Fourier Ptychographic Microscopy," filed on Dec. 17, 2013, and U.S. Provisional Patent Application No. 61/944,380 titled "Embedded Pupil Function Recovery for Fourier Ptychographic Microscopy," filed on Feb. 25, 2014; each of the related applications is hereby incorporated by reference in its entirety and for all purposes.

FEDERALLY SPONSORED RESEARCH OR DEVELOPMENT

This invention was made with government support under Grant No. OD007307 awarded by the National Institutes of Health. The government has certain rights in the invention.

BACKGROUND

Certain embodiments described herein generally relate to imaging techniques. More specifically, certain aspects pertain to Fourier ptychographic imaging methods that implement an embedded pupil function recovery technique.

Imaging lenses ranging from microscope objectives to satellite-based cameras are physically limited in the total number of features they can resolve. These limitations are a function of the point-spread function (PSF) size of the imaging system and the inherent aberrations across its image plane field of view (FOV). Referred to as the space-bandwidth product, the physical limitation scales with the dimensions of the lens but is usually on the order of 10 megapixels regardless of the magnification factor or numerical aperture (NA). A discussion of space-bandwidth product of conventional imaging systems can be found in Lohmann, A. W., Dorsch, R. G., Mendlovic, D., Zalevsky, Z. & Ferreira, C., "Space-bandwidth product of optical signals and systems," *J. Opt. Soc. Am. A.* 13, pages 470-473 (1996), which is hereby incorporated by reference for this discussion. While conventional imaging systems may be able to resolve up to 10 megapixels, there is typically a tradeoff between PSF and FOV. For example, certain conventional microscope objectives can offer a sharp PSF (e.g., 0.5 µm) across a narrow FOV (e.g., 1 mm), while others imaging systems with wide-angle lenses can offer a wide FOV (e.g., 10 mm) at the expense of a blurry PSF (e.g., 5 µm).

Certain interferometric synthetic aperture techniques that try to increase spatial-bandwidth product are described in Di, J. et al., "High resolution digital holographic microscopy with a wide field of view based on a synthetic aperture technique and use of linear CCD scanning," *Appl. Opt.* 47, pp. 5654-5659 (2008); Hillman, T. R., Gutzler, T., Alexandrov, S. A., and Sampson, D. D., "High-resolution, wide-field object reconstruction with synthetic aperture Fourier holographic optical microscopy," *Opt. Express* 17, pp. 7873-7892 (2009); Granero, L., Micó, V., Zalevsky, Z., and Garcia, J., "Synthetic aperture superresolved microscopy in digital lensless Fourier holography by time and angular multiplexing of the object information," *Appl. Opt.* 49, pp. 845-857 (2010); Kim, M. et al., "High-speed synthetic aperture microscopy for live cell imaging," *Opt. Lett.* 36, pp. 148-150 (2011); Turpin, T., Gesell, L., Lapides, J., and Price, C., "Theory of the synthetic aperture microscope," pp. 230-240; Schwarz, C. J., Kuznetsova, Y., and Brueck, S., "Imaging interferometric microscopy," *Optics letters* 28, pp. 1424-1426 (2003); Feng, P., Wen, X., and Lu, R., "Long-working-distance synthetic aperture Fresnel off-axis digital holography," *Optics Express* 17, pp. 5473-5480 (2009); Mico, V., Zalevsky, Z., Garcia-Martinez, P., and Garcia, J., "Synthetic aperture superresolution with multiple off-axis holograms," *JOSA A* 23, pp.3162-3170 (2006); Yuan, C., Zhai, H., and Liu, H., "Angular multiplexing in pulsed digital holography for aperture synthesis," *Optics Letters* 33, pp. 2356-2358 (2008); Mico, V., Zalevsky, Z., and Garcia, J., "Synthetic aperture microscopy using off-axis illumination and polarization coding," *Optics Communications*, pp. 276, 209-217 (2007); Alexandrov, S., and Sampson, D., "Spatial information transmission beyond a system's diffraction limit using optical spectral encoding of the spatial frequency," *Journal of Optics A: Pure and Applied Optics* 10, 025304 (2008); Tippie, A. E., Kumar, A., and Fienup, J. R., "High-resolution synthetic-aperture digital holography with digital phase and pupil correction," *Opt. Express* 19, pp. 12027-12038 (2011); Gutzler, T., Hillman, T. R., Alexandrov, S. A., and Sampson, D. D., "Coherent aperture-synthesis, wide-field, high-resolution holographic microscopy of biological tissue," *Opt. Lett.* 35, pp. 1136-1138 (2010); and Alexandrov, S. A., Hillman, T. R., Gutzler, T., and Sampson, D. D., "Synthetic aperture Fourier holographic optical microscopy," *Phil. Trans. R. Soc. Lond. A* 339, pp. 521-553 (1992), all of which are hereby incorporated by reference for the discussion of attempts to increase spatial bandwidth. Most of the above-described interferometric synthetic aperture techniques include setups that record both intensity and phase information using interferometric holography such as off-line holography and phase-shifting holography. Interferometric holography has its limitations. For example, interferometric holography recordings typically use highly coherent light sources. As such, the constructed images typically suffer from coherent noise sources such as speckle noise, fixed pattern noise (induced by diffraction from dust particles and other optical imperfections in the beam path), and multiple interferences between different optical interfaces. Thus the image quality is typically worse than from a conventional microscope. On the other hand, using off-axis holography sacrifices spatial-bandwidth product (i.e., reduces total pixel number) of the image sensor. A discussion of certain off-axis holography methods can be found in Schnars, U. and Jüptner, W. P. O., "Digital recording and numerical reconstruction of holograms," *Measurement Science and Technology*, 13, R85 (2002), which is hereby incorporated by reference for this discussion. In addition, interferometric imaging techniques may subject to uncontrollable phase fluctuations between different measurements. Hence, accurate a priori knowledge of the sample location may be needed to set a reference point in the image recovery process. Another limitation is that many of these interferometric imaging systems require mechanical scanning to rotate the sample and thus precise optical alignments, mechanical control at a sub-micron level, and associated maintenances are required by these systems. In terms of spatial-bandwidth product, these interferometric imaging systems may present little to no advantage as compared with a conventional microscope.

Previous lensless microscopy such as in-line holography and contact-imaging microscopy also present drawbacks. For example, conventional in-line holography does not work well with contiguous samples and contact-imaging microscopy requires a sample to be in close proximity to the sensor. A discussion of certain digital in-line holography devices can be found in Denis, L., Lorenz, D., Thiebaut, E., Fournier, C. and Trede, D., "Inline hologram reconstruction with sparsity constraints," *Opt. Lett.* 34, pp. 3475-3477 (2009); Xu, W., Jericho, M., Meinertzhagen, I., and Kreuzer, H., "Digital in-line holography for biological applications," *Proc. Natl Acad. Sci. USA* 98, pp. 11301-11305 (2001); and Greenbaum, A. et al., "Increased space-bandwidth product in pixel super-resolved lensfree on-chip microscopy," *Sci. Rep.* 3, page 1717 (2013), which are hereby incorporated by reference for this discussion. A discussion of certain contact-imaging microscopy can be found in Zheng, G., Lee, S. A., Antebi, Y., Elowitz, M. B. and Yang, C., "The ePetri dish, an on-chip cell imaging platform based on subpixel perspective sweeping microscopy (SPSM)," Proc. Natl Acad. Sci. USA 108, pp. 16889-16894 (2011); and Zheng, G., Lee, S. A., Yang, S. & Yang, C., "Sub-pixel resolving optofluidic microscope for on-chip cell imaging," *Lab Chip* 10, pages 3125-3129 (2010), which are hereby incorporated by reference for this discussion.

A high spatial-bandwidth product is very desirable in microscopy for biomedical applications such as pathology, haematology, phytotomy, immunohistochemistry, and neuroanatomy. For example, there is a strong need in biomedicine and neuroscience to image large numbers of histology slides for evaluation. This need has prompted the development of sophisticated mechanical scanning and lensless microscopy systems. These systems increase spatial-bandwidth product using complex mechanisms with high precision to control actuation, optical alignment, and motion tracking. These complex mechanisms tend to be expensive to fabricate and difficult to use and maintain.

BRIEF SUMMARY

Certain embodiments described herein generally relate to imaging techniques. More specifically, certain aspects pertain to Fourier ptychographic imaging systems, devices, and methods that can be used in high resolution imaging applications such as, for example, pathology, haematology, semiconductor wafer inspection, and X-ray and electron imaging.

Certain embodiments pertain to a Fourier ptychographic imaging system employing embedded pupil function recovery. The Fourier ptychographic imaging system comprising a variable illuminator configured to illuminate a sample at a plurality of oblique illumination incidence angles, an objective lens configured to filter light issuing from the sample based on its numerical aperture, and a radiation detector configured to receive light filtered by the lens and capture a plurality of intensity images corresponding to the plurality of oblique illumination incidence angles. The Fourier ptychographic imaging system further comprises a processor configured to iteratively and simultaneously update a pupil function and a separate sample spectrum. The sample spectrum is updated iteratively for each illumination incidence angle at overlapping regions in the Fourier domain with Fourier transformed intensity image data. The overlapping regions correspond to the plurality of illumination incidence angles and the numerical aperture of the objective lens. In some cases, the processor is further configured to inverse transform the updated sample spectrum to determine an image of the sample, wherein the image has a higher resolution than the captured intensity images. In an adaptive optics embodiment, the Fourier ptychographic imaging system further comprises a wavefront modulator. In this case, the processor is further configured to determine an aberration from the updated pupil function and the wavefront modulator is configured to adaptively correct an incident wavefront based on the determined aberration.

Certain embodiments pertain to a Fourier ptychographic imaging method that employs embedded pupil function recovery. This method comprises illuminating a sample from a plurality of incidence angles using a variable illuminator and filtering light issuing from the sample using an optical element. The method further comprises capturing a plurality of variably-illuminated intensity image distributions of the sample using a radiation detector. In addition, the method simultaneously updates a pupil function and a separate sample spectrum. The sample spectrum is updated in overlapping regions with Fourier transformed variably-illuminated intensity images measurements. The overlapping regions correspond to the plurality of incidence angles and the numerical aperture of the lens. The method further comprises inverse Fourier transforming the recovered sample spectrum to recover an image having a higher resolution than the intensity images. In an adaptive optics embodiment, the Fourier ptychographic imaging method further comprises determining an aberration from the updated pupil function and adaptively correcting for the determined aberration using a wavefront modulator.

These and other features are described in more detail below with reference to the associated drawings.

DETAILED DESCRIPTION

Figure 1:
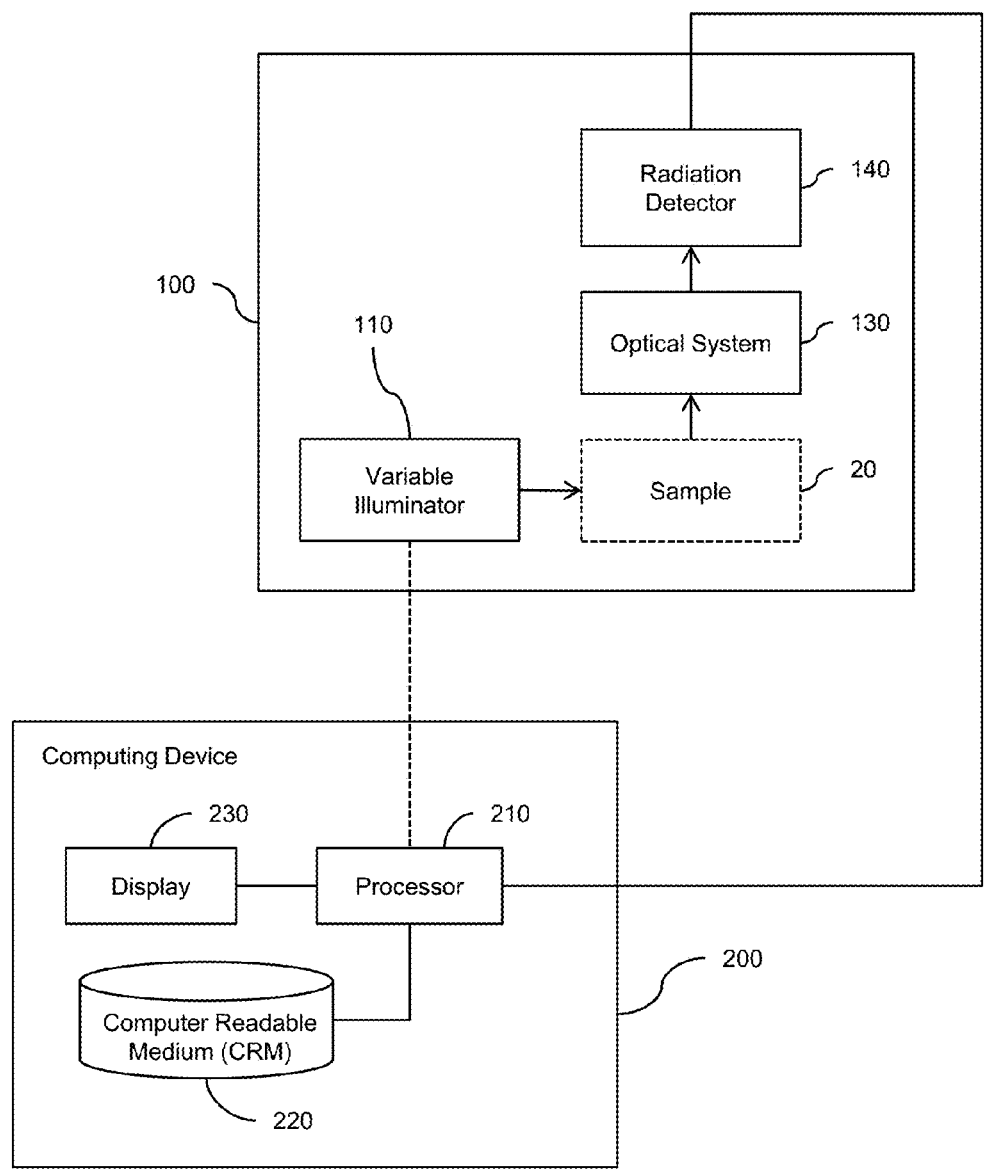
FIG. 1 is a block diagram of components of a Fourier ptychographic imaging system, according to embodiments.

Certain embodiments described herein pertain to Fourier ptychographic imaging systems, devices, and methods.

I. Fourier Ptychographic Imaging Systems

In certain embodiments, a Fourier ptychographic imaging system comprises a variable illuminator, an optical system, and a radiation detector. In some cases, the Fourier ptychographic imaging system may be in communication with a processor or further comprise a processor (e.g., microprocessor). The variable illuminator can illuminate (e.g., with plane wave illumination) a sample being imaged from a plurality of incidence angles at different sample times. The optical system can receive light issuing from the sample and propagate it to the radiation detector. The optical system comprises at least one filtering optical element that can "filter" light typically based on its acceptance angle. The radiation detector receives light from the optical system, and measures a light intensity distribution for each of the incidence angles to capture a plurality of intensity images of the sample corresponding to the different incidence angles. The image data for each intensity image is associated with a region in Fourier space. In the case of a filtering optical element in the form of a lens, the diameter of the region in Fourier space corresponds to the NA of the lens and the center of the region corresponds to the incidence angle of the illumination at that sample time. In certain aspects, components of the Fourier ptychographic imaging system (e.g., variable illuminator and filtering optical element) are configured to acquire light intensity distributions in the spatial domain that correspond to overlapping circular regions in the Fourier space. In some cases, the components and their incidence angles are designed to overlap the regions in Fourier space by a predefined amount and/or so that the overlapping regions cover a predefined area (e.g., an area that covers higher frequencies). For example, the NA of the filtering optical element and the number and locations of discrete light elements of a variable illuminator may be designed so that circular pupil regions in Fourier space overlap by a predefined amount. In one case, components may be designed so that the circular regions associated with adjacent incident angles overlap by a predefined percentage such as about 60%, about 70%, about 80%, about 90%, etc. in Fourier space. The processor may be configured to iteratively stitch together the overlapping image data in Fourier space. The overlapping image data in Fourier space can be used to generate a higher resolution image of the sample. In some cases, the Fourier ptychographic imaging system can correct for aberrations in the system. In some cases, the Fourier ptychographic imaging system can refocus the higher-resolution image.

The optical system comprises one or more components configured to collect light issuing from the sample and propagate it to the radiation detector. For example, the optical system may comprise a collection optical element configured to collect light issued from the sample. As another example, the optical system may comprise a filtering optical element configured to filter incident light. In one case, the filtering optical element is in the form of an objective lens, which filters light by rejecting incident light outside its acceptance angle and accepting light within its acceptance angle. In some cases, the collection optical element may also function as the filtering optical element. The optical system propagates the filtered light to the radiation detector, which measures (e.g., records) an intensity distribution at the radiation detector at M sample times, $t_{q=1 \ to \ M}$, to capture a plurality of M intensity images of the sample. In certain cases, M=N, i.e. an intensity measurement corresponds to each incidence angle.

In some embodiments, Fourier ptychographic imaging system comprises an optical system having a filtering optical element in the form of a relatively low NA objective lens (e.g., 2× lens with 0.08). This low NA system has a wide field-of-view (e.g., 13 mm in diameter) of the sample. In these cases, the system acquires intensity images with relatively low resolution due to the low NA optical element filtering light issuing from the sample. These intensity images correspond to smaller circular regions in Fourier space than if a higher NA optical element were used. In order to overlap these smaller circular regions in Fourier space by a certain amount (e.g., 70%, 75%, etc.), the variable illuminator in this system is configured to provide illumination with relatively short spacing (e.g., 0.05 rad) between adjacent incidence angles. Examples of a Fourier ptychographic system with a low NA filtering optical element for wide field-of-view imaging can be found in U.S. Patent Application Serial Number 14/065,280, titled "Fourier Ptychographic Imaging Systems, Devices, and Methods" and filed on Oct. 28, 2013 and in U.S. patent application Ser. No. 14/065,305, titled "Fourier Ptychographic X-ray Imaging Systems, Devices, and Methods," and in G. Zheng, R. Horstmeyer and C. Yang, "Wide-field, high-resolution Fourier ptychographic microscopy," Nature Photonics, 2013, which are hereby incorporated by reference in their entirety.

In some embodiments, Fourier ptychographic imaging system comprises an optical system having a filtering optical element with a relatively high NA (e.g., 20× lens with 0.5 NA) and/or a higher illumination NA to increase the combined system NA. Intensity images captured by this high NA system correspond to larger regions in Fourier space than intensity images captured with a low NA system. Since larger regions are covered, the variable illuminator can be configured with reduced spacing between adjacent incidence angles and with a reduced number N of incidence angles. In these systems, fewer intensity images may be needed to generate the same or higher resolution than with systems using a low NA filtering optical element. Since fewer intensity images may be needed, the image acquisition time may be shorter and may require fewer computing resources to generate an image with the same or higher resolution than the low NA system. Also, the variable illuminator can be of a simpler design (e.g., less dense LED matrix) since fewer light elements are needed to provide illumination from the reduced number N of incidence angles. In some cases, the variable illuminator may be further configured so that the difference between extreme incidence angles is larger (i.e., higher illumination NA) than with the low NA system described above. That is, a higher illumination NA allows for capturing of high frequency data at the outer regions in Fourier space which also improves the resolution of the final images. Thus, the high NA system with an increased illumination NA and/or an increased optical system NA can provide for an increased system NA that can improve resolution of images. This high NA system may be able to illuminate the sample with incidence angles that allow for acquisition of images that cover larger overlapping regions in Fourier space and higher frequency data. When combined, these overlapping larger regions can result in a synthesized large system NA region that may, in certain cases, be close to unity. In certain cases, these high NA systems have a high synthetized system NA (e.g., close to unity where the intrinsic NA of the filtering light element is lower such as, for example, about 0.75) while maintaining a large working distance, and without using needing an immersion medium.

In conventional microscopes, the highest system NA that can be achieved is limited by geometric principle (i.e. at most the entire upper hemisphere light cone of light from the sample is collected) and lens design technology, resulting in an upper bound of ~0.95 for dry microscope and ~1.40 for oil immersion microscope. Some conventional water or oil immersion objectives may provide NA >0.9 where an immersion media with refractive index greater than 1 improves collection of light from the sample. However, immersion objectives have several drawbacks that may make them unsuitable for some applications. Firstly, samples need to be immersed in media and typically the working distance is very short (0.1~0.2 mm), which presents an obstacle for micromanipulation of the sample. Secondly, common immersion media have inherently high absorption characteristics in the ultraviolet region (<375 nm) and near infrared region (>700 nm) of the spectrum, which brings some problem to the bright-field immersion microscopy in this region and also fluorescence immersion microscopy. A description of the relationship between oil immersion and numerical aperture can be found at: http://www.olympusmicro.com/primer/anatomy/immersion.html, which is hereby incorporated by reference for this description.

In some embodiments described herein, the Fourier ptychographic imaging system has components configured to operate in trans-illumination mode so that illumination is directing through the sample and toward the collection optics. In a Fourier ptychographic imaging system configured to operate in trans-illumination mode, reflected light may not be captured by the collection optical element and it may be that only light transmitted through the sample is collected.

In some embodiments described herein, the Fourier ptychographic imaging system has components configured are configured so that the collection optical elements receive reflected light from the surface of the sample. In a system configured to operate in epi-illumination mode, the components are configured so that illumination is directed toward sample and away from collection optical element. In such as configured system, the illumination source is configured to direct illumination to the sample from the same side as where the collection optical element is located. Some examples of Fourier ptychographic imaging devices shown operating in the epi-illumination mode are shown in FIGS. 13, 14, 15, and 16. A system configured to operate in epi-illumination mode may be more effective for imaging thick and/or non-transparent samples than a trans-illumination mode. The Fourier ptychographic imaging systems operating in epi-illumination mode typically image reflective surfaces of the sample. Configuring Fourier ptychographic imaging systems for epi-illumination mode may be particularly useful in applications that involve metal or semiconductor surface inspection including, for example, semiconductor wafer, chip, and/or electronic circuit board inspection, among others. Some applications for these Fourier ptychographic imaging systems configured for epi-illumination mode may include hand-held cameras with a modified flash system or satellite imagery.

FIG. 1 is a block diagram of components of a Fourier ptychographic imaging system 10, according to certain embodiments. The Fourier ptychographic imaging system 10 comprises a Fourier ptychographic imaging device 100 and a computing device 200 in electronic communication with the Fourier ptychographic imaging device 100. In certain illustrated examples, such as the one shown in FIG. 1, a sample is shown provided to the Fourier ptychographic imaging device during an image measurement (acquisition) process. For example, in FIG. 1, the Fourier ptychographic imaging device 100 comprises an optional (denoted by dashed line) sample 20 that is present during an image measurement (acquisition) process. It will be understood that a sample in not an essential component of the device, and is being shown for the purposes of illustrating an operation of the device. The computing device 200 can be in various forms such as, for example, a smartphone, laptop, desktop, tablet, etc. Various forms of computing devices would be contemplated by one skilled in the art. Although the computing device 200 is shown as a component separate from Fourier ptychographic imaging device 100, the two components may be in the same housing and/or may share sub-components.

In FIG. 1, the Fourier ptychographic imaging device 100 comprises a variable illuminator 110, an optical system 130, and a radiation detector 140. A variable illuminator is configured to provide illumination at a plurality of N incidence angles at $(\theta x_{i,j}, \theta y_{i,j})$, i=1 to n, j=1 to m to a sample being imaged. In some cases, the variable illuminator is configured to illuminate the sample in a trans-illumination mode. In other cases, the variable illuminator is configured to illuminate the sample in an epi-illumination mode. In the trans-illumination mode, the variable illuminator directs illumination through the sample and toward a collection optical element of the optical system. In an epi-illumination mode, the variable illuminator directs illumination to the sample and away from a collection optical element of the optical system.

In FIG. 1, the computing device 200 comprises a processor 210 (e.g., a microprocessor), a computer readable medium (CRM) 220 in communication with the processor 210, and a display 230 also in communication with the processor 210. The processor 210 is in electronic communication with the radiation detector 140 to receive signal(s) with image data corresponding to M intensity images. The image data may include, for example, intensity distributions, associated acquisition times, etc.

The processor 210 is in electronic communication with CRM 220 (e.g., memory) to be able to transmit signals with image data in order to store to and retrieve image data from the CRM 220. Processor 210 is in electronic communication with display 230 to be able to send image data and instructions to display images and other output, for example, to a user of the system 10. As shown by a dotted line, the variable illuminator 110 may optionally be in electronic communication with processor 210 to send instructions for controlling variable illuminator 110. For example, in certain aspects these control instructions may be implemented to synchronize the illumination times at different incidence angles with the sample times of the radiation detector 140. The electronic communication between components of system 10 and other systems and devices described herein may be in wired or wireless form.

The processor 210 may also receive instructions stored on the CRM 220 and execute those instructions to perform one or more functions of Fourier ptychographic imaging system 10. For example, the processor 210 may execute instructions to perform one or more steps of the Fourier ptychographic imaging method. As another example, the processor 210 may execute instructions for illuminating light elements of the variable illuminator 110. As another example, the processor 210 may execute instructions stored on the CRM 220 to perform one or more other functions of the system such as, for example, 1) interpreting image data from the plurality of intensity images, 2) generating a higher resolution image from the image data, and 3) displaying one or more images or other output from the Fourier ptychographic imaging method on the display 230.

The CRM (e.g., memory) 220 can store instructions for performing certain functions of the system 10. These instructions are executable by the processor 220 or other processing components of the system 10. The CRM 220 can also store the (lower resolution) intensity and higher resolution image data, and other data produced by the system 10.

The Fourier ptychographic imaging system 10 also includes a display 230 in electronic communication with the processor 210 to receive data (e.g., image data) and provide display data to the display 230 for, for example, an operator of the Fourier ptychographic imaging system 10. The display 230 may be a color display or a black and white display. In addition, the display 230 may be a two-dimensional display or a three-dimensional display. In one embodiment, the display 230 may be capable of displaying multiple views.

In one operation, the Fourier ptychographic imaging system 10 of FIG. 1 performs a Fourier ptychographic imaging method. This method comprises a measurement (acquisition) process, a recovery process, and an optional display process. During the measurement process, the sample is illuminated from a plurality of N incidence angles $(\theta x_{i,j}, \theta y_{i,j})$, i=1 to n, j=1 to m, (N=n×m) using the variable illuminator 110. The optical system 130 has a filtering optical element that filters light issuing from the sample. The optical system 130 propagates the filtered light to the radiation detector 140. The radiation detector 140 receives the filtered light and acquires a plurality of M intensity images, $I_{k,j}$, k=1 to o and j=1 to p, where M=o×p. In certain cases, M may be N. The variable illuminator 110 is configured to generate illumination at incidence angles that will generate image data in Fourier space that overlaps by a certain amount. During the recovery process, the M intensity images are iteratively combined in Fourier space to generate a higher-resolution image data (intensity and/or phase). During the optional display process, an image (e.g., higher-resolution image, acquired intensity image, etc.) and/or other output may be provided on a display 230. In certain aspects, the system 10 may also be able to correct for any aberrations in the system 10, including re-focusing of the higher-resolution image. In one case, the system 10 may also be able to propagate the higher resolution image to one or more planes. The image data from these propagated images at different planes can be used to generate a three-dimensional image. In certain aspects, the system 10 may also be able to generate an image at different illumination wavelengths (RGB) to generate a color image.

Certain modifications, additions, or omissions may be made to the Fourier ptychographic imaging system 10 without departing from the scope of the disclosure. In addition, the components of the Fourier ptychographic imaging system 10 or the components of the Fourier ptychographic imaging devices described herein may be integrated or separated according to particular needs. For example, the computing device 200 or components thereof may be integrated into the Fourier ptychographic imaging device 100. In some embodiments, the processor 210 or other suitable processor may be part of the Fourier ptychographic imaging device 100. In some cases, the processor 210 may be integrated into a radiation detector so that the radiation detector performs the functions of the processor 210. As another example, the CRM 220 and/or display 230 may be omitted from the Fourier ptychographic imaging system 100 in certain cases.

In certain aspects, the Fourier ptychographic imaging systems and devices may further comprise a receptacle for receiving the sample at a sample surface. The sample surface may be part of a component of or a separate component of the systems and devices.

In certain aspects, the field-of-view of the collection components of the Fourier ptychographic imaging system 10 may be divided into one or more tile images. In these cases, the processor may construct a higher resolution complex image for each tile independently, and then combine the tile images to generate a full field-of-view image. This ability to process tile images independently allows for parallel computing. In these aspects, each tile may be represented by a two-dimensional area. In polar spatial coordinates, each tile may be a circular area or an oval area. In rectilinear spatial coordinates, the full field-of view low resolution image may be divided up into a two-dimensional matrix of tiles in a rectangular area. In some embodiments, the dimensions of a two-dimensional square matrix of tiles may be in powers of two when expressed in number of pixels of the radiation detector such as, for example, a 256 by 256 matrix, a 64×64 matrix, etc.

A variable illuminator can refer to a device that is configured to provide incident radiation to the sample being imaged at N different incidence angles at M image acquisition times. In many cases, the variable illuminator is designed to provide incident radiation at a plurality of N incidence angles ($\theta x_{i,j}$, $\theta y_{i,j}$), i=1 to n, j=1 to m. Generally, N has a value in a range from 2 to 1000. In one case, N=100. In another case, N=200. Each incidence angle corresponds to a location of the corresponding acquired image data in Fourier space. Adjacent incidence angles in the spatial domain correspond to neighboring regions in Fourier space. In certain embodiments, the variable illuminator is designed to provide illumination at incidence angles that provide for an overlapping area of neighboring regions of image data in Fourier space where the overlapping area is of at least a certain minimum amount (e.g. 75% overlap, 70% overlap, 80% overlap, etc.). To provide this minimum amount of overlap of neighboring regions in Fourier space, the variable illuminator may be configured so that the difference between adjacent incidence angles in the plurality of N incidence angles is less than a certain maximum angular difference. That is, the variable illuminator may be configured with a maximum difference between adjacent incidence angles to provide the minimum amount of overlap in Fourier space. For example, the maximum angular difference may be about 0.05 rad for a 2×0.08 NA objective lens. In another case, the maximum angular difference may be about 0.1 rad.

The Fourier ptychographic imaging system comprises a filtering optical element. In some cases, the filtering optical element may comprise a lens having an acceptance angle. This acceptance angle is associated with the diameter of a circular pupil region in Fourier space.

In some of these cases, the variable illuminator may be configured to have adjacent incidence angles that are separated by an angle of a value defined by the acceptance angle of the lens. In one case, the value of the difference between two adjacent incidence angles of the plurality of incidence angles may be in the range of about 10% to about 90% of the acceptance angle of the filtering optical element in the form of an objective lens. In another case, the value of the difference between two adjacent incidence angles of the plurality of incidence angles may be in the range of 33% and 66% of the acceptance angle of the filtering optical element in the form of an objective lens. In another case, the value of the difference between two adjacent incidence angles of the plurality of incidence angles may be less than about 76% of the acceptance angle of the filtering optical element in the form of an objective lens. In another case, the difference between adjacent incidence angles is about ⅓ of the acceptance angle defined the filtering optical element in the form of an objective lens. In another case, the range of incidence angles, defined by a difference between the largest and smallest incidence angles, may be about equal to the numerical aperture consistent with the spatial resolution of the final higher-resolution image. In one case, the acceptance angle is in the range of about −0.08 rad to about 0.08 rad, and the adjacent angle is 0.05 rad.

In certain embodiments, the variable illuminator comprises one or more radiation sources. Although the radiation source(s) are usually coherent radiation sources, incoherent radiation source(s) may also be used in some cases and computational corrections may be applied. The radiation sources may be visible light other forms of radiation. In cases that use visible light radiation, the radiation source(s) is a visible light source. Some examples of a radiation source of visible light include a liquid crystal display (LCD) pixel and a pixel of a light emitting diode (LED) display. In cases that use other forms of radiation, other sources of radiation may be used. For example, in embodiments that use X-ray radiation, the radiation source may comprise an X-ray tube and a metal target. As another example, in cases that use microwave radiation, the radiation source may comprise a vacuum tube. As another example, in embodiments that use acoustic radiation, the radiation source may be an acoustic actuator. As another example, in embodiments that use Terahertz radiation, the radiation source may be a Gunn diode. One skilled in the art would contemplate other sources of radiation. In one case that uses Terahertz radiation, the frequencies of the radiation provided by the illumination source may be in the range of about 0.3 to about 3 THz. In one case that uses microwave radiation, the frequencies of the radiation provided by the variable illuminator may be in the range of about 100 MHz to about 300 GHz. In one case that uses X-ray radiation, the wavelengths of the radiation provided by the variable illuminator may be in the range of about 0.01 nm to about 10 nm. In one case that uses acoustic radiation, the frequencies of the radiation provided by the variable illuminator may be in the range of about 10 Hz to about 100 MHz.

Figure 2:
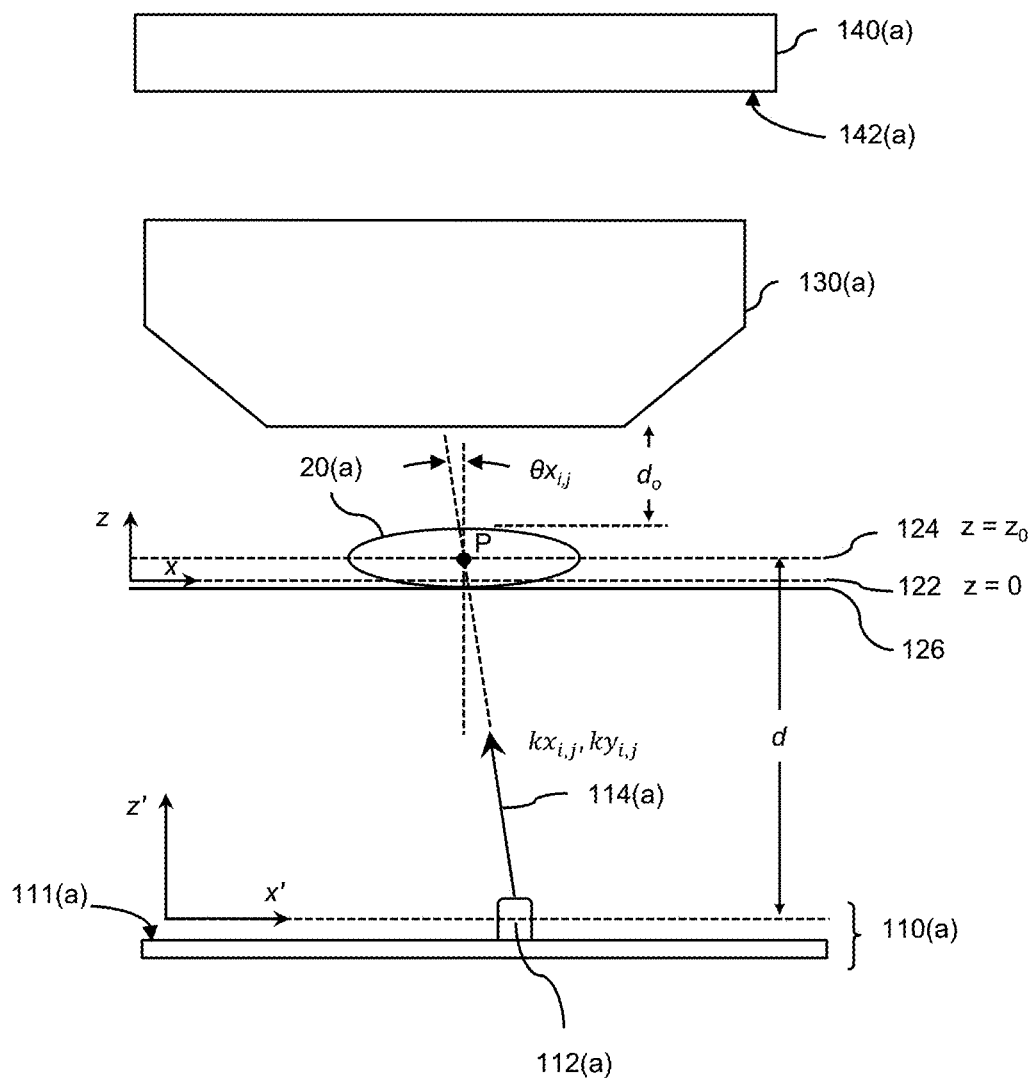
FIG. 2 depicts a schematic diagram of a side view of components of a Fourier ptychographic imaging device in trans-illumination mode, according to embodiments.

In certain cases, the variable illuminator may comprise a plurality of discrete light elements, each light element comprising at least one radiation source. For example, a variable illuminator that is configured to provide visible light typically includes a plurality of discrete light elements. Some examples of discrete light elements that can provide visible light are an LCD pixel and a pixel of an LED display. In many cases, the illumination provided by each light element may be approximated as plane wave illumination at the sample from a single incidence angle. For example, the light element 112(a) in FIG. 2 provides illumination 114(a) at an incidence angle that has a component $\theta x_{i,j}$ in the x-z plane.

In certain cases, the properties (e.g., wavelength, frequency, phase, amplitude, polarity, etc.) of illumination from the activated radiation source(s) of the variable illuminator at each acquisition time may be approximately uniform. In some cases, the illumination from the activated radiation source(s) at all acquisition times from all incidence angles may be approximately uniform. In other cases, the properties may vary at the different incidence angles, for example, by providing n different wavelengths $\lambda_1, \ldots, \lambda_n$ during the measurement process. In other cases, the variable illuminator may provide RGB illumination of three wavelengths $\lambda_1$, $\lambda_2$, and $\lambda_3$ corresponding to red, green, blue colors, respectively. In examples that use Terahertz radiation, the frequencies of the radiation provided by the variable illuminator may be in the range of about 0.3 to about 3 THz. In examples that use microwave radiation, the frequencies of the radiation provided by the variable illuminator may be in the range of about 100 MHz to about 300 GHz. In examples that use X-ray radiation, the wavelengths of the radiation provided by the variable illuminator may be in the range of about 0.01 nm to about 10 nm. In examples that use acoustic radiation, the frequencies of the radiation provided by the variable illuminator may be in the range of about 10 Hz to about 100 MHz.

Figure 3:
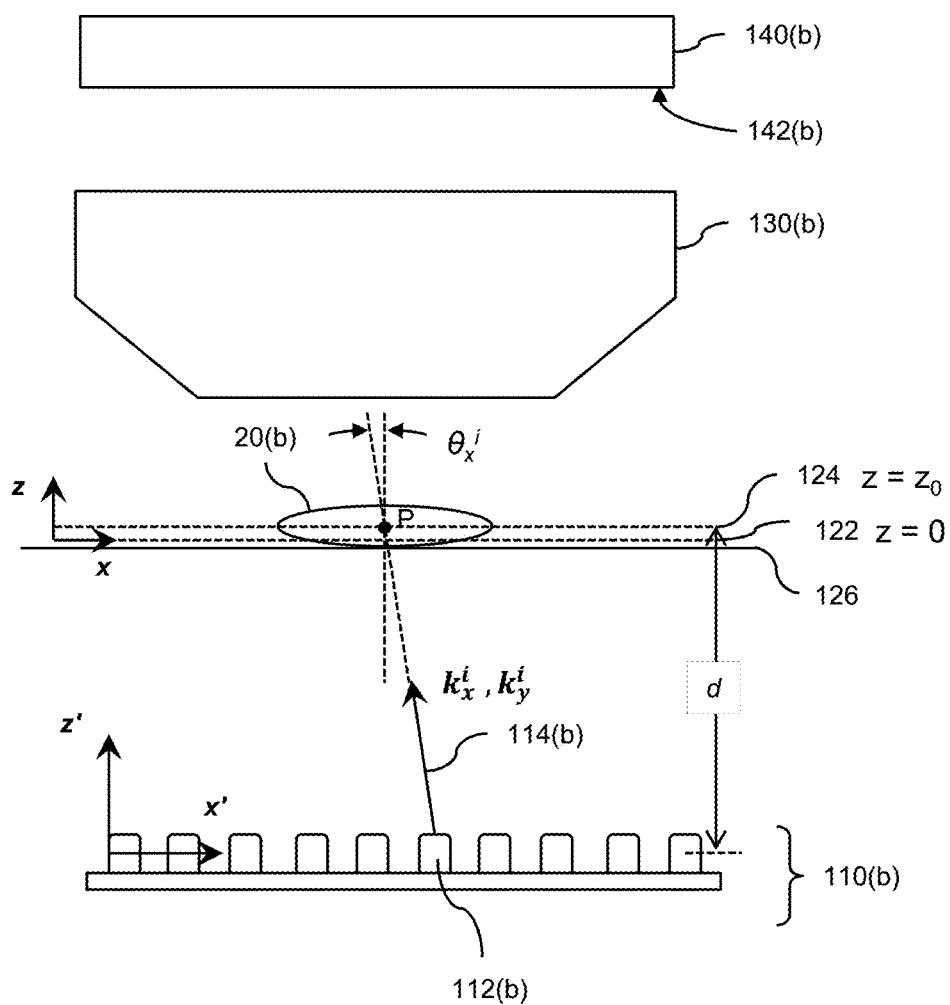
FIG. 3 is a schematic diagram of a Fourier ptychographic imaging device comprising a variable illuminator in the form of a two-dimensional (10×10) matrix of 100 light elements, according to an embodiment.

In some cases, the variable illuminator comprises a plurality of N stationary discrete light elements at different spatial locations (e.g., variable illuminator 110(b) in FIG. 3). These N stationary light elements may illuminate, individually or in groups of one or more, at different sample times (e.g., successively) to provide illumination from the plurality of N incidence angles. In other cases, the variable illuminator may comprise a moving light element. This moving light element may move relative to the optical system, the sample, and the radiation detector, which may be kept stationary. In these cases, the moving light element may be moved to a plurality of N different spatial locations using a mechanism such as a raster scanner. Based on the relative movement between the stationary components and the moving light element, the light element can provide illumination from the plurality of N incidence angles. In other cases, the variable illuminator comprises a stationary light element and the other components of system are moved to different spatial locations to provide the relative movement. Based on this relative movement between the stationary light element and the other components of the system, the light element can provide illumination from the plurality of N incidence angles.

Figure 9:
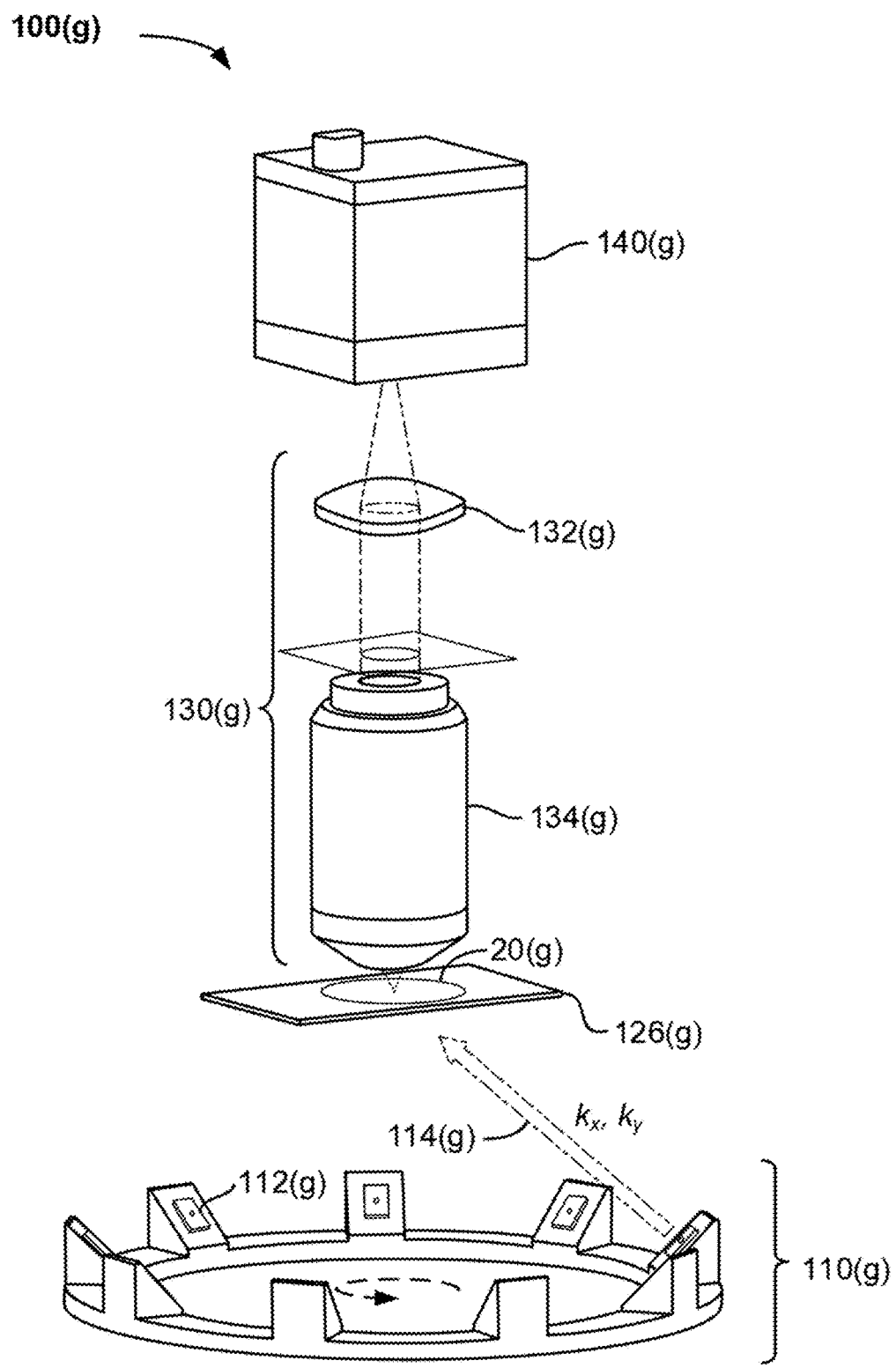
FIG. 9 depicts an orthogonal view of components of a high NA Fourier ptychographic imaging device with a circular variable illuminator.
Figure 12:
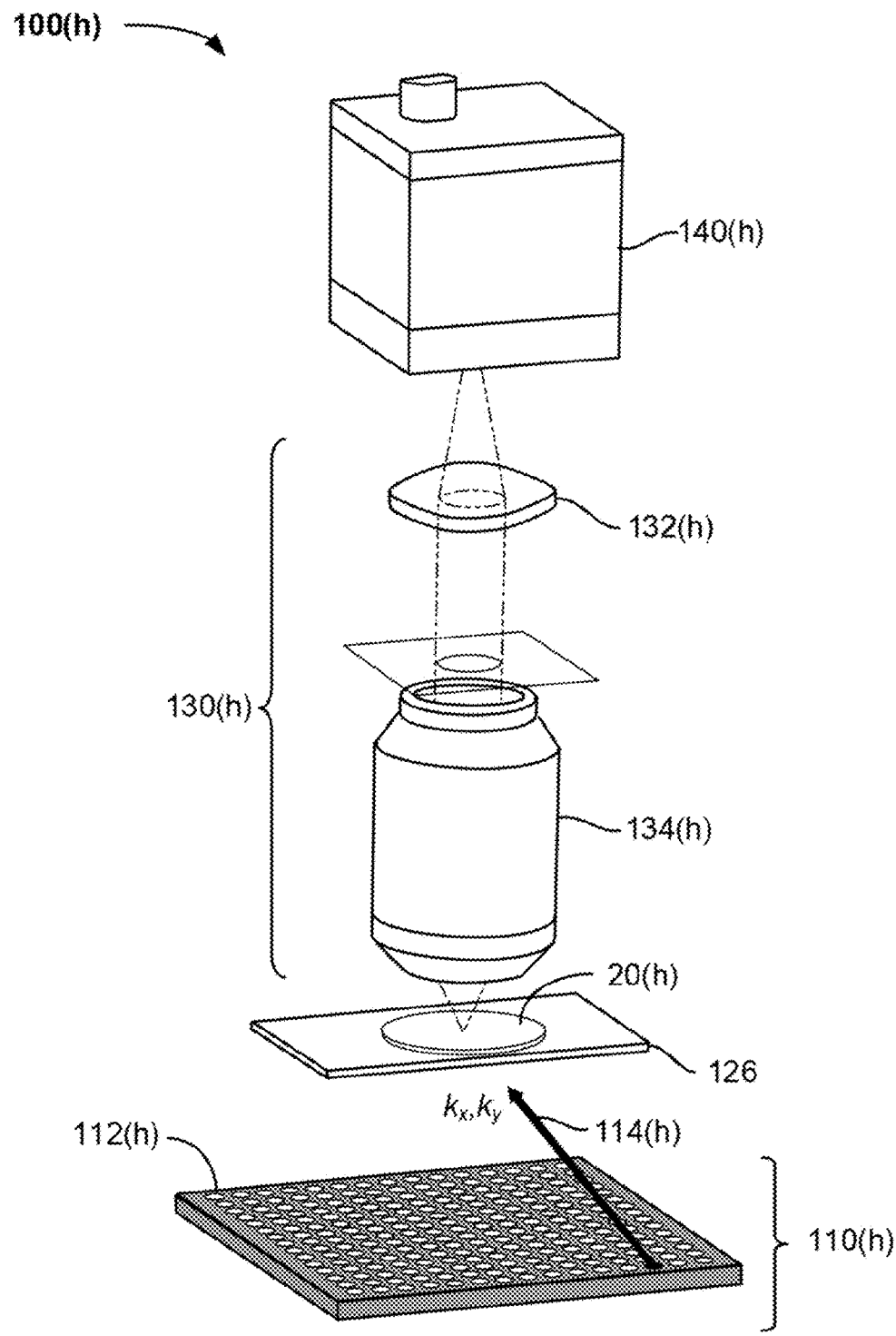
FIG. 12 depicts an orthogonal view of components of a high NA Fourier ptychographic imaging device with a rectangular array variable illuminator.

In cases having a variable illuminator comprising a plurality of light elements, the light elements may be in various arrangements such as a line grid, a rectangular grid, one or more concentric circles (rings), a hexagonal grid, curvilinear grid, or other suitable arrangement capable of providing the illumination from the plurality of incidence angles. An example of a circular variable illuminator having light elements in the form a single ring is shown in FIG. 9. An example of rectangular array variable illuminator in the form of a rectilinear grid of light elements is shown in FIG. 12. Some examples of light elements are a pixel of a liquid crystal display (LCD) or a light emitting diode (LED). The arrangement of light elements may be configured with a spacing between adjacent elements and at particular locations that when activated can provide illumination at a plurality of incidence angles that correspond to overlapping regions in Fourier space, in some cases, with an overlap of a certain amount.

In cases with multiple light elements, the light elements locations may be represented by a one-dimensional or two-dimensional array (e.g., 1×9 array, 3×6 array, 10×10 array, 15×15 array, 32×32 array, 100×100 array, 50×10 array, 20×60 array, or other array with two dimensions). In some cases, such a two-dimensional array has dimensions n×m with light element locations $X_{i,j}$ (r, θ) or $X_{i,j}$ (x, y), i=1 to n, j=1 to m where the number of locations, where N=n×m.

In certain aspects, the variable illuminator comprises discrete light elements that are illuminated at different acquisition times in an order, for example, according to illumination instructions. For example, the order may define the illumination times of individual light elements or groups of light elements in a two-dimensional array of discrete light elements. In one example where the two-dimensional matrix of light elements is a rectangular array, a central light element may be determined. The illumination instructions may instruct to illuminate the central light element first, then illuminate the 8 light elements surrounding the central light element going counterclockwise, then illuminate the 16 light elements surrounding the previous light elements going counterclockwise, and so on until the variable illuminator has provided illumination from the plurality of N incidence angles ($\theta x_{i,j}$, $\theta y_{i,j}$), i=1 to N. In another example where the two-dimensional matrix of light elements is a polar matrix such as one or more concentric rings, the illumination instructions may instruct to illuminate the light elements at smallest radius first (e.g., in clockwise, counterclockwise, or random order), then illuminate any light element at a larger radius, and so on until all the variable illuminator has provided illumination from the plurality of N incidence angles ($\theta x_{i,j}$, $\theta y_{i,j}$), i=1 to N. In another example where the two-dimensional array of light elements is a rectangular or a polar array, a light element closest to the sample may be determined. The illumination instructions may instruct to illuminate the light element closest to the sample, and then illuminate the light element next closest to the sample, and then illuminate the light element next closest, and so on until the N light elements have been illuminated from the plurality of N incidence angles. In another example, the light elements may be illuminated in a random order. In another example, a sequential column by column order may be followed such as, for example, ($X_1$, $Y_1$), ($X_1$, $Y_2$), ($X_1$, $Y_3$), ... ($X_1, Y_n$), ($X_2, Y_1$), ($X_1, Y_2$), ($X_1, Y_3$), ... ($X_2, Y_n$), ... ($X_m, Y_n$). Alternatively, a row by row order may be followed.

In certain aspects, the variable illuminator may be configured to operate in epi-illumination mode, in trans-illumination mode, or in both epi-illumination mode and trans-illumination mode. To be able to operate in the epi-illumination mode, the variable illuminator is typically located on the same side of the sample as the collecting optical element of the optical system. To be able to operate in the trans-illumination mode, the variable illuminator is typically located on the opposite side of the sample as the collecting optical element of the optical system.

A sample being imaged by the Fourier ptychographic imaging systems described herein can be comprised of one or more objects and/or one or more portions of an object. Each object may be, for example, a biological entity, an inorganic entity, etc. Some examples of biological entities that can be imaged include whole cells, cell components, microorganisms such as bacteria or viruses, and cell components such as proteins. An example of an inorganic entity that can be imaged is a semiconductor wafer. In certain aspects, a thick and/or non-transparent sample can be imaged by certain Fourier ptychographic imaging systems described herein. The sample may be provided in a medium such as a liquid.

In luminescence imaging examples, a reagent (e.g., fluorescence/phosphorescence dye) may be mixed with the sample to mark or tag portions under investigation with fluorophore. A fluorophore can refer to a component of a molecule that causes the molecule to fluoresce or phosphoresce. A fluorophore can absorb energy from excitation light of a specific wavelength(s) and re-emit the energy at a different wavelength(s). In luminescence imaging examples, the illumination source may illuminate the sample with excitation light of predetermined wavelength(s) (e.g., blue light) to activate the fluorophore in the sample. In response, the fluorophore release emissions of a different wavelength(s) (e.g., red light).

The optical system may comprise one or more other components such as, for example, lens(es), beam splitter(s), objective(s), tube lens(es), wavelength filter(s), aperture element(s) (e.g., objective, physical iris, etc.), and other like elements. In a luminesce imaging example, the optical system may include, for example, a filter (e.g., material that passes emissions and blocks excitation light) between the collection optics and the radiation detector to filter out excitation light and pass emissions. The optical system may include, for example, certain microscope optical components or camera optical components. Generally, the optical system comprises a collection optical element or first optical element that collects light issuing from the sample. The optical system also comprises a filtering optical element for filtering light issuing from the sample. The filtering optical element may be the collection optical element. In certain cases, the filtering optical element may be a lens (e.g., an objective lens). In certain high NA examples, the high NA of the lens may be about 0.50. In other high NA examples, the high NA of the lens may be in the range of about 0.50 to about 0.75. In another high NA example, the high NA of the lens may be about 0.60.

In certain Fourier ptychographic imaging systems described herein, the radiation detector (e.g., radiation detector 140 in FIG. 1) is configured to acquire a plurality of intensity images of a sample by measuring/recording an intensity distribution of incident radiation at a detector plane at a particular sample (acquisition) time. During an image measurement process, for example, the radiation detector may acquire a plurality of M intensity images at M sample times, $t_{q=1\ to\ M}$. If visible light radiation is being measured, the radiation detector may be in the form of a charge coupled device (CCD), a CMOS imaging sensor, an avalanche photo-diode (APD) array, a photo-diode (PD) array, a photomultiplier tube (PMT) array, or like device. If using THz radiation, the radiation detector may be, for example, an imaging bolometer. If using microwave radiation, the radiation detector may be, for example, an antenna. If X-ray radiation is used, the radiation detector may be, for example, an x-ray sensitive CCD. If acoustic radiation is used, the radiation detector may be, for example, a piezoelectric transducer array. These examples of radiation detectors and others are commercially available. In some cases, the radiation detector may be a color detector e.g. an RGB detector. In other cases, the radiation detector need not be a color detector. In certain cases, the radiation detector may be a monochromatic detector.

In certain aspects, a Fourier ptychographic imaging system comprises a variable illuminator configured to illuminate the sample from a plurality of N illumination incidence angles and radiation detector configured to capture a plurality of M intensity images based on different incidence angles of the plurality of N incidence angles. In certain cases, N=M (i.e. an intensity image is acquired for each illumination angle).

In certain aspects, the radiation detector may have discrete light detecting elements (e.g., pixels). In some cases, the discrete light detecting elements may have a size in the range of 1-10 microns. In one case, the discrete light detecting element may have a size of about 1 micron. The discrete light detecting elements may be circular, rectangular (e.g., square), or the like. For example, a radiation detector that is in the form of a CMOS or CCD array may have corresponding CMOS or CCD elements that are 1-10 microns. In another example, a radiation detector that is in the form of an APD or PMT array may have corresponding CMOS or CCD elements that are in the range of 1-4 mm. In one example, the radiation detecting element is a square pixel having a size of 5.5 um.

A sample time or acquisition time can refer to a time that the radiation detector captures an intensity image of the sample. During certain image measurement processes described herein, the radiation detector captures a plurality of M intensity images (e.g., M=1, 2, 5, 10, 20, 30, 50, 100, 1000, 10000, etc.) at different sample/acquisition times. Typically, the radiation detector is configured so that the sampling rate is set to capture an intensity image at different illumination incidence angles. In one example, the sampling rates may be in a range from 0.1 to 1000 frames per second.

Fourier space may refer to a mathematical space spanned by wave vectors kx and ky being the coordinate space in which the two-dimensional Fourier transforms of the spatial images created by the aperture-scanning Fourier ptychographic imaging system reside. Fourier space may also refer to the mathematical space spanned by wavevectors kx and ky in which the two-dimensional Fourier transforms of the spatial images collected by the radiation sensor reside.

During the measurement (acquisition) process, the radiation detector captures M images in the form of image data. In most cases, the captured image data at each sample time is a light intensity distribution measured by the discrete light detecting elements of the radiation detector. That is, M intensity images are captured. In addition to intensity distribution data, the radiation detector may also generate other image data such as the sample times and other related sample data. The image data generated by the radiation detector may be communicated to other components of the system such as the processor and/or display.

The image data for each of the M intensity images captured by the radiation detector is associated with a region in Fourier space. In Fourier space, neighboring regions may share an overlapping area over which they sample the same Fourier domain data. The distance between the neighboring regions in Fourier space corresponds to the distance between neighboring incidence angles of illumination provided by the variable illuminator. In certain aspects, the variable illuminator may be configured to provide illumination at a plurality of incidence angles that provide a predefined amount of overlapping area between corresponding neighboring regions in the Fourier domain data. In one case, the variable illuminator is configured to provide illumination at a plurality of incidence angles to generate an overlapping area in the Fourier domain data in the range of about 2% to about 99.5% of the area of one of the regions. In another case, the overlapping area between neighboring regions may have an area that is in the range of about 65% to about 75% the area of one of the regions. In another case, the overlapping area between neighboring regions may have an area that is about 65% of the area of one of the regions. In another case, the overlapping area between neighboring regions may have an area that is about 70% of the area of one of the regions. In another case, the overlapping area between neighboring regions may have an area that is about 75% of the area of one of the regions.

Based on the geometry of the components of the Fourier ptychographic imaging system, the variable illuminator may be configured to generate illumination from incidence angles that provide a predefined amount of overlapping area between neighboring regions in Fourier space. For example, there may be a predefined maximum distance between neighboring light elements being illuminated at different acquisition times to provide a minimum amount of overlap between neighboring regions in Fourier space. In one case, the maximum distance between neighboring light elements may be about 1 mm. In another case, the maximum distance between neighboring light elements may be about 0.5 mm. In another case, the maximum distance between neighboring light elements may be about 4 mm.

In certain embodiments described herein, a Fourier ptychographic imaging system may be configured for luminescence (e.g., fluorescence, phosphorescence, chemluminescence, bioluminescence, etc.) imaging. For example, a Fourier ptychographic imaging system may be adapted to collect emissions directed back toward the illumination source. In luminescence imaging, fluorophores in the sample are excited by excitation illumination of a certain wavelength(s) from the illumination source and emit light of a different wavelength(s) (emissions). These emissions tend to have a weak signal compared to the excitation light so that collection efficiency may be important. In certain examples, Fourier ptychographic imaging system configured for luminescence imaging operates in epi-illumination mode. By operating in epi-illumination mode, the radiation detector can receive emissions from the sample and/or light reflected from the sample back toward the illumination source. These examples have optical arrangements that can accommodate an illumination source that directs excitation illumination to the sample and away from collection optical element of the system. With this optical arrangement, collection of excitation illumination may be substantially avoided.

II. Fourier Ptychographic Imaging Device Configurations

Fourier ptychographic imaging devices may be configured for use with particular types of radiation. For example, Fourier ptychographic imaging device 100(a) of FIGS. 2 and 100(b) of FIG. 3 may be particularly suitable for use with visible light, Terahertz, and/or microwave radiation. As another example, Fourier ptychographic imaging device 100(e) of FIG. 7 may be particularly suitable for use with X-ray radiation.

FIG. 2 depicts a schematic diagram of a side view of components of a Fourier ptychographic imaging device 100(a) of a trans-illumination configuration according to embodiments. In FIG. 2, the Fourier ptychographic imaging device 100(a) comprises a variable illuminator 110(a), an optical system 130(a), and a radiation detector 140(a) having a sensing surface 142(a). The variable illuminator 110(a) comprises a light element 112(a) and a surface 111(a). The variable illuminator 110(a) also comprises an x'-axis, a y'-axis (not shown) at a plane depicting the approximated plane from which the source of illumination is provided, and a z'-axis. Although radiation detector 140(a) is shown at a distance away from optical system 130(a), radiation detector 140(a) may optionally be located proximal optical system 130(a).

In the illustrated example, a sample 20(a) has been provided to a specimen surface 126(a) for the measurement process. The light element 112(a) is shown providing illumination 114(a) in a trans-illumination mode through the sample 20(a) where the illumination 114(a) has a wavevector $kx_{i,j}$, $ky_{i,j}$ for the measurement process. Also shown is an in-focus plane 122(a) at z=0 and a sample plane 124 at $z=z_0$. The Fourier ptychographic imaging device 100(a) further comprises an x-axis, ay-axis (not shown) at the in-focus plane 122, and a z-axis orthogonal to the in-focus plane 122. Also shown is a distance d between the variable illuminator 110(a) and the sample plane 124 and a working distance $d_o$ between the sample 20(a) and the optical system 130(a). Generally, a working distance, $d_o$, refers to the distance between the sample 20(a) and the collecting optical element of the optical system 130(a).

In FIG. 2, the light element 112(a) is shown providing illumination 114(a) at a single sample (acquisition) time in the measurement process. The optical system 130(a) receives and filters light issuing from sample 20(a). Light filtered by the optical system 130(a) is received at the sensing surface 142(a) of the radiation detector 140(a). The radiation detector 140(a) measures the intensity distribution of light incident the sensing surface 142(a) and captures an intensity image at the sample time. Although the Fourier ptychographic imaging device 100(a) is shown at a single sample time, the device 100(a) may include N light elements 112(a) illuminating at, for example, N incidence angles $(\theta x_{i,j}, \theta y_{i,j})$, i=1 to n, j=1 to m, where N=n×m. In this case, the radiation detector 140(a) may acquire a plurality of M intensity images $I_{k,l}$ k=1 to o and j=1 top at the M sample times, where each intensity image may be acquired while the illumination is at a different incidence angle of the plurality of N incidence angles $(\theta x_{i,j}, \theta y_{i,j})$. The incidence angles $(\theta x_{i,j}, \theta y_{i,j})$ are angles measured relative to an axis normal to the sample plane at $z=z_0$ and through point P. In the side view shown in FIG. 2, only the component $\theta x_{i,j}$ of the incidence angle in the x-z plane is shown.

FIG. 3 depicts a schematic diagram of a side view of components of a Fourier ptychographic imaging device 100(b), according to embodiments. Fourier ptychographic imaging device 100(b) comprises a variable illuminator 110(b) comprising a plurality of N stationary light elements, arranged in a two-dimensional matrix format. In the illustrated example, the i$^{th}$ light element 112(b) provides illumination from an incidence angle $(\theta_x^i, \theta_y^i)$. Although FIG. 3 shows the variable illuminator 110(b) having a 10×10 matrix of light elements 112, other dimensions can be used in other embodiments. Although FIG. 3 shows equally spaced light elements 112(b) other numbers and spacing may be used. Variable illuminator 110(b) also comprises an x'-axis, y'-axis (not shown), and a z'-axis. As shown, the stationary light elements 112(b) extend in the x'-direction and the y'-direction.

Fourier ptychographic imaging device 100(b) further comprises an optical element 130(b) (e.g., objective lens) and a radiation detector 140(b) having a sensing surface 142. Although radiation detector 140(b) is shown at a distance away from optical element 130(b), radiation detector 140(b) may optionally be located at the optical element 130(b). The Fourier ptychographic imaging device 100(b) also includes an in-focus plane 122 at z=0 and a sample plane 124 at z=z$_0$. The Fourier ptychographic imaging device 100(b) includes an x-axis and a y-axis (not shown) at the in-focus plane 122, and a z-axis orthogonal to the in-focus plane 122. The Fourier ptychographic imaging device 100(b) also includes a distance d between the variable illuminator 110(b) and the sample plane 124. In the illustrated example, specimen 20(b) is located at a specimen surface 126 for the acquisition process.

In FIG. 3, the Fourier ptychographic imaging device 100(b) is shown at a particular sample time, t$_i$, in the measurement process. At sample time, t$_i$, i$^{th}$ light element 112 provides incident illumination at a wavevector $k_x^i, k_y^i$ associated with an incidence angle of $(\theta_x^i, \theta_y^i)$. The optical element 130(b) receives and filters light issuing from specimen 20. Light filtered by the optical element 130(b) is received at the sensing surface 142 of the radiation detector 140(b). The radiation detector 140(b) senses the intensity distribution of the filtered light and captures a low-resolution intensity image. Although Fourier ptychographic imaging device 100(b) is shown at a single sample time, t$_i$, the Fourier ptychographic imaging device 100(b) can operate at a plurality of N sample times, t$_{i=1\ to\ N}$, associated with N incidence angles $(\theta_x^i, \theta_y^i)$, i=1 to N to capture N low-resolution two-dimensional intensity images.

Figure 4:
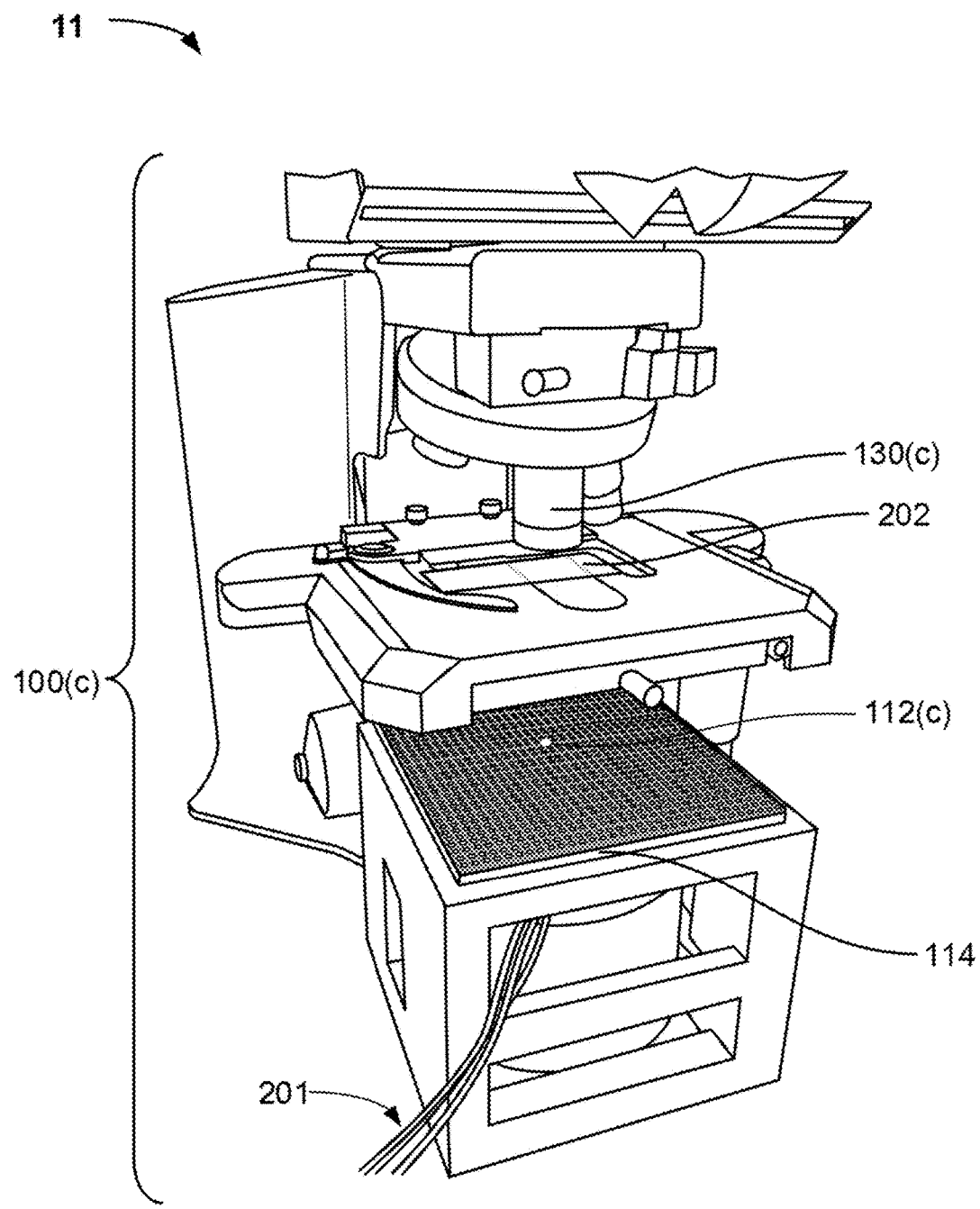
FIG. 4 is a photograph of a Fourier ptychographic imaging system with components in modular form, according to an embodiment.
Figure 5:
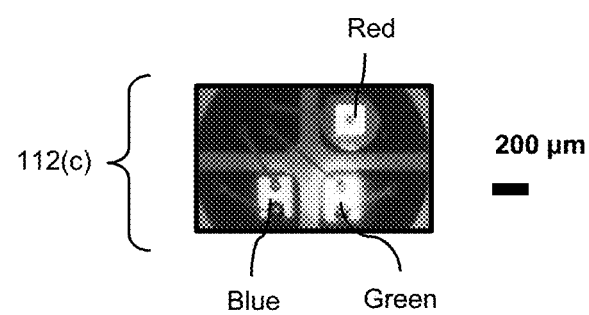
FIG. 5 is a photograph of one of the light elements of the variable illuminator the Fourier ptychographic imaging device of FIG. 4.

In certain embodiments, components of a Fourier ptychographic imaging system may be placed in communication with components of a conventional microscope or other conventional imaging device to transform the conventional device into a Fourier ptychographic imaging system. FIG. 4 is a photograph of a Fourier ptychographic microscope system 11 that is comprised of components of a conventional microscope, according to an embodiment. The Fourier ptychographic microscope system 11 comprises a Fourier ptychographic microscope 100(c). The Fourier ptychographic microscope 100(a) comprises components of a Fourier ptychographic imaging system and components of an Olympus® BX 41 microscope to transform it into the Fourier ptychographic imaging system 11. The components of the Olympus® BX 41 microscope comprise a 2×, 0.08 NA objective 130(c) that functions as the optical element. The field number of the 2× objective lens is 26.5. The field-of-view of the Fourier ptychographic microscope 100(c) at the sample plane is 13.25 mm in diameter. In this example, the components of a Fourier ptychographic imaging system include a programmable two-dimensional LED matrix 114 and a CCD camera (not shown) that has been placed under the specimen stage. The CCD camera functions as the radiation detector in this example. This two-dimensional LED matrix 114 has been programmed to provide variable illuminations to function as the variable illuminator. The programmable two-dimensional LED matrix 114 comprises a plurality of LEDs. In the photograph a single LED 112(c) is illuminated. FIG. 5 is a zoomed in photograph of the illuminated LED 112(c). As shown in FIG. 5, the LED is configured with sub elements to provide red, green, and blue illuminations. Although not shown, a processor 210 may be in electronic communication with the two-dimensional LED matrix 114 and/or to CCD camera through, for example, the wires 201.

In FIG. 4, a specimen 20(c) has been provided to the Fourier ptychographic microscope 100(c) on a slide 202. During the acquisition process, the red, green, and blue elements illuminate from the LEDs in the two-dimensional LED matrix 114, and the CCD camera acquires red, green, and blue intensity images. From these intensity images, a computing device can computationally reconstruct a high-resolution and wide field-of-view color image of the specimen area by iteratively combining low-resolution measurements in Fourier space. In one case, the processor may computationally reconstruct high-resolution and wide field-of-view red, green, and blue images, and then combine the images to generate a color image.

In certain embodiments, a Fourier ptychographic imaging device further comprises a mechanism (e.g., scanning mechanism) for moving the light element or other components relative to the light element to generate variable illumination. For example, the Fourier ptychographic imaging device 110(d) in FIG. 6 has a mechanism 150. As another example, the Fourier ptychographic imaging device 110(f) in FIG. 7 has a mechanism 160.

Figure 6:
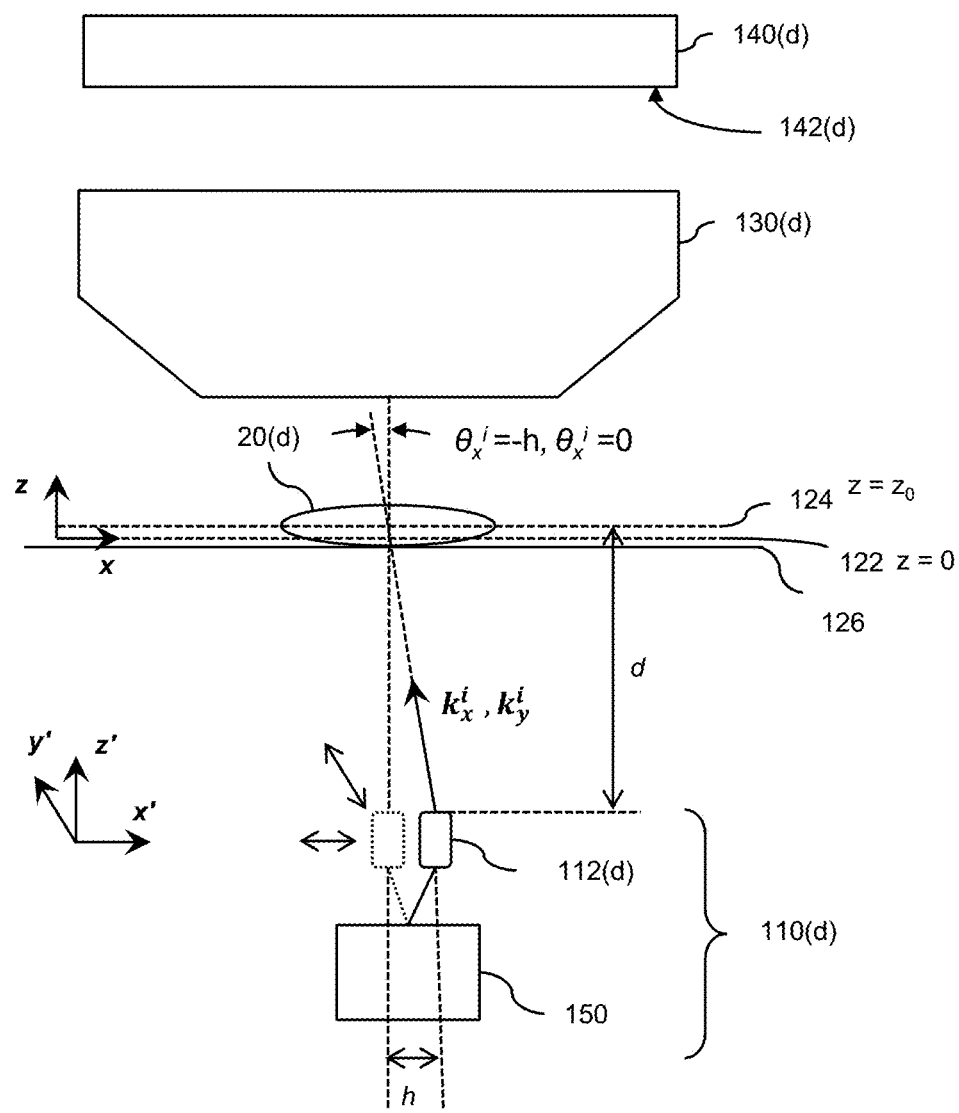
FIG. 6 is a schematic diagram of a side view of components of a Fourier ptychographic imaging device, according to embodiments.

FIG. 6 is a schematic diagram of a side view of components of a Fourier ptychographic imaging device 100(d), according to an embodiment. Fourier ptychographic imaging device 100(d) comprises a variable illuminator 110(d) comprising a light element 112(d) that is moved (e.g., scanned) in the x'-direction (direction on the x'-axis) and y'-direction (direction on the y'-axis) to a plurality of N locations. Variable illuminator 110(d) also comprises an x'-axis, y'-axis, and z'-axis. In the illustration, the light element 112(d) has moved from a normal incidence position $(\theta_x^i=0, \theta_y^i=0)$ in the x'-direction to a position that provides illumination at $(\theta_x^i=-h, \theta_y^i=0)$. The light element 112(d) is moved using a mechanism 150 such as a raster scanner.

Fourier ptychographic imaging device 100(d) further comprises an optical element 130(d) and a radiation detector 140(d) having a sensing surface 142. Although radiation detector 140(d) is shown at a distance away from optical element 130(d), radiation detector 140(d) may optionally be located at the optical element 130(d). The Fourier ptychographic imaging device 100(d) also includes an in-focus plane 122 at z=0 and a sample plane 124 at z=z$_0$. The Fourier ptychographic imaging device 100(d) includes an x-axis and a y-axis (not shown) at the in-focus plane 122, and a z-axis orthogonal to the in-focus plane 122. The Fourier ptychographic imaging device 100(d) also includes a distance d between the variable illuminator 110(d) and the sample plane 124. In the illustrated example, specimen 20(d) has been located at a specimen surface 126 for imaging. In other embodiments, specimen 20(d) may be in other locations for imaging purposes.

In FIG. 6, the light element 112(d) is shown providing illumination at sample time, t$_i$ in the measurement process. The optical element 130(d) filters light it receives. Light filtered by the optical element 130(d) is received at the sensing surface 142 of the radiation detector 140(d). The radiation detector 140(d) senses the intensity distribution of the filtered light and captures a low-resolution intensity image of the specimen area. Although Fourier ptychographic imaging device 100(d) is shown at a single sample time, $t_i$, the Fourier ptychographic imaging device 100(d) can operate at a plurality of N sample times, $t_{i=1\ to\ N}$, associated with N incidence angles $(\theta_x^i, \theta_y^i)$, i=1 to N to capture N low-resolution two-dimensional intensity images. In embodiments where the Fourier ptychographic imaging device 100(d) shown in FIG. 6 is used with X-ray radiation, the light element 112(d) includes an X-ray source.

Figure 7:
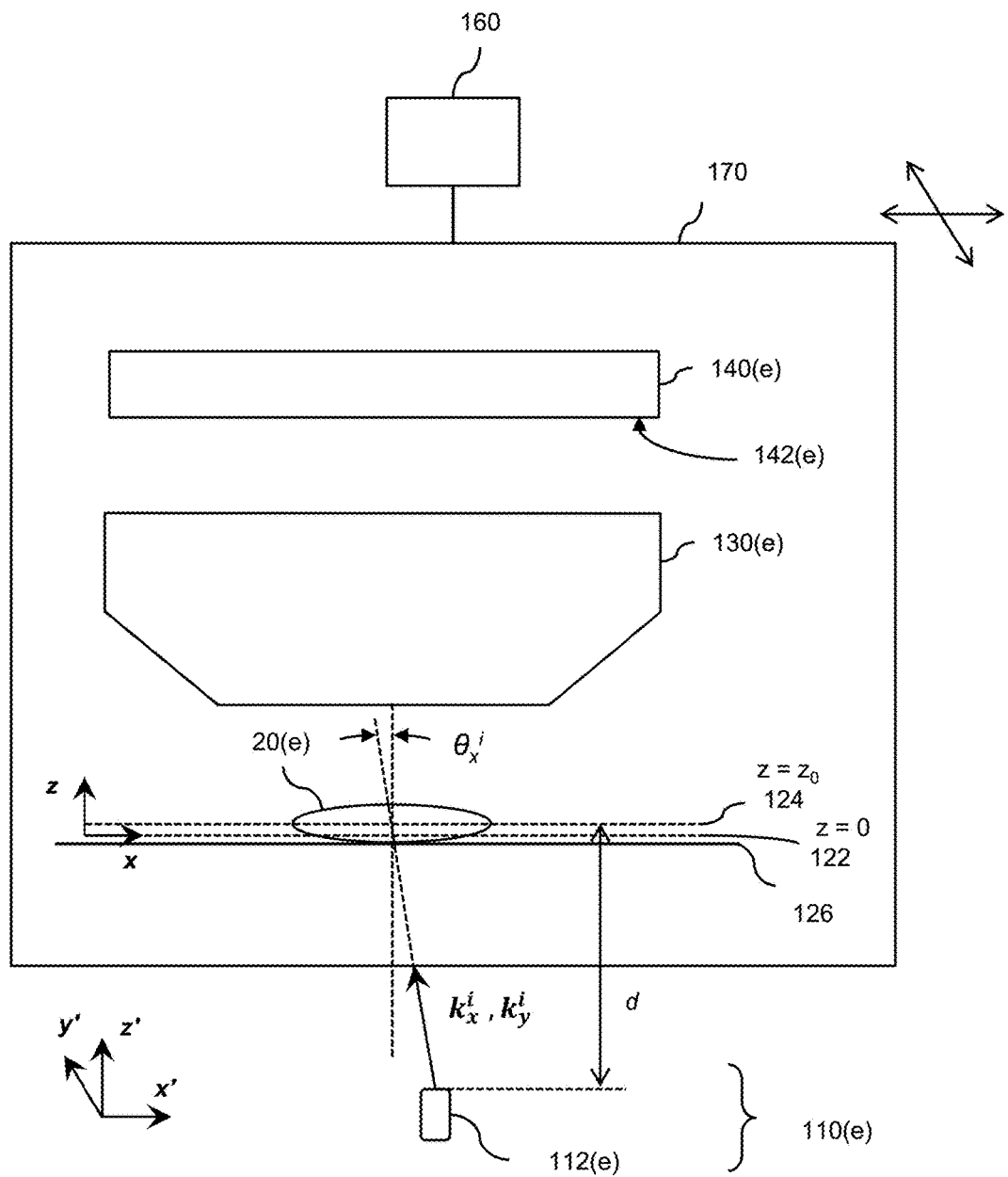
FIG. 7 is a schematic diagram of a side view of components of a Fourier ptychographic imaging device, according to embodiments.

FIG. 7 is a schematic diagram of a side view of components of a Fourier ptychographic imaging device 100(e), according to an embodiment. Fourier ptychographic imaging device 100(e) comprises a variable illuminator 110(e) with a light element 112(e), an optical element 130(e), a radiation detector 140(e) having a sensing surface 142, and a mechanism 160. In the illustrated example, specimen 20(e) has been provided to the Fourier ptychographic imaging device 100(e) for imaging.

In FIG. 7, the mechanism 160 moves an assembly 170 comprising the optical element 130(e), a radiation detector 140(b) and specimen 20(e) relative to the stationary light element 112(e) to provide illumination from a plurality of N incidence angles. The mechanism 160 may translate and/or rotate the assembly 170. For example, the assembly 170 may mounted on a goniometer sate that would allow the assembly to be rotated as a whole relative to the light element 112(e). The variable illuminator 110(e) also comprises an x'-axis, y'-axis, and z'-axis.

Although radiation detector 140(e) is shown at a distance away from optical element 130(e), radiation detector 140(e) may optionally be located at the optical element 130(e). The Fourier ptychographic imaging device 100(e) also includes an in-focus plane 122 at z=0 and a sample plane 124 at z=z$_0$. The Fourier ptychographic imaging device 100(e) includes an x-axis and ay-axis (not shown) at the in-focus plane 122, and a z-axis orthogonal to the in-focus plane 122. The Fourier ptychographic imaging device 100(e) also includes a distance d between the variable illuminator 110(e) and the sample plane 124.

In FIG. 7, the light element 112(e) is shown providing illumination at sample time, $t_i$ in the measurement process. The optical element 130(e) receives and filters light issuing from specimen 20(e). Light filtered by the optical element 130(e) is received at the sensing surface 142 of the radiation detector 140(e). The radiation detector 140(e) senses the intensity distribution of the filtered light and captures a low-resolution intensity image of the area. Although Fourier ptychographic imaging device 100(e) is shown at a single sample time, $t_i$, the Fourier ptychographic imaging device 100(e) can operate at a plurality of N sample times, $t_{i=1\ to\ N}$, associated with N incidence angles $(\theta_x^i, \theta_y^i)$, i=1 to N to capture N low-resolution two-dimensional intensity images.

Figure 8:
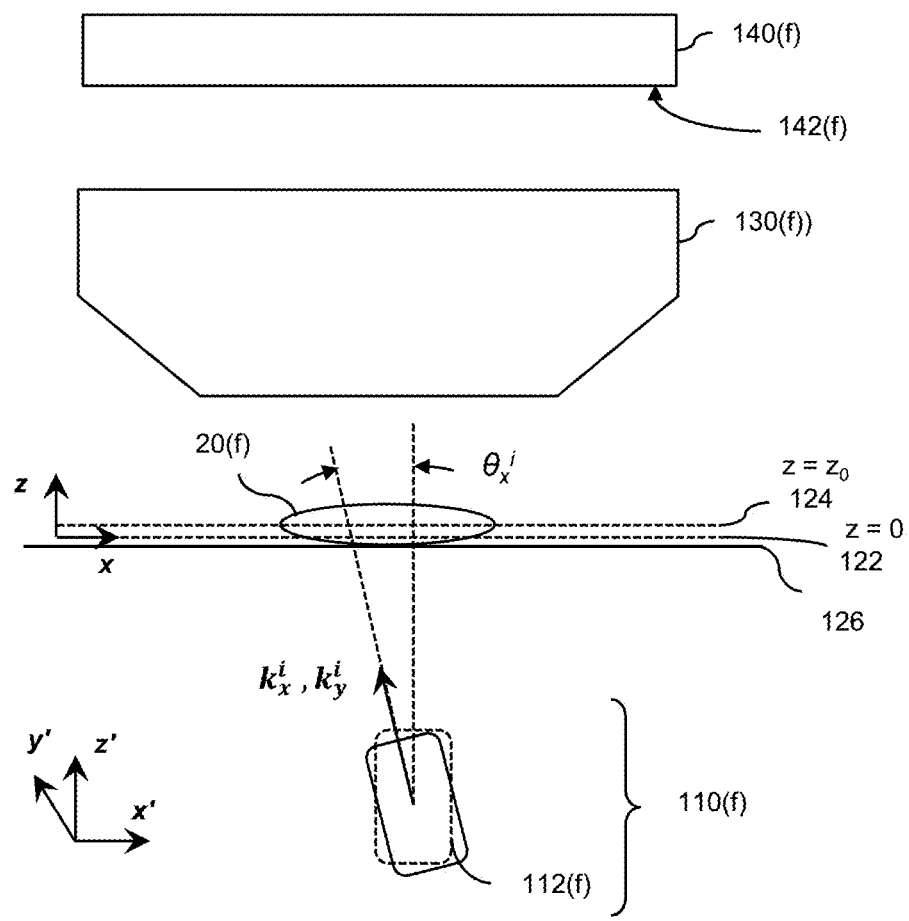
FIG. 8 is a schematic diagram of a side view of components of a Fourier ptychographic imaging device, according to embodiments.

FIG. 8 is a schematic diagram of a side view of components of an Fourier ptychographic imaging device 100(f), according to embodiments. Fourier ptychographic imaging device 100(f) comprises a variable illuminator 110(f) with a light element 112(f) that is moved by rotating it, an optical element 130(f), and a radiation detector 140(f) having a sensing surface 142. Although not shown, a mechanism may also be included to rotate the light element 112. In the illustrated example, specimen 20(f) has been provided to the Fourier ptychographic imaging device 100(f) for imaging. In some cases, the light element 112(f) may be a laser.

In FIG. 8, the light element 112(f) is moved by rotating it, which provides illumination at $(\theta_x^i, \theta_y^i)$. In FIG. 8, the light element 112(f) is shown providing illumination at sample time, $t_i$ in the measurement process. The optical element 130(f) receives and filters light issuing from specimen 20(f). Light filtered by the optical element 130(f) is received at the sensing surface 142 of the radiation detector 140(f). The radiation detector 140(f) senses the intensity distribution of the filtered light and captures a low-resolution intensity image of the area. Although Fourier ptychographic imaging device 100(f) is shown at a single sample time, $t_i$, the Fourier ptychographic imaging device 100(f) can operate at a plurality of N sample times, $t_{i=1\ to\ N}$, associated with N incidence angles $(\theta_x^i, \theta_y^i)$, i-1 to N to capture N low-resolution two-dimensional intensity images.

High NA Configurations

FIG. 9 depicts an illustration of an orthogonal view of components of a Fourier ptychographic imaging device 100(g), according to embodiments. The Fourier ptychographic imaging device 100(g) is an example of an high NA configuration.

In FIG. 9, the high NA Fourier ptychographic imaging device 100(g) comprises a circular variable illuminator 110(g), an optical system 130(g) having an objective 134(g) (e.g., microscope objective) and a tube lens 132(g), and a radiation detector 140(g). In this illustration, the objective 134(g) is the collection (first) optical element of the optical system 130(g). The objective 13(g) has a relatively high NA (e.g., in the range of about 0.60 to about 0.75). A sample 20(g) is shown on a specimen surface 126 as provided to the Fourier ptychographic imaging device 100(g).

In FIG. 9, the Fourier ptychographic imaging device 100(g) comprises a circular variable illuminator 110(g) having nine (9) discrete light elements 112(g) arranged in a single ring. In other cases, the circular variable illuminator 110(g) may be in the form of a multiple concentric rings, or in other arrangements. In the illustrated example, the angular spacing between adjacent light elements 112(g) is 40 degrees and the diameter of the ring is 40 mm. In other cases, the angular spacing between adjacent light elements (e.g., LEDs) may be about 2 degrees. In other cases, the angular spacing between adjacent light elements (e.g., LEDs) may be in a range of between about 2 degrees to 40 degrees. In other cases, the diameter of the ring(s) may be in the range of about 20 mm to 40 mm.

In certain aspects, a Fourier ptychographic imaging system may include a circular variable illuminator with light elements arranged in one or more concentric rings (e.g. 1, 2, 3, etc.). In FIG. 9, for example, the circular variable illuminator 110(g) comprises light elements in the form of a single ring. The diameters of multi-ring arrangements may be in the range of about 10 mm to about 60 mm. In many cases, the light elements in each ring are equi-spaced (separated by a uniform angular difference between adjacent light elements), however, other spacings may be used. In many cases, each ring will have a different number of light elements. In other cases, each ring will have the same number of light elements.

Using a circular variable illuminator with light elements arranged in one or more concentric circles e.g., those with equi-spaced light elements, can help improve uniformity of overlapping information. This uniformity may result in improved image quality as compared with images from systems that use variable illuminators with light elements in other arrangements. For example, in cases where the rectangular array variable illuminator has a rectangular grid arrangement of elements, the expanded region in Fourier space may not be as uniform in the radial direction. As you can see from the illustrations in FIGS. 10A and 10B associated with the system using light elements arranged in concentric rings, the expanded region 280 in Fourier domain is substantially circular so that the information in the higher frequencies associated with moving out radially will be substantially uniform. In comparison, an expanded region associated with a rectangular arrangement of light elements is substantially rectangular so that the information at the higher frequencies will not be as uniform.

In FIG. 9, each light element 112(g) is illustrated as an LED, although other types of light elements can be used. In this example, each light element 112(g) has a radiation source when illuminated. As denoted by the dotted line, each light element 112(g) sequentially and individually lights up to provide illumination 114(g) with a wavevector of (kx, ky). In this case, the sample 20(g) can be illuminated from 9 different incidence angles by illumination provided by the each of the 9 light element 112(g). In one example operation, the sample 20(g) is illuminated from 9 different incidence angles at different acquisition times, the optical system 130(g) collects light issuing from the illuminated sample 20(g), the objective lens 134(g) filters light issuing from the sample based on its acceptance angle, the tube lens focuses the filtered light to the radiation detector 140(g), and the radiation detector 140(g) captures nine (9) intensity images at the acquisition times.

In FIG. 9, the circular variable illuminator 110(g) is located to provide illumination 114(g) in a trans-illumination mode i.e. illumination 114(g) is directed through the sample 20(g). In another case, the variable illuminator 110(g) may be located to provide illumination in an epi-illumination mode, e.g., located on the same side of the sample 20(g) as the objective lens 134(g).

In certain aspects, illumination from a variable illuminator at an incidence angle approximates plane wave illumination. Illumination by an oblique plane wave with a wavevector (kx, ky) is generally equivalent to shifting the center of the sample's spectrum by (kx, ky) in the Fourier domain. Here, $k_x = k_0 \cdot \cos x$ (cosine of angle between illumination wavevector and x-axis); $k_y = k_0 \cdot \cos y$ (cosine of angle between illumination wavevector and y-axis); and $$k_0 = \frac{2\pi}{\lambda}.$$

The pupil function (i.e. coherent optical transfer function) of the filtering optical element (e.g., objective lens 134(g) in FIG. 9) in Fourier space can be described as a circular shape low-pass filter with a radius of $NA_{obj} \cdot k_0$ which is $$NA * \frac{2\pi}{\lambda}$$

in this case, where $NA_{obj}$ is of the filtering optical element. Thus, each intensity image acquired by the radiation detector based on the approximated plane wave illumination with wavevector (kx, ky) from the variable illuminator contains sample's spectrum information centered at about (kx, ky) in the Fourier domain. With illumination having a wavevector of (kx ky) or ($k_0 \cdot \cos x$, $k_0 \cdot \cos y$), the image captured by the system contains spatial frequency information as high as $k_0 \cdot [NA_{obj} + \sqrt{(\cos^2 x + \cos^2 y)}]$, where $\sqrt{(\cos^2 x + \cos^2 y)} = NA_{ill}$ is the numerical aperture of the illumination. The synthesized NA of the system can be described as $NA_{syn} = NA_{obj} + NA_{ill}$.

To exceed unity $NA_{sys}$ in a Fourier ptychographic imaging system, components are configured such that the $NA_{obj} + NA_{ill}$ sums up to greater than 1. For example, by using the high NA configuration shown in FIG. 9 with a circular variable illuminator having a circular ring of 9 light elements (e.g., LEDs), the $NA_{ill} = 0.70$ and with an filtering optical element in the form of an objective lens having $NA_{obj} = 0.75$ (e.g., 40×, 0.75 NA microscope objective lens), the resulting dry objective system has a $NA_{syn} = 1.45$ while retaining the field-of-view, and working distance of the objective lens. As another example, by using the using the high NA configuration shown in FIG. 9 with an oil immersion setup having a 100×1.4 NA objective for image acquisition and another 100×1.4 NA for illumination (by imaging the light elements at the back focal plane of the objective which could form collimated illumination with $NA_{ill} = 1.4$), the $NA_{sys}$ could be as high as 2.8.

In some aspects, an iterative recovery process can be used to stitch the information at each of these regions associated with the plurality of incidence angles to expand the information in the Fourier domain to capture higher frequency information at the outer regions and to capture uniformly overlapping and wider regions of information, which can result in higher resolution images of the sample. This expansion of the intrinsic $NA_{obj}$ of the filtering optical element may generate an expanded synthetic NA of the system.

Figure 10A:
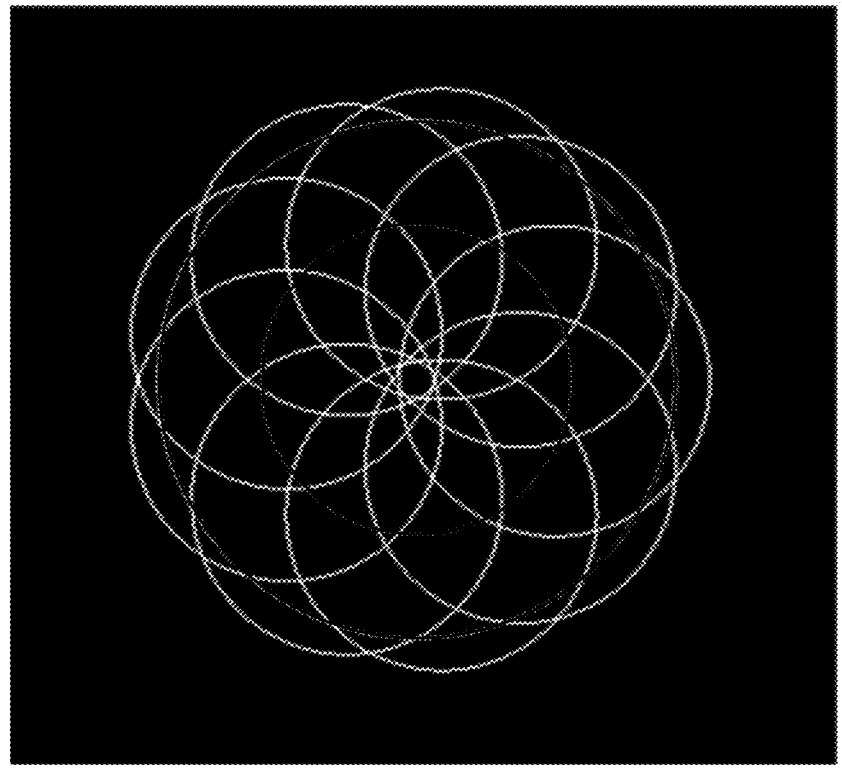
FIGS. 10A and 10B depict an expansion in the Fourier domain for the high NA configuration shown in FIG. 9.
Figure 10B:
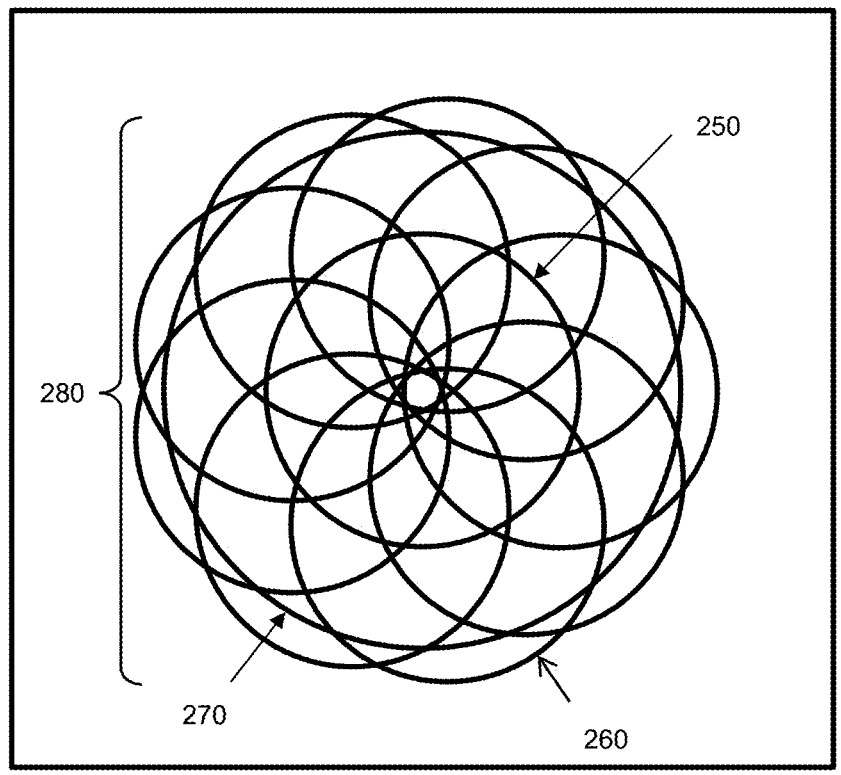

In certain high NA Fourier ptychographic imaging systems described herein, the filtering optical element has a relatively high NA in order to capture higher frequency information for each incidence angles, which corresponds to a wider circular region for each incidence angle in the Fourier domain, which can result in an image having a better resolution than about 400 nm. For example, a Fourier ptychographic imaging system with the Fourier ptychographic imaging device 110(g) shown in FIG. 9 is a high NA configuration. In this example, the objective lens 134 has a relatively high NA, for example, in a range of about 0.6 to about 0.75. In addition, the variable illuminator 110(g) has nine (9) light elements (e.g., LEDs) in s ring. FIG. 10A is an illustration depicting the expansion in the Fourier domain for this high NA configuration shown in FIG. 9, of an embodiment. FIG. 10B is the illustration of FIG. 10A shown on a white background for clarification of certain details.

Certain Fourier ptychographic imaging systems described herein use angularly varying illumination to acquire high frequency information about the sample. In certain cases, such as with a system having the high NA configuration shown in FIG. 9, the system acquires higher frequency information by using a higher NA filtering optical element and/or by increasing the range of incidence angles used by the variable illuminator. Using an iterative recovery process (e.g. iterative phase retrieval process), the high frequency information about the sample can be "stitched" together in the Fourier domain, such as shown in FIGS. 10A and 10B, which means that an expanded synthesized NA and finer resolution has been generated in the space domain.

In FIGS. 10A and 10B, the center circular region 250 represents the range of information that can be captured by the objective lens 134(g) (e.g., NA=0.60). Each of the nine (9) overlapping circular regions 260 represents the range of information captured by the same objective lens 134(g) at oblique angle illumination. Each overlapping circular region 260 corresponds to one of the nine (9) different incidence angles. The circular region 280 shows the range of information captured by the objective 134(g) at the (9) different incidence angles. For reference, a circular region 270 is illustrated to show the range of information captured by a unity NA objective. As shown, the circular region 280 of the range of information captured by the objective at the (9) different incidence angles is larger than the circle 270 of the unity NA objective i.e. the NA is greater than 1.0. That is, by overlapping circular regions in Fourier space, the combined region can form an NA of more than 1.0. In configurations where the intrinsic NA of the objective may be lower than 0.6, more LEDs can be arranged (either circularly or in a square array) to provide enough illumination angle, such that the area inside NA=1.0 can be fully occupied in the Fourier domain.

With oil immersion technology, a conventional microscope can achieve a maximum NA of 1.0. Using a Fourier ptychographic imaging system in a high NA configuration, such as with the Fourier ptychographic imaging device 100(*g*) shown in FIG. 9, the NA of the filtering optical element is relative high and the resulting expanded NA of the system has been shown to exceed 1.0.

Figure 11A:
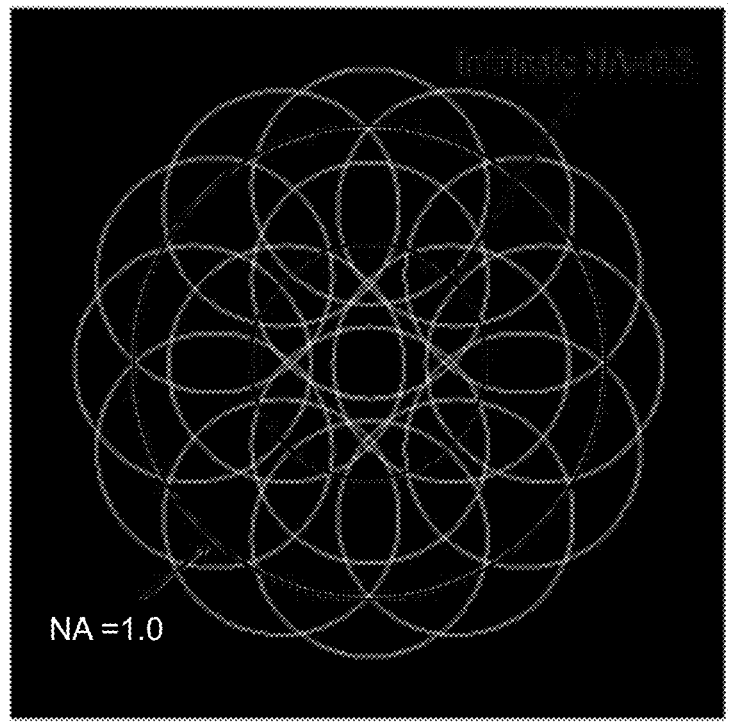
FIGS. 11A and 11B depict an expansion in the Fourier domain for a high NA configuration shown in FIG. 9 modified with a circular variable illuminator having two concentric rings.
Figure 11B:
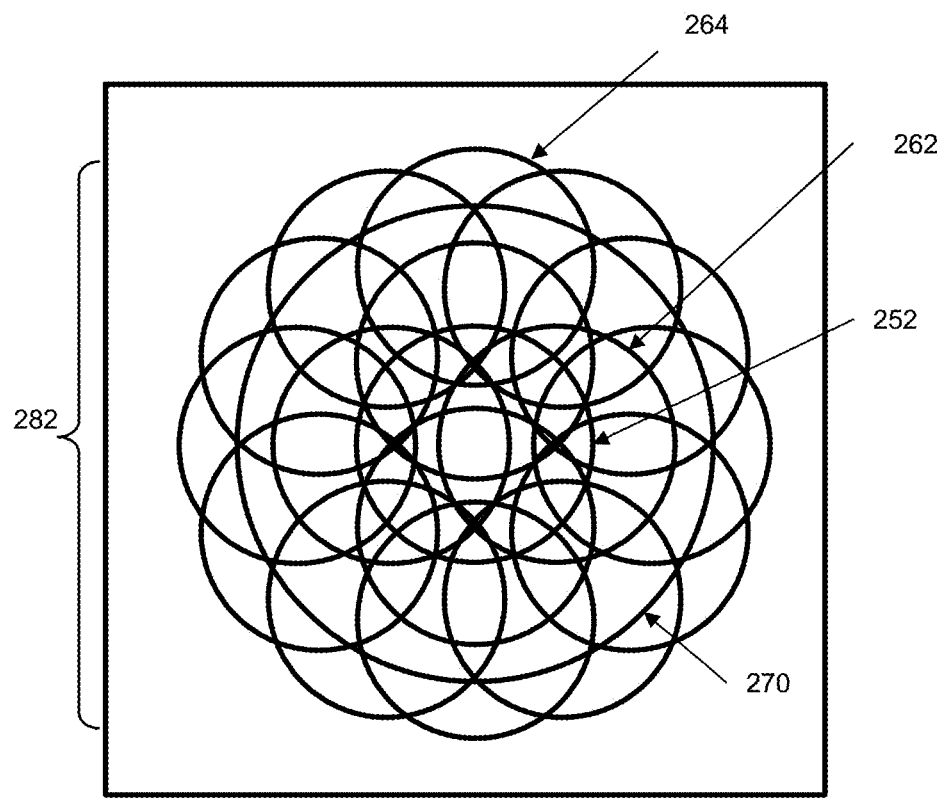

FIG. 11A is an illustration depicting the expansion in the Fourier domain for an high NA configuration similar to the one shown in FIG. 9, but with a variable illuminator having two concentric circles (rings) of light elements (four elements on an inner ring and 12 light elements on an outer ring) and with an objective having an NA of 0.50, according to an embodiment. The inner ring has four (4) light elements and the outer ring has twelve (12) light elements. FIG. 11B is the illustration of FIG. 11A shown on a white background for clarification of certain details.

In FIGS. 11A and 11B, the center circular region 252 represents the range of information that can be captured by an objective lens having NA=0.50. The four (4) overlapping circular regions 262 (corresponding to the inner ring of the variable illuminator) represent the range of information captured by the objective lens with NA=0.50 at oblique angle illumination at four corresponding incidence angles. Each overlapping circular region 262 corresponds to one of the four (4) different incidence angles. The twelve (12) overlapping circular regions 264 (corresponding to the outer ring of the variable illuminator) represent the range of information captured by the objective lens with NA=0.50 at oblique angle illumination at 12 corresponding incidence angles. Each overlapping circular region 264 corresponds to one of twelve (12) different incidence angles.

The circular region 282 shows the expanded range of information captured by the objective 134 having an NA of 0.50 at 16 different incidence angles. For reference, a circular region 270 is illustrated to show the range of information captured by a unity NA objective. As shown, the circular region 282 of the expanded range of information captured by the objective at the sixteen (16) different incidence angles is larger than the circle 270 of the unity NA objective.

FIG. 12 depicts an illustration of an orthogonal view of components of a Fourier ptychographic imaging device 100(*h*), according to an embodiment. The Fourier ptychographic imaging device 100(*h*) is an example of an high NA configuration. In FIG. 12, the Fourier ptychographic imaging device 100(*h*) comprises a rectangular array variable illuminator 110(*h*), an optical system 130(*h*) having an objective 134(*h*) (e.g., microscope objective) and a tube lens 132(*h*), and a radiation detector 140(*h*). In this illustration, the objective 134(*h*) is the collection (first) optical element of the optical system 130. The objective 132(*h*) has a relatively high NA (e.g., in the range of about 0.50 to about 0.75). A sample 20(*h*) is shown on a specimen surface 126(*h*) as provided to the Fourier ptychographic imaging device 100(*h*).

In FIG. 12, the rectangular array variable illuminator 110(*h*) is located to provide illumination 114(*h*) in a trans-illumination mode i.e. illumination 114(*h*) is directed through the sample 20(*h*). In another case, the variable illuminator 110(*h*) may be located to provide illumination in an epi-illumination mode, e.g., located on the same side of the sample 20(*h*) as the objective lens 134(*h*).

In FIG. 12, the Fourier ptychographic imaging device 100(*h*) comprises a variable illuminator 110(*h*) having light elements 112(*h*) in a rectangular grid arrangement with 225 equi-spaced light elements that corresponds to a 15×15 square array. Other numbers and arrangements of light elements can be used. In the illustrated example, the spacing between adjacent light elements 112(*h*) is in a range of about 2 degrees to about 40 degrees.

In FIG. 12, each light element 112(*h*) is illustrated as an LED, although other types of light elements can be used. In this example, each light element 112(*h*) has a radiation source when illuminated. During operation, each light element 112(*h*) sequentially and individually lights up to provide illumination 114(*h*) with a wavevector of (kx, ky). In this case, the sample 20(*h*) can be illuminated from 225 different incidence angles by illumination provided by the each of the 225 light element 112(*h*). In one example operation, the sample 20(*h*) is illuminated from 225 different incidence angles at 225 different acquisition times, the optical system 130(*h*) collects light issuing from the illuminated sample 20(*h*), the objective lens 134(*h*) filters light issuing from the sample based on its acceptance angle, the tube lens focuses the filtered light to the radiation detector 140(*h*), and the radiation detector 140(*h*) captures 225 intensity images at the 225 acquisition times.

Epi-Illumination Configurations

FIGS. 13, 14, 15, and 16 depict schematic diagrams of side views of components of reflection-mode configurations (configurations in epi-illumination mode) of Fourier ptychographic imaging devices, according to embodiments. Each of these Fourier ptychographic imaging devices are configured to locate a variable illuminator on the same plane (e.g., FIG. 13) or behind the plane (e.g. FIGS. 14, 15, and 16) of the imaging optics. These illustrated devices are shown in epi-illumination mode. Some examples of primary applications for reflection-mode configurations include metal or semiconductor surface inspection, including semiconductor wafer, chip, and/or electronic circuit board inspection, among others. Secondary applications may extend to systems that can be applied in epi-illumination mode such as hand-held cameras with a modified flash system, or satellite imagery.

Figure 13:
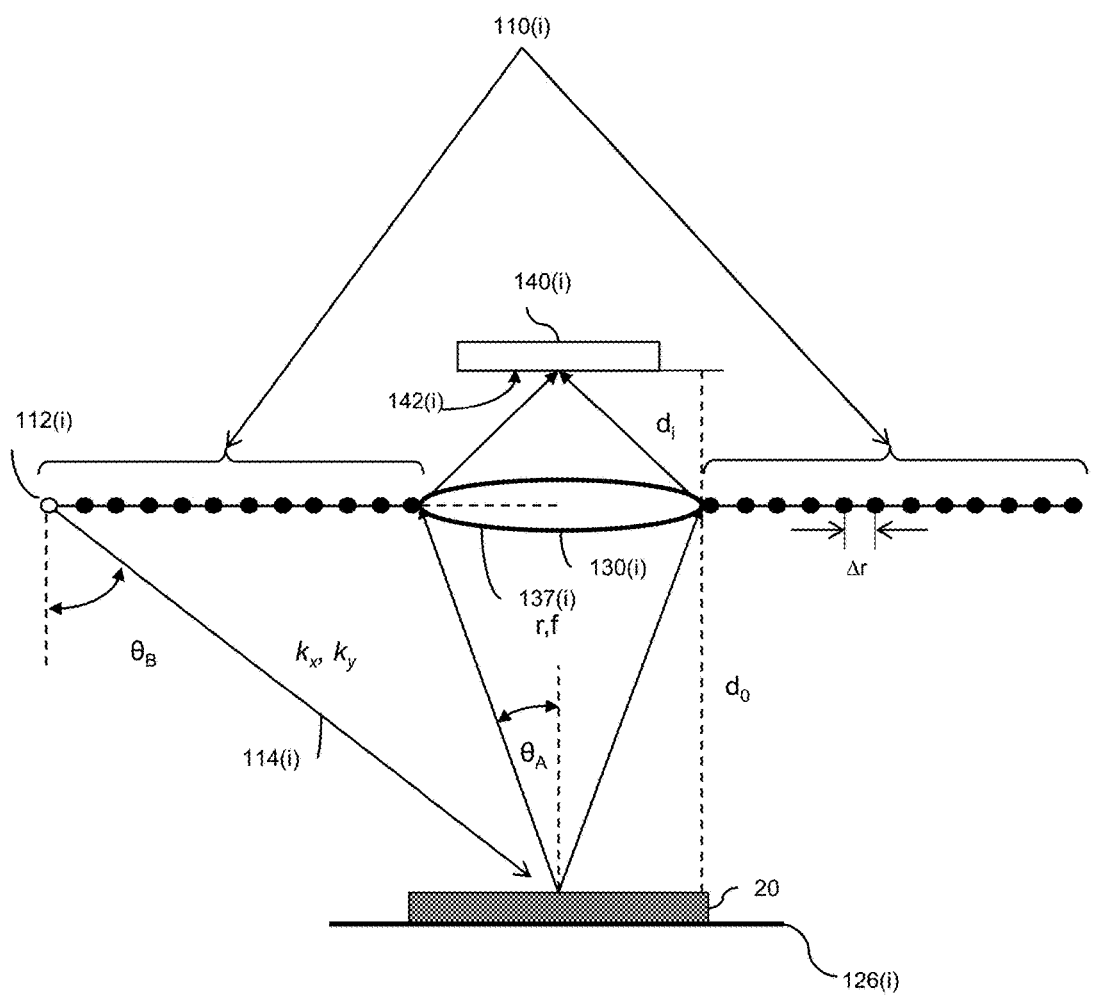
FIG. 13 depicts an orthogonal view of components of a Fourier ptychographic imaging device in epi-illumination mode.

FIG. 13 depicts an illustration of an orthogonal view of components of a Fourier ptychographic imaging device 100(*i*), according to certain embodiments. The Fourier ptychographic imaging device 100(*i*) comprises a circular variable illuminator 110(*i*), an optical system 130(*i*) comprising a filtering optical element in the form of an imaging lens 137(*i*), and a radiation detector 140(*i*) having a detector plane 142. A sample 20(*i*) is shown on a specimen surface 126(*i*) as provided to the Fourier ptychographic imaging device 100(*i*).

In FIG. 13, the imaging lens 137(*i*) has a focal length f, a radius r, and an acceptance angle $2\theta_A$. The imaging lens 137(*i*) may have an NA in the range of about 0.60 to about 0.75. In the illustrated example, the imaging lens 137(*i*) may be similar to a large camera lens so that the working distance $d_o$ is large such as, for example, about 10-20 cm. In other examples, a smaller lens may be uses, such as a microscope lens, in which case the working distance $d_o$ would be smaller such as, for example, 2-3 cm.

In FIG. 13, the circular array variable illuminator 110(i) comprises light elements 112(i) (e.g., LEDs) arranged in 12 concentric rings (e.g., circular LED rings) equally spaced between each ring and centered around a central axis and around the imaging lens 137(i). Other numbers concentric rings may be used in other cases such as 1, 2, 3, 4, 5, 6, etc. In this illustrated example, the light elements 112(i) are located at the sample plane of the imaging lens 137(i). In other cases, the light elements 112(i) may be at an offset plane, but remain on the same side of the sample 20(i) as the imaging lens 137(i) in order to provide illumination in a epi-illumination mode. In the illustrated example, the rings are equi-spaced from each other with a radial spacing defined as Δr. In this illustrated example, the Fourier ptychographic imaging device 100(i) has a variable illuminator 110(i) that is located at a distance, equal to the working distance $d_o$, above the sample 20(i) to provide epi-illumination mode.

In FIG. 13, the resolution Fourier ptychographic imaging device 100(i) is shown at a single illumination time and/or acquisition time. At this time, a single light element 112(i) of the variable illuminator 110(i) is activated to provide illumination 114(i) at an incidence angle of $\theta_B$ with a wavevector of (kx,ky). At other times, the other light elements 112(i) may be providing illumination. In an example operation of a system comprising the variable illuminator of the Fourier ptychographic imaging device 100(i), the variable illuminator 110(i) generates illumination 114(i) to the sample 20(i) at a plurality of N incidence angles. The imaging lens 137(i) receives light from the sample 20(i) within its acceptance angle to filter the light. The optical system 130(i) propagates the filtered light to the radiation detector 140(i), which measures an intensity distribution to capture an intensity image at different incidence angles.

The illustrated example also includes a distance $d_i$ between the imaging lens 137(i) and the radiation detector 140(i) and a working distance $d_0$ between the imaging lens 137(i) and the sample 20(i). In one example, the Fourier ptychographic imaging device 100(i) may have the following relative dimensions: f=5 cm; $d_i$ 7.02 cm; $d_o$=17.3 cm; r=0.25 cm; $\theta_B$=30 degrees; and $\theta_A$=3 degrees.

The Fourier ptychographic imaging device 100(i) of FIG. 13 includes a variable illuminator 110(i) that does not have light elements at the center where the imaging lens 137(i) is located. Without light elements at the center, the images generated by the device 110(i) with this illuminator 110(i) will not include low spatial frequencies. In some applications, such as characterization of slowly-varying phase objects, or when accurate knowledge of the reflectance from the entire object surface is required, this low spatial frequency information may be valuable. The configuration shown in FIG. 13 has a large working distance and a simple design with few components. Since the configuration does not collect information at low spatial frequencies, this configuration is ideally suited for imaging of high resolution features or defects, for example, in chip inspection applications.

Figure 14:
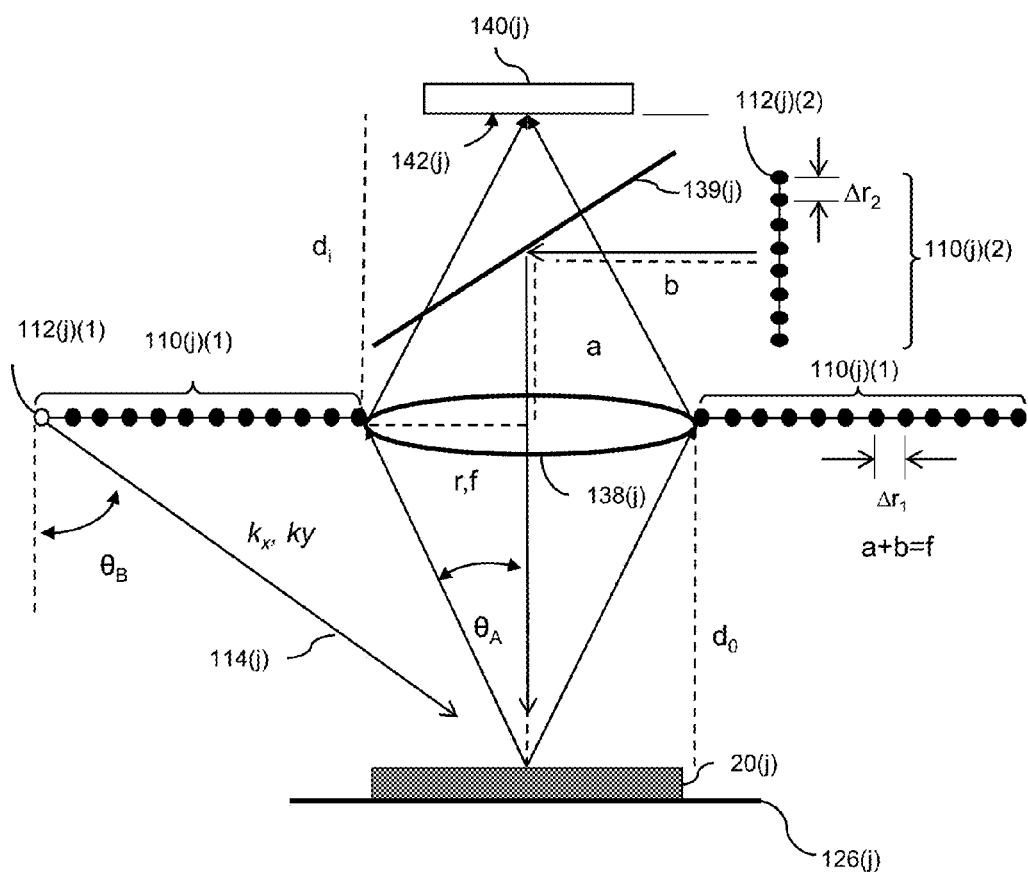
FIG. 14 depicts an orthogonal view of components of a Fourier ptychographic imaging device in epi-illumination mode.

FIG. 14 depicts an illustration of an orthogonal view of components of a Fourier ptychographic imaging device 100(j), according to certain embodiments. Certain components of the Fourier ptychographic imaging device 100(j) are similar to those of the Fourier ptychographic imaging device 100(i) shown in FIG. 13.

In FIG. 14, the Fourier ptychographic imaging device 100(j) is configured to capture low spatial frequencies that may be omitted by the configuration shown in FIG. 13. This Fourier ptychographic imaging device 100(j) is configured to capture low spatial frequencies by comprising a beam-splitter 139(j) and a second smaller set of concentric rings 110(j)(2) of light elements 112(j)(2) on the other side of the imaging lens 138(j) (imaging optics) so that the light elements 112(j)(2) are directed toward the image plane of the imaging optics. The second set of light elements 112(j)(2) are focused through the imaging optics to illuminate the sample with a plane wave at the sample plane. In certain cases, the configuration shown in FIG. 14 includes a larger aperture than the configuration shown in FIG. 13. The configuration shown in FIG. 14 may provide a large working distance as well.

In FIG. 14, the Fourier ptychographic imaging device 100(j) comprises a variable illuminator including a first set of concentric rings 110(j)(1) and a second set of concentric rings 110(j)(2), an optical system including comprises an imaging lens 138(j), a beam splitter 139(j), and a radiation detector 140(j) having a detector plane 142(j). A sample 20(j) is shown on a specimen surface 126 provided to the Fourier ptychographic imaging device 100(j) during an acquisition process. The illustrated example shows a working distance $d_o$ between the imaging lens 138(j) and the sample 20(j). The illustrated example also includes a distance $d_i$ between the imaging lens 138(j) and the radiation detector 140(j).

The beam-splitter 139(j) is configured to transmit half the illumination incident at a 45 degree angle to the beam-splitter 139(j) and not absorbed by the beam-splitter 139(j). The remaining half of the incident illumination (not absorbed) is reflected by the beam-splitter 139(j). For example, the beam splitter 139(j) may be comprised of a sheet of glass or other substrate with a coating designed to control the light accordingly. As another example, a beam splitter may be a half-silvered mirror with a continuous thin coating of reflective material (e.g., metal). Another example is a swiss cheese beam splitter which has a discontinuous coating with holes to obtain the desired ratio of reflection to transmission.

The imaging lens 138(j) has a focal length f, a radius r, and an acceptance angle of $2\theta_A$. In the illustrated example, the imaging lens 138(j) is configured to filter light by accepting light within its acceptance angle, $2\theta_A$. Examples of values that can be used in the illustrated configuration are: f=6 cm, r=1 cm, and $\theta_A$=5 degrees. Other focal lengths, radii, and acceptance angles can be used. To maintain a large lens-sample distance, the imaging lens 138(j) has a relatively low NA in the range of about 0.1 to about 0.3. In the illustrated example, the imaging lens 138(j) has an NA of about 0.16, which is a relatively low NA (e.g., about 0.08, about 0.09, about 0.10, in a range of between about 0.07 to about 0.20, etc.).

In the illustrated example, the imaging lens 138(j) may be, for example, a large camera lens having a focal length f of 6 cm and a radius r of 2 cm. If using a large camera lens, the Fourier ptychographic imaging device 100(j) will have a corresponding large working distance $d_o$ such as, for example, about 10-20 cm. In other examples, a smaller lens may be uses such as a microscope lens, in which case the working distance $d_o$ would be smaller such as, for example, 2-3 cm. In the illustrated example, $d_o$=12 cm and $d_i$=12 cm; other values may be used.

In FIG. 14, the optical path distance between the beam splitter 139(j) and the second set of concentric rings 110(j)(2) is designated as b and the optical path distance between the beam splitter 139(j) and the imaging lens 138(j) is designated as a. In the illustrated example, the optical system is configured so that the imaging lens 138 is located at a combined optical path distance of a+b=f from the second set of concentric rings 110(j)(2).

In FIG. 14, the variable illuminator of the Fourier ptychographic imaging device 100(j) comprises two sets of concentric rings (e.g., circular LED arrays) of light elements: a first set of twelve (12) equally-spaced concentric rings 110(j)(1) (e.g., a first LED array) and a second set of eight (8) equally-spaced concentric rings 110(j)(2) (e.g., a second LED array). Other numbers of concentric rings may be used in other cases such as 1, 2, 3, 4, 5, 6, etc. The first set of concentric rings 110(j)(1) comprises light elements 112(1) located at the plane of the imaging lens 138(j) and centered around the imaging lens 138(j). In other cases, the light elements 112(1) may be at one or more offset planes on the same side of the sample 20(j) as the imaging lens 138(j) to be configured for illumination in a epi-illumination mode. The first set of concentric rings 110(j)(1) are equally-spaced with a uniform radial spacing of $\Delta r_1$. The second set of concentric rings 110(j)(1) are equally-spaced with a uniform radial spacing of $\Delta r_2$. The first set of concentric rings 110(j)(1) are located at a distance, equal to the working distance $d_o$, above the sample 20(j).

In this illustrated example, the first set of concentric rings 110(j)(1) are centered around a central axis of the imaging lens 138(j) so that the first set does not have light elements 112(j)(1) across the center of the imaging lens 138(j). The second set of first set of concentric rings 110(j)(1) has light elements 112(j)(2) configured to provide illumination reflected by the beam splitter 139(j) through the imaging lens 138(j). The second set of concentric rings 110(j)(2) comprises light elements 112(j) (2) located at a plane that is at a combined optical path (a+b) of a focal length f from the imaging lens 138(j).

In FIG. 14, the Fourier ptychographic imaging device 100(j) is shown at a single illumination time and/or acquisition time. At this time, a single light element 112(j)(1) from the from the first set of concentric rings 110(j)(1) is shown providing illumination 114(j) at an incidence angle of $\theta_B$ with a wavevector of (kx,ky). At other times, the other light elements 112(j) (1) or 112(j)(2) may be providing illumination. If one of the light elements 112(j)(2) is illuminated, incident light is received by the beam splitter 139(j). Half the incident light received at the beam splitter 139(j) (and not absorbed) is reflected to the imaging lens 138(j) which propagates illumination to the sample 20(j). Since the beam splitter 139(j) passes half the incident illumination, in certain aspects, each of the light elements 112(j)(2) of the second set of concentric rings 110(j)(2) has a light source with about two (2) times (2×) the intensity of the light source of each of the light elements 112(j)(1) of the first set of concentric rings 110(j)(1). In certain cases, the intensity from the light elements 112(j)(2) may be adjusted to provide incident illumination at the sample 20 of about the same intensity as the incident illumination provided by the light elements 112(j)(1).

In an example operation of a system comprising the variable illuminator of the Fourier ptychographic imaging device 100(j), the light elements 112(j) (1) and 112(j) (2) of the variable illuminator generate illumination directed to the sample at a plurality of N incidence angles. Light reflected by the sample 20(j) is received at the imaging lens 138(j).

The imaging lens 138(j) receives light within its acceptance angle to filter the light. The imaging lens 138(j) propagates incident light to the beam splitter 139(j). Half the incident light from the imaging lens 138(j) is transmitted through the beam splitter 138(j) and propagated to the radiation detector 140(j), which measures the intensity distribution at different acquisition times to captures a plurality of intensity images at different incidence angles.

Figure 15:
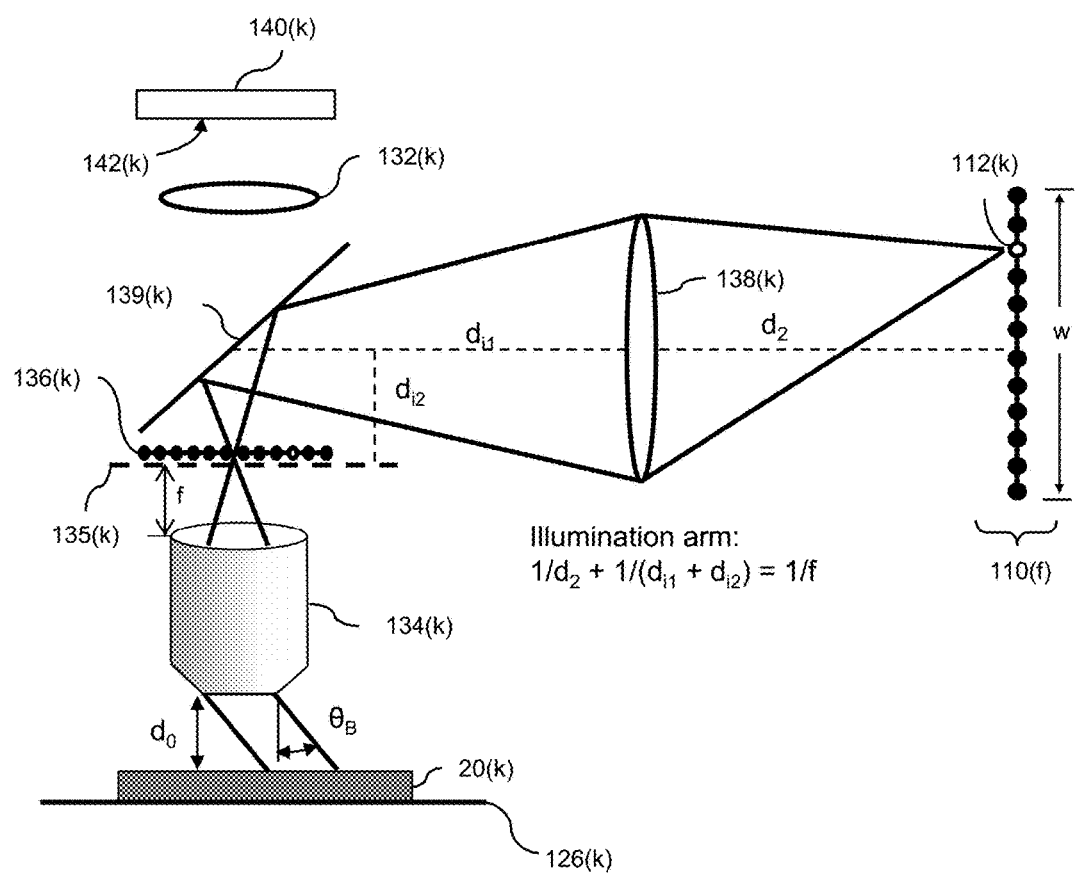
FIG. 15 depicts an orthogonal view of components of a Fourier ptychographic imaging device in epi-illumination mode.
Figure 16:
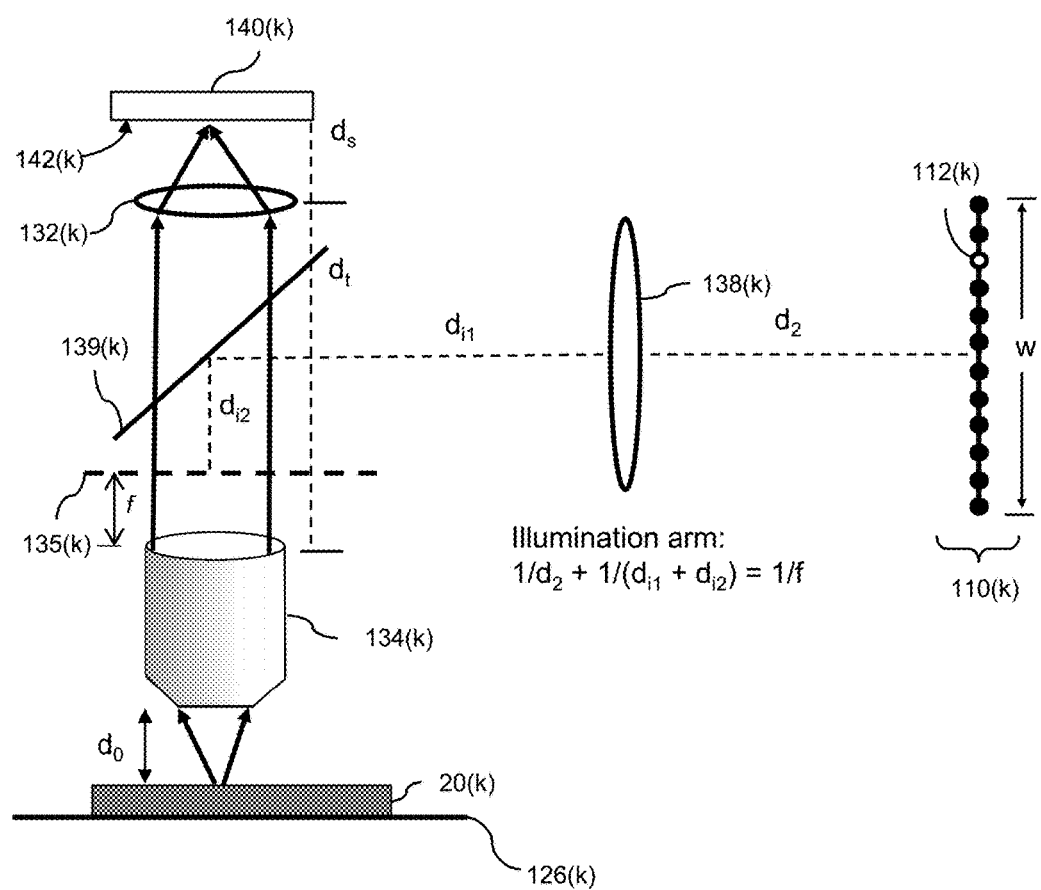
FIG. 16 depicts an orthogonal view of components of a Fourier ptychographic imaging device in epi-illumination mode

FIG. 15 and FIG. 16 depict illustrations of orthogonal views of components of a Fourier ptychographic imaging device 100(k), according to certain embodiments. FIG. 15 illustrates the illumination scheme and FIG. 16 illustrates the collection scheme of the Fourier ptychographic imaging device 100(k).

In FIG. 15 and FIG. 16, the Fourier ptychographic imaging device 100(k) comprises a variable illuminator 110(k) comprises twelve (12) concentric rings 110(k)(1) of light elements 112(k), an optical system, and a radiation detector 140(k) having a detector plane 142(k). The variable illuminator 110(k) comprises twelve (12) concentric rings 110(e) (1) of light elements 112(k). Other numbers of concentric rings may be used such as, for example, 1, 2, 3, 4, 5, 6, 7, 8, 9, ... 13, 14, 15, etc. The outermost concentric ring has a width w. The optical system comprises a objective 134(k) (e.g., microscope objective) with a focal length f, a tube lens 132(k), a secondary lens 138(k), and a beam splitter 139(k). Although the objective 134(k) is illustrated here as a microscope objective, another objective may be used. A sample 20(k) is shown on a specimen surface 126 as provided to the Fourier ptychographic imaging device 100(k). The illustrated example shows a working distance $d_o$ between the objective 134(k) and the sample 20(k). In the illustrated example, a microscope objective may be used so that the configuration has a short working distance such as, for example, 2-3 cm. One operational range could be with a 0.08 NA 2×objective lens with a ~2 cm working distance. Another could be with a 20×0.5 NA objective lens with a ~2 mm working distance.

In the illustrated configuration, the entire variable illuminator 110(k) (e.g., LED array) is located behind the objective 134(k) (primary imaging optics) and a secondary lens 130(k) is used to image the variable illuminator 110(k) to a back focal plane of the objective. In FIG. 15 and FIG. 16, the optical path distance between the beam splitter 139(k) and the secondary lens 138(k) is $d_{i1}$, the optical path distance between the secondary lens 138(k) is $d_2$, and the optical path distance between the beam splitter 139(k) and the back focal plane of the objective 134(k) is $d_{i2}$. In FIG. 15, an image 136 of the variable illuminator 110(k) is shown at the back focal plane 135 an optical distance of a focal length F from the back of the objective 134(k). To assure that the variable illuminator 110(k) image is formed on the back focal plane 135(k) of the objective 134(k), the components of the optical system are located so that the optical path distances follow this equation: $1/f=1/d_2+1/(d_{i1}+d_{i2})$. FIG. 16 also shows an optical distance of $d_s$ from the tube lens 132(k) to the radiation detector 140(k) and an $d_t$ between from the tube lens 132(k) to the back of the objective 134(k). The illustrated example includes an objective 134(k) that is a 2× microscope objective. In other examples, other objectives may be used. An example of values that can be used in the illustrated configuration are w=10 cm, the $d_2$=20 cm, the $d_{i1}+d_{i2}$=2 cm, and the f=1.9 cm. Other values can be used.

The beam-splitter 139(k) is configured to transmit half the illumination incident at a 45 degree angle to the beam-splitter 139(k) and not absorbed by the beam-splitter 139(k). The remaining half of the incident illumination (not absorbed) is reflected by the beam-splitter 139(k). For example, the beam splitter 139(k) may be comprised of a sheet of glass or other substrate with a coating designed to control the light accordingly. As another example, a beam splitter may be a half-silvered mirror with a continuous thin coating of reflective material (e.g., metal). Another example is a swiss cheese beam splitter which has a discontinuous coating with holes to obtain the desired ratio of reflection to transmission.

In FIG. 15, the resolution Fourier ptychographic imaging device 100(k) is shown at a single illumination time. At this time, a single light element 112(k) of the variable illuminator 110(k) is activated to provide illumination at an incidence angle of $\theta_B$ with a wavevector of $(k_x, k_y)$. At other times, other light elements 112(k) may be providing illumination at other incidence angles. Each light element 112(k) includes a light source that can provide illumination (e.g., approximately plane wave illumination) at a particular incidence angle to the sample 20(k).

As shown in FIG. 15, during an operation of a system comprising the variable illuminator of the Fourier ptychographic imaging device 100(k), different light elements 112(k) of the variable illuminator 110(k) are illuminated at different times. The secondary lens 138(k) receives illumination from the illuminated light element(s) 112(k) and propagates the illumination to the beam splitter 139(k). The beam splitter 139(k) transmits half the incident light and reflects half the incident light. The objective 134(k) propagates incident light to the sample to illuminate it at a plurality of N incidence angles at different times. As shown in FIG. 16, during the operation of the system, light issuing from the sample 20(k) is received by the objective 134(k) acting as the filtering optical element of the optical system. The objective 134(k) propagates light to the beam splitter 139(k), which transmits half the light, not absorbed, and reflects the remainder. The tube lens 132(k) receives light passing through the beam splitter 139(k) and propagates light to the radiation detector 140(k). The radiation detector 140(k) measures the intensity distribution at different acquisition times to capture a plurality of intensity images at different incidence angles.

III. Fourier Ptychographic Imaging Methods

In certain aspects, a Fourier ptychographic imaging method comprises a measurement/acquisition process, a recovery/reconstruction process, and an optional display process. During the measurement process, the sample is illuminated from a plurality of N incidence angles ($\theta x_{i,j}$, $\theta y_{i,j}$), i=1 to n, j=1 to m, (N=n×m) using a variable illuminator. During this process, the optical system filters the light issuing from the illuminated sample to propagate filtered light to the radiation detector and the radiation detector receives the filtered light and acquires a plurality of M intensity images, $I_{k,l}$, k=1 to o and j=1 to p, where M=o×p. In certain cases, an intensity image is captured at each incidence angle. In certain aspects, the variable illuminator may be designed to generate illumination at certain incidence angles that generate intensity data that corresponds to regions that overlap in the Fourier domain by a certain amount and also cover outer higher frequency area. During the recovery process, the M intensity images are iteratively combined in the Fourier domain to generate higher-resolution image data (intensity and/or phase). At each iteration, a filter is applied in the Fourier domain for a particular plane wave incidence angle, an inverse Fourier transform is applied to generate a lower resolution image, the intensity of the lower resolution image is replaced with an intensity measurement from the radiation detector, a Fourier transform is applied, and the corresponding region in Fourier space is updated. During the optional display process, an image (e.g., higher-resolution image, acquired intensity image, etc.) and/or other output may be provided on a display. Generally, these methods alternate between two working domains: the spatial (x-y) domain and the Fourier (kx-ky) domain, where k represents the wavenumber.

In certain aspects, Fourier ptychographic imaging methods may comprise a phase retrieval technique that uses angular diversity to recover complex sample images. The recovery process alternates enforcement of known image data acquired in the spatial domain and a fixed constraint in the Fourier domain. This phase retrieval recovery can be implemented using various methods such as, for example, an alternating projections procedure, a convex reformulation of the problem, or any non-convex variant in-between. Instead of needing to translate a sample laterally (i.e. applying translational diversity), Fourier ptychographic imaging systems use methods that vary the spectrum constraint in the Fourier domain to expand the Fourier passband beyond that of a single captured image to recover a higher-resolution sample image.

In some cases, Fourier ptychographic imaging methods may also comprise an optional aberration correction process. An example of an aberration correction process is a re-focusing (propagating) process. Such a refocusing process may be useful where the sample was placed at a sample plane at $z=z_0$ where the in-focus plane of the optical element is located at position z=0. In other words, the image captured of the sample is not the image at the sample plane, but is the sample profile propagated by a distance of $-z_0$ from the in-focus plane of the optical element. In these cases, the method may re-focus the sample by propagating the image data by the $z_0$ distance back to the sample plane, without having to mechanically move the sample in the z-direction. The re-focusing (propagating) step(s) can be performed by multiplying a phase factor in Fourier space.

With reference to certain illustrated examples, subscript "h" refers to higher-resolution, subscript "l" refers to lower resolution intensity, subscript "f" refers to focused position, subscript "m" refers to measured, and subscript "s" refers to sampled.

Figure 17:
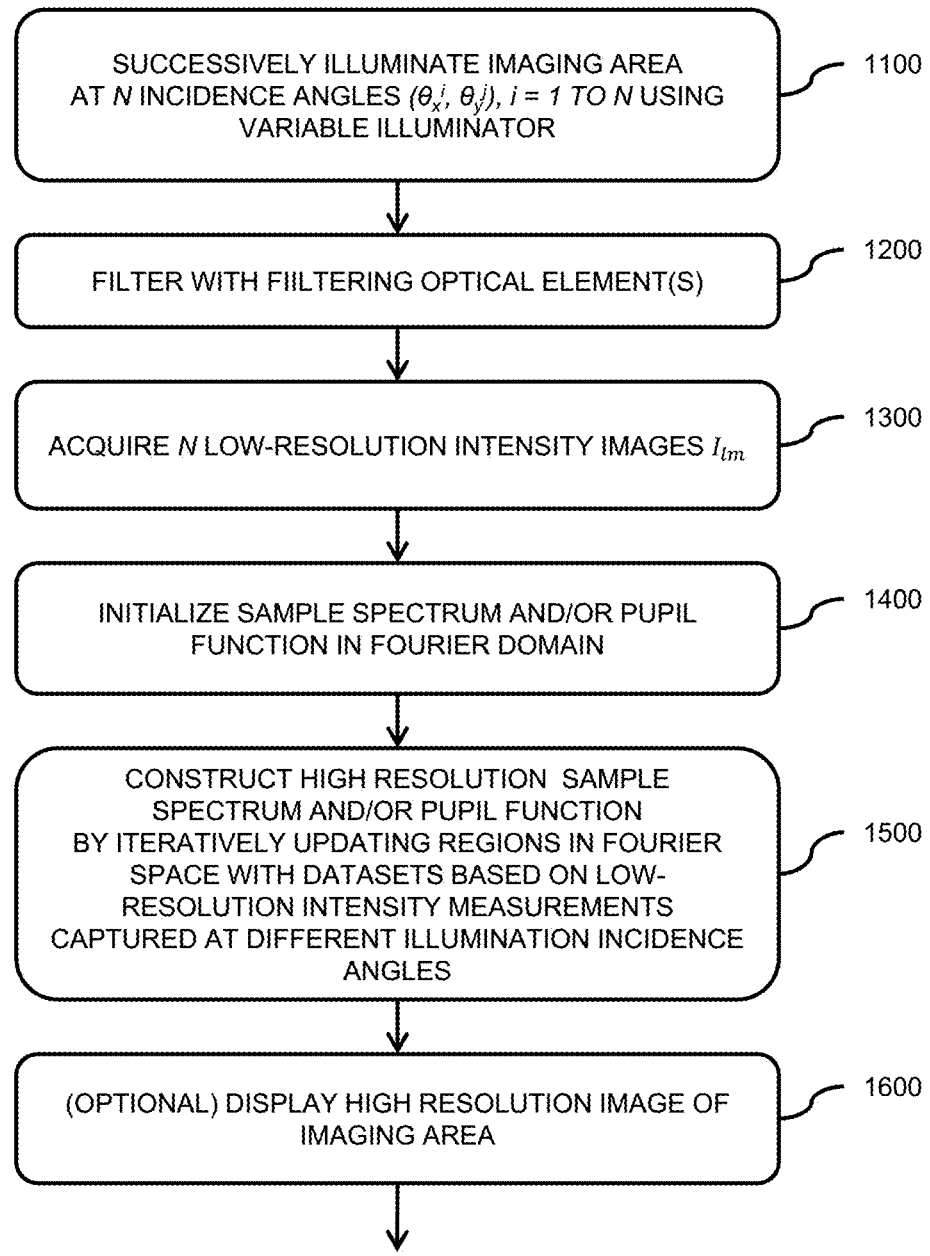
FIG. 17 is a flowchart of a Fourier ptychographic imaging method.

FIG. 17 is a flowchart depicting steps of a Fourier ptychographic imaging method, according to certain embodiments. This method is performed by a Fourier ptychographic imaging system such as, for example, the system 10 described with reference to FIG. 1. The Fourier ptychographic imaging method comprises a measurement process (steps 1100, 1200, and 1300), a recovery process (steps 1400 and 1500), and an optional display process (step 1600).

At step 1100, a variable illuminator provides illumination to a sample from a plurality of N incidence angles ($\theta x_{i,j}$, $\theta y_{i,j}$), i=1 to n, j=1 to m, at N sample times. In some cases, the variable illuminator controls the illumination provided to the sample based on illumination instructions. The illumination instructions may define the order of the illumination angles and the associated illumination time. The wave vector in x and y directions can be denoted as wavevector $kx_{i,j}$, $ky_{i,j}$.

In certain aspects, the variable illuminator may provide illumination of different wavelengths at different sample times. For example, the variable illuminator may provide RGB illumination of three wavelengths $\lambda_1$, $\lambda_2$, and $\lambda_3$ corresponding to red, green, blue colors, respectively, at different sample times, for example, in a color imaging embodiment.

In some cases, the variable illuminator is configured to provide plane wave illumination. Plane wave illumination with a wavevector, $k_x$, $k_y$, in the spatial domain, is equivalent to shifting the center of the image spectrum by $(k_x, k_y)$ in the Fourier domain. In this respect, the intensity image data in the Fourier domain is shifted from normal incidence image data by (kx, ky), which corresponds to the incidence angle $(\theta_x, \theta_y)$ applied by the variable illuminator.

At step 1200, the optical system collects light issuing from the sample and propagates it to the radiation detector. The optical system comprises a filtering optical element(s) that filters the light. For example, a filtering optical element may be an objective lens collecting light issuing from an illuminated sample. In this case, the objective lens filters the light issuing from the sample by only accepting light incident at a range of angles within its numerical aperture (NA). In Fourier space, the filtering function of a filtering optical element such as an objective lens may be represented by a circular pupil with radius of NA×$k_0$, where $k_0 = 2\pi/\lambda$ is the wave number in vacuum. That is, the Fourier ptychographic imaging method may update in Fourier space circular regions defined by this filtering function and the different incidence angles. In certain cases, the filtering optical element and its associated filtering function omits data outside the circular pupil region.

At step 1300, the radiation detector receives light propagated by the optical system and captures a snapshot intensity distribution measurement at each of the M sample times, $t_k$, k=1 to M, to acquire a plurality of M intensity images, $I_{k,l}$, k=1 to o and j=1 to p, associated with different incidence angles. Each intensity image sampled by the radiation detector is associated with a region in Fourier space. In many aspects, the variable illuminator is configured to provide illumination from incidence angles that will generate overlapping areas between neighboring (adjacent) regions (e.g., circular pupil regions) in Fourier space. In one aspect, the variable illuminator is designed to provide an overlapping area between neighboring regions of 2% to 99.5% of the area of one of the regions. In another aspect, the variable illuminator is designed to provide an overlapping area between neighboring regions of 65% to 75% of the area of one of the regions. In one aspect, the variable illuminator is designed to provide an overlapping area between neighboring regions of about 65% of the area of one of the regions.

At steps 1400 and 1500, a higher-resolution image of the sample may be recovered by updating the sample spectrum with overlapping datasets based on the M intensity distribution measurements acquired at step 1300. The M intensity images, $I_{k,l}$, k=1 to o and j=1 to p correspond to different incidence angles indexed by illumination wavevector $kx_{i,j}$, $ky_i$, i=1 to n, and j=1 to m.

At step 1400, an initial sample spectrum S(u) or and/or pupil function P(u) are initialized in the Fourier domain. For example, a higher-resolution image may be initialized in the spatial domain, and a Fourier transform then applied to the initial value to obtain also initial sample spectrum in the Fourier domain which is also referred to as an initial Fourier transformed image $\tilde{I}_h$. The initial sample spectrum may be an initial guess. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any lower-resolution image of the sample area. Another example of an initial guess is a constant value. The Fourier transform of the initial guess can be a broad spectrum in the Fourier domain.

At step 1500, a sample spectrum in Fourier space is constructed by iteratively updating regions in Fourier space with lower-resolution datasets based on the intensity measurements captured at different illumination incidence angles and then inverse Fourier transforming the solution to a higher resolution image of the sample in the spatial domain. In many cases, at least portions of step 1500 may be implemented using a processor (e.g., processor 210 of the system 10).

At optional step 1600, the display may receive image data such as the higher-resolution image data and/or other data from the processor, and display the data on a display (e.g., display 230 in FIG. 1).

A. Aberration Correction using Pre-Calibrated Aberration

Figure 18:
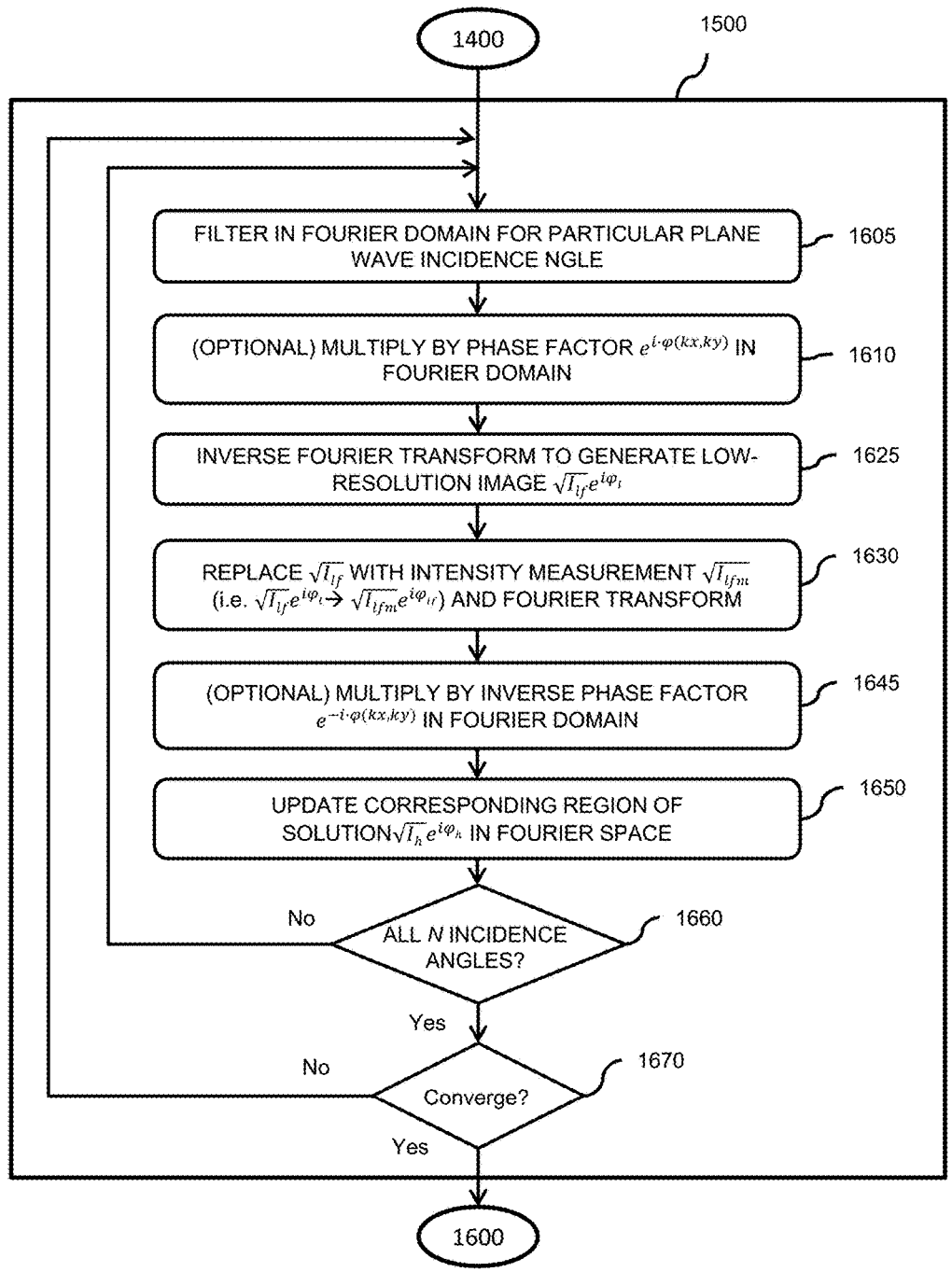
FIG. 18 is a flowchart of an example of certain sub-steps of one of the steps of the method of FIG. 17.

In certain aspects, the recovery process step 1500 may comprise an aberration correction process that introduces a phase map to the filtering function to compensate for aberrations at the pupil plane during the iterative image recovery process. FIG. 18 is a flowchart depicting an example of sub-steps of step 1500 of the Fourier ptychographic imaging method of FIG. 17 that optionally comprises an aberration correction process, according to certain aspects. In one example, the method described with respect to the flowchart in FIG. 18 can use an initial pupil function that is estimated from a pre-calibrated aberration.

In the illustrated flowchart, the optional aberration correction process comprises incorporating compensation at the two multiplication steps 1610 and 1645. Step 1610 models the connection between the actual sample profile and the captured intensity data (with includes aberrations) through multiplication with a pupil function: $e^{i\cdot\varphi(k_x, k_y)}$. Step 1645 inverts such a connection to achieve an aberration-free reconstructed image. For example, aberration correction can correct sample defocus. In certain cases, sample defocus may be essentially equivalent to introducing the following defocus phase factor to the pupil plane (i.e., a defocus aberration):

$$e^{i\cdot\varphi(k_x, k_y)} = e^{i\sqrt{(2\pi/\lambda)^2 - k_x^2 - k_y^2} \cdot z_0}, \quad k_x^2 + k_y^2 < (NA \cdot 2\pi/\lambda)^2 \quad \text{(Eqn. 1)}$$

where kx and ky are the wavenumbers at the pupil plane, $z_0$ is the defocus distance, and NA is the numerical aperture of the filtering optical element.

At step 1605, a processor performs filtering of the higher-resolution image $\sqrt{I_h}e^{i\varphi_h}$ in the Fourier domain to generate a lower-resolution image $\sqrt{I_l}e^{i\varphi_l}$ for a particular plane wave incidence angle $(\theta_x^i, \theta_y^i)$ with a wave vector $(kx_{i,j}, ky_{i,j})$. The Fourier transform of the higher-resolution image is $\tilde{I}_h$ and the Fourier transform of the lower-resolution image for a particular plane wave incidence angle is $\tilde{I}_l$. In the Fourier domain, the method filters a region from the spectrum $\tilde{I}_h$ of the higher-resolution image $\sqrt{I_h}e^{i\varphi_h}$. In cases with a filtering optical element in the form of an objective lens, this region is a circular pupil aperture with a radius of NA*$k_0$, where $k_0$ equals $2\pi/\lambda$ (the wave number in vacuum), given by the coherent transfer function of an objective lens. In Fourier space, the location of the region (e.g., location of center of circular region) corresponds to the corresponding incidence angle. For an oblique plane wave incidence with a wave vector $(kx_{i,j}, ky_{i,j})$, the region is centered about a position $(kx_{i,j}, ky_{i,j})$ in the Fourier domain of $\sqrt{I_h}e^{i\varphi_h}$.

At optional step 1610, the processor may multiply by a phase factor $e^{i\cdot\varphi(k_x, k_y)}$ in the Fourier domain as part of aberration compensation.

At step 1625, an inverse Fourier transform is taken to generate the lower resolution image region $\sqrt{I_{lf}}e^{i\varphi_{lf}}$.

At step 1630, the computed amplitude component $\sqrt{I_{lf}}$ of the lower-resolution image region at the in-focus plane, $\sqrt{I_{lf}}e^{i\varphi_{lf}}$, is replaced with the low-resolution intensity measurement $\sqrt{I_{lfm}}$ captured by the radiation detector. This forms an updated lower resolution image: $\sqrt{I_{lfm}}e^{i\varphi_{lf}}$. A Fourier transform is then applied to the updated lower resolution image data.

At optional step 1645, an inverse phase factor $e^{-i\cdot\varphi(k_x,k_y)}$ is applied in the Fourier domain.

At step 1650, the corresponding region of the higher-resolution solution $\sqrt{I_h}e^{i\varphi_h}$ in the Fourier domain corresponding to incidence wave vector ($k_x$, $k_y$) is updated with the updated lower resolution image data.

At step 1660, it is determined whether steps 1605 through 1650 have been completed for the different incidence angles associated with the captured images. If steps 1605 through 1650 have not been completed for these different incidence angles, steps 1605 through 1650 are repeated for the next incidence angle. The next incident angle is typically the next adjacent angle. In certain aspects, the neighboring (adjacent) regions are overlapping in Fourier space and are iteratively updated (e.g., by repeating steps 1605 through 1650 for each adjacent incidence angle). At the overlapping area between adjacent regions, there is data based on multiple samplings over the same Fourier space. The incidence angles of the illumination from the variable illuminator determine the overlapping area between the regions. In one example, the overlapping area between neighboring regions is in the range of about 2% to 99.5% of the area of one of the corresponding neighboring regions. In another example, the overlapping area between neighboring regions is in the range of about 65% to 75% of the area of one of the corresponding neighboring regions. In another example, the overlapping area between neighboring regions is about 65% of the area of one of the corresponding neighboring regions. In another example, the overlapping area between neighboring regions is about 70% of the area of one of the corresponding neighboring regions. In another example, the overlapping area between neighboring regions is about 75% of the area of one of the corresponding neighboring regions. In certain embodiments, each overlapping region has the same area.

At step 1670, it is determined whether a higher-resolution image data has converged. For example, a processor may determine whether the higher-resolution image data may have converged to be self-consistent. In one case, a processor compares the previous higher-resolution image data of the previous iteration or initial guess to the present higher-resolution data, and if the difference is less than a certain value, the image data may have converged to be self-consistent. If it is determined that the image data has not converged, then steps 1605 through 1670 are repeated. In one case, steps 1605 through 1670 are repeated once. In other cases, steps 1605 through 1670 are repeated twice or more.

If the image data has converged, the converged image data in Fourier space is transformed using an inverse Fourier transform to the spatial domain to recover a higher-resolution image $\sqrt{I_h}e^{i\varphi_h}$. If it is determines that the solution has converged at step 1670, then the method may proceed to optional step 1600 or the method may end.

Figure 19:
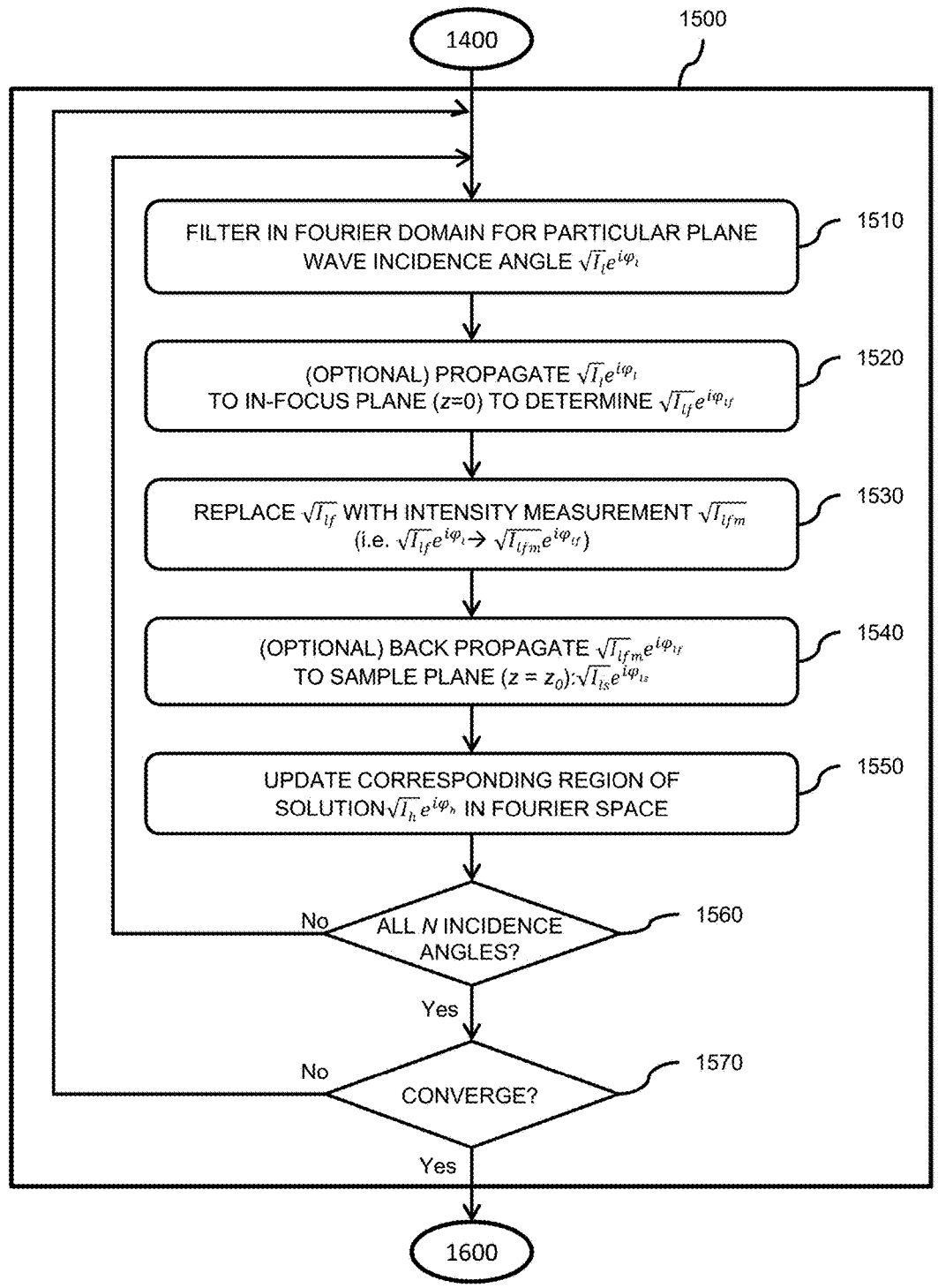
FIG. 19 is a flowchart of an example of certain sub-steps of one of the steps of the method of FIG. 17.

FIG. 19 is a flowchart depicting an example of sub-steps of step 1500 shown in FIG. 17, according to an embodiment. These sub-steps comprise an optional aberration correction process that corrects for defocus. In FIG. 19, step 1500 comprises step 1510, step 1530, step 1550, step 1560, step 1570, step 1580, and step 1590. In aspects that include aberration correction, step 1500 may further incorporate compensation at the two multiplication optional steps 1520 and 1540. For example, optional steps 1520 and 1540 can be used to focus an out-of focus sample that is out-of-focus by the amount of $z_0$.

At step 1510, a processor performs filtering of the higher-resolution image $\sqrt{I_h}e^{i\varphi_h}$ in the Fourier domain to generate a lower-resolution image $\sqrt{I_l}e^{i\varphi_l}$ for a particular plane wave incidence angle ($\theta x_{i,j}$, $\theta y_{i,j}$) with a wave vector ($kx_{i,j}$, $ky_{i,j}$). The Fourier transform of the higher-resolution image is $\tilde{I}_h$ and the Fourier transform of the lower-resolution image for a particular plane wave incidence angle is $\tilde{I}_l$. In the Fourier domain, the method filters a region from the spectrum $\tilde{I}_h$ of the higher-resolution image $\sqrt{I_h}e^{i\varphi_h}$. In cases with a filtering optical element in the form of an objective lens, this region is a circular pupil aperture with a radius of $NA*k_0$, where $k_0$ equals $2\pi/\lambda$, (the wave number in vacuum), given by the coherent transfer function of an objective lens. In Fourier space, the location of the region (e.g., location of center of circular region) corresponds to the corresponding incidence angle. For an oblique plane wave incidence with a wave vector ($kx_{i,j}$, $ky_{i,j}$), the region is centered about a position ($kx_{i,j}$, $ky_{i,j}$) in the Fourier domain of $\sqrt{I_h}e^{i\varphi_h}$.

At optional step 1520, the low-resolution image, $\sqrt{I_l}e^{i\varphi_l}$ propagated in the Fourier domain to an in-focus plane at $z=0$ of the optical system to determine the lower-resolution image at the focused position: $\sqrt{I_{lf}}e^{i\varphi_{lf}}$. In one case, optional step 1520 can be performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another case, optional step 1520 can be performed by the mathematically equivalent operation of convolving the low-resolution image $\sqrt{I_l}e^{i\varphi_l}$ with the point-spread-function for the defocus. In another case, optional step 1520 can be performed as an optional sub-step of step 1510 by multiplying $\tilde{I}_l$ by a phase factor in the Fourier domain before performing the inverse Fourier transform to produce $\sqrt{I_{lf}}e^{i\varphi_{lf}}$. In certain instances, optional step 1520 need not be included if the sample is located at the in-focus plane ($z=0$) of the filtering optical element.

At step 1530, the computed amplitude component $\sqrt{I_{lf}}$ of the lower-resolution image at the in-focus plane, $\sqrt{I_{lf}}e^{i\varphi_{lf}}$, is replaced with the square root of the low-resolution intensity measurement $\sqrt{I_{lfm}}$ measured by the radiation detector. This forms an updated low resolution target: $\sqrt{I_{lfm}}e^{i\varphi_{lf}}$.

At optional step 1540, the updated low-resolution image $\sqrt{I_{lfm}}e^{i\varphi_{lf}}$ may be back-propagated to the sample plane ($z=z_0$) to determine $\sqrt{I_{ls}}e^{i\varphi_{ls}}$. In certain instances, optional step 1540 need not be included if the sample is located at the in-focus plane of the filtering optical element, that is, where $z_0=0$. In one case, step 1540 can be performed by taking the Fourier transform of the updated low-resolution image $\sqrt{I_{lfm}}e^{i\varphi_{lf}}$ and multiplying in the Fourier space by a phase factor, and then inverse Fourier transforming it. In another case, step 1540 can be performed by convolving the updated low-resolution image $\sqrt{I_{lfm}}e^{i\varphi_{lf}}$ with the point-spread-function of the defocus. In another case, step 1540 can be performed as a sub-step of step 1550 by multiplying by a phase factor after performing the Fourier transform onto the updated target image.

At step 1550, a Fourier transform is applied to the updated target image propagated to the sample plane: $\sqrt{I_{ls}}e^{i\varphi_{ls}}$, and this data is updated in the corresponding region of higher-resolution solution $\sqrt{I_h}e^{i\varphi_h}$ in the Fourier space corresponding to the corresponding to the incidence wave vector $kx_{i,j}$, $ky_{i,j}$.

At step 1560, it is determined whether steps 1510 through 1560 have been completed for the different incidence angles associated with the captured images. If steps 1605 through 1650 have not been completed for these different incidence angles, steps 1510 through 1560 are repeated for the next incidence angle. The next incident angle is typically the next adjacent angle. In certain aspects, the neighboring (adjacent) regions are overlapping in Fourier space and are iteratively updated (e.g., by repeating steps 1510 through 1560 for each adjacent incidence angle). At the overlapping area between adjacent regions, there is data based on multiple samplings over the same Fourier space. The incidence angles of the illumination from the variable illuminator determine the overlapping area between the regions. In one example, the overlapping area between neighboring regions is in the range of about 2% to 99.5% of the area of one of the corresponding neighboring regions. In another example, the overlapping area between neighboring regions is in the range of about 65% to 75% of the area of one of the corresponding neighboring regions. In another example, the overlapping area between neighboring regions is about 65% of the area of one of the corresponding neighboring regions. In another example, the overlapping area between neighboring regions is about 70% of the area of one of the corresponding neighboring regions. In another example, the overlapping area between neighboring regions is about 75% of the area of one of the corresponding neighboring regions. In certain embodiments, each overlapping region has the same area.

At step 1570, it is determined whether a higher-resolution image data has converged. For example, a processor may determine whether the higher-resolution image data may have converged to be self-consistent. In one case, a processor compares the previous higher-resolution image data of the previous iteration or initial guess to the present higher-resolution data, and if the difference is less than a certain value, the image data may have converged to be self-consistent. If it is determined that the image data has not converged, then steps 1510 through 1560 are repeated. In one case, steps 1510 through 1560 are repeated once. In other cases, steps 1510 through 1560 are repeated twice or more. If the image data has converged, the converged image data in Fourier space is transformed using an inverse Fourier transform to the spatial domain to recover a higher-resolution image $\sqrt{I_h}e^{i\varphi_h}$. If it is determines that the solution has converged at step 1570, then the method may proceed to optional step 1600 or the method may end.

In certain aspects, the Fourier ptychographic imaging method described with reference to FIG. 17 can include an optional aberration correction process described with reference to either FIG. 18 or FIG. 22. In one aspect, the Fourier ptychographic imaging method includes the optional aberration correction process for refocusing described in optional steps 1520 and 1540 of FIG. 1 to refocus. The refocusing feature of optional steps 1520 and 1540 propagates the image from the in-focus plane z=0 to the sample plane at z=$z_0$. Refocusing may be needed when the sample is located at the sample plane at z=$z_0$, while the in-focus plane of the filtering optical element (e.g., objective lens) is located at position z=0. In other words, refocusing may be needed when the sample is out-of-focus by the amount of $z_0$.

Figure 20A:
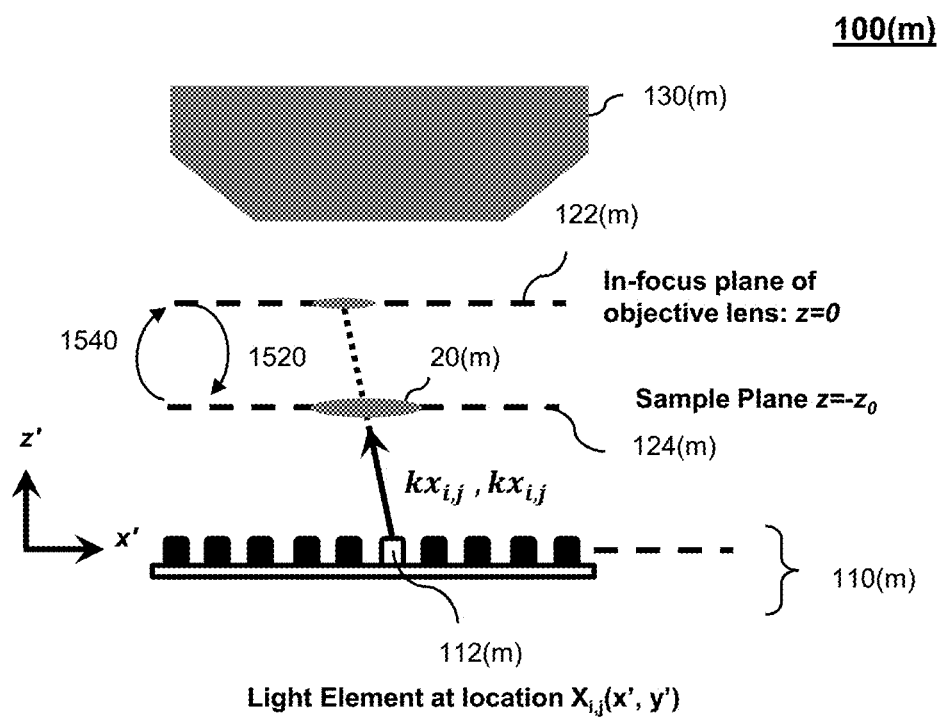
FIGS. 20A and 20B are schematic illustrations depicting components of a Fourier ptychographic imaging device in trans-illumination mode.
Figure 20B:
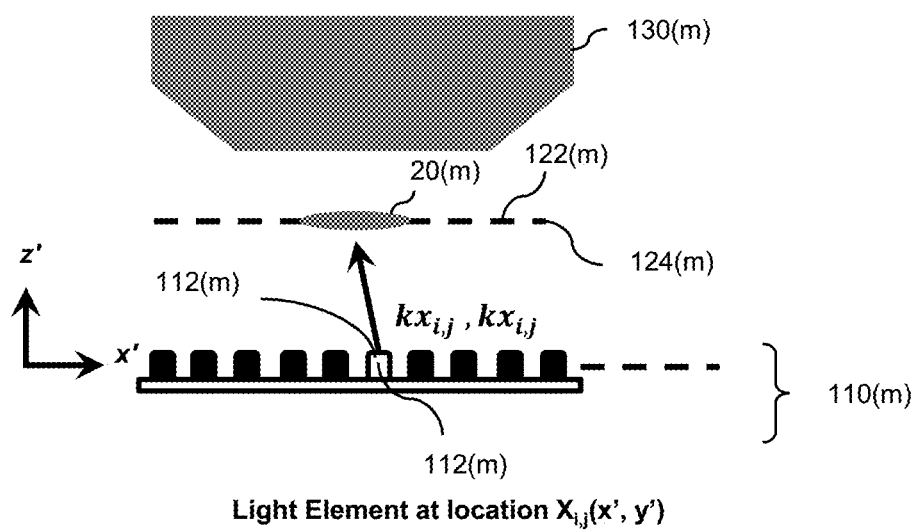

FIGS. 20A and 20B are schematic illustrations depicting components of a Fourier ptychographic imaging device 100(m) in trans-illumination mode, according to an embodiment. The Fourier ptychographic imaging device 100(m) comprises a variable illuminator 110(m) is in the form of a two-dimensional matrix of light elements (e.g. an LED matrix). In FIGS. 20A and 20B, a single light element 112(m) of the variable illuminator 110(m) at $X_{i,j}$(x',y') is shown as illuminated at the sample time being illustrated. The Fourier ptychographic imaging device 100(m) further comprises an optical system 130(m).

In FIG. 20A, the sample 20(m) is depicted as out-of-focus by an amount of $-z_0$, and optional steps 1520 and 1540 (depicted here as arrows) can be used to digitally refocus the sample 20(g) to the in-focus plane 122(m) as depicted by the dotted line to the in-focus plane 122(m). In FIG. 20B, the sample 20(m) is located at in-focus plane 122(m). In this case, optional steps 1520 and 1540 may not be needed.

Figure 21:
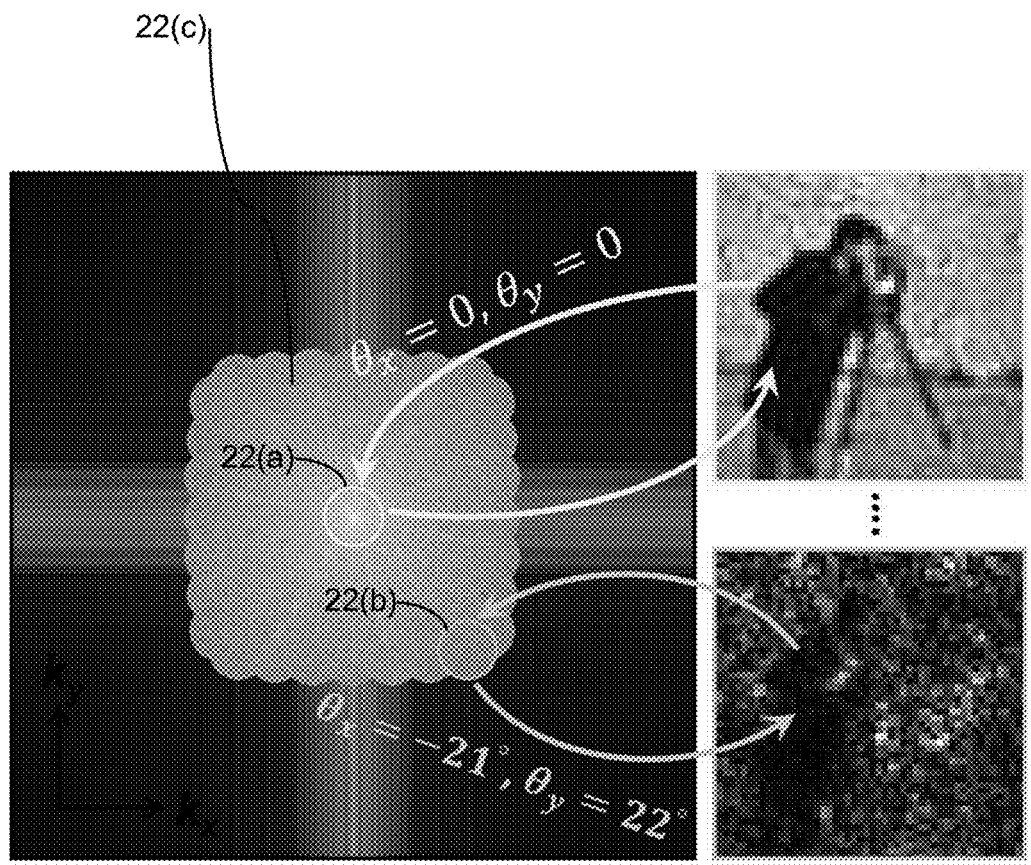
FIG. 21 is an illustration of certain steps of the Fourier ptychographic imaging method described with reference to FIGS. 10 and 12A.

FIG. 21 is an illustration of steps of the Fourier ptychographic imaging method described with reference to FIGS. 17 and 19, according to an embodiment. The left-hand-side image includes two circular regions 22(a) and 22(b) in Fourier space used to generate the higher-resolution image region. The circular regions 22(a) and 22(b) may be defined NA of the filtering optical element based on approximating as circular pupil function with a radius of NA*$k_0$, where $k_0$ equals $2\pi/\lambda$ (the wave number in vacuum). For example, each circular region 22(a) and 22(b) may be defined by the optical transfer function of a 2× objective lens 0.08 NA. In FIG. 21, region 22(a) is of a circular low-pass filter shape associated with a plane wave incidence angle: $\theta_x$=0; $\theta_y$=0, i=1 and Region 22(b) is of a circular low-pass filter shape associated with a plane wave incidence angle: $\theta_x$=−21°; $\theta_y$=22°. To perform filtering at each incidence angle, data outside the circular region in the Fourier domain is omitted, which results in a low-resolution data. The low-resolution image resulting from filtering based on plane wave incidence angle of $\theta_x$=−21; $\theta_y$=22° is shown at the top right-hand-side of FIG. 21. The low-resolution image resulting from filtering based on plane wave incidence angle of $\theta_x$=−21°; $\theta_y$=22° is shown at the bottom right-hand-side of FIG. 21. The wave vectors of the incidence angles in the x-direction and y-direction are denoted as kx and ky respectively.

When implementing the updating step 1550 of FIG. 19 or the updating step 1650 of FIG. 17, the method updates the data within the region 22(a) of the higher-resolution reconstruction 22(c) corresponding to the normal incidence $\theta_x$=0, $\theta_y$=0. The method also updates the data within the region 22(b) of the higher-resolution reconstruction corresponding to the $n^{th}$ incidence angle $\theta_x$=−21°; $\theta_y$=22°. The regions are updated with low-resolution image measurement data.

B. Tile Imaging

In certain aspects, a Fourier ptychographic imaging method may comprise tile imaging to divide the captured intensity images into a plurality of tile images, independently acquire a higher-resolution image for each of the tiles, and then combine the higher-resolution tile images to generate a full field-of-view higher-resolution image. In some cases, the higher-resolution tile images may be combined with an image blending process. An example of an image blending process is alpha blending which can be found in PCT publication WO1999053469, entitled "A system and method for performing blending using an over sampled buffer," filed on Apr. 7, 1999, which is hereby incorporated by reference in its entirety. Since higher-resolution images of the tiles may be acquired independently, this method may be well suited for parallel computing, which may reduce computational time, and may also reduce memory requirements. Moreover, the light from each light element may be accurately treated as a plane wave for each tile. The incident wavevector for each tile can be expressed as:

$$(k_x^i, k_y^i) = \frac{2\pi}{\lambda}\left(\frac{(x_c - x_i)}{\sqrt{(x_c - x_i)^2 + (y_c - y_i)^2 + h^2}},\right.$$

$$\left.\frac{(y_c - y_i)}{\sqrt{(x_c - x_i)^2 + (y_c - y_i)^2 + h^2}}\right) \quad \text{(Eqn. 2)}$$

where $(x_c, y_c)$ is the central position of each tile of the full field-of-view low-resolution image, $(x_i, y_i)$ is the position of the $i^{th}$ light element, and h is the distance between the variable illuminator and the sample. Furthermore, this method can assign a specific aberration-correcting pupil function to each tile in some cases.

Figure 22:
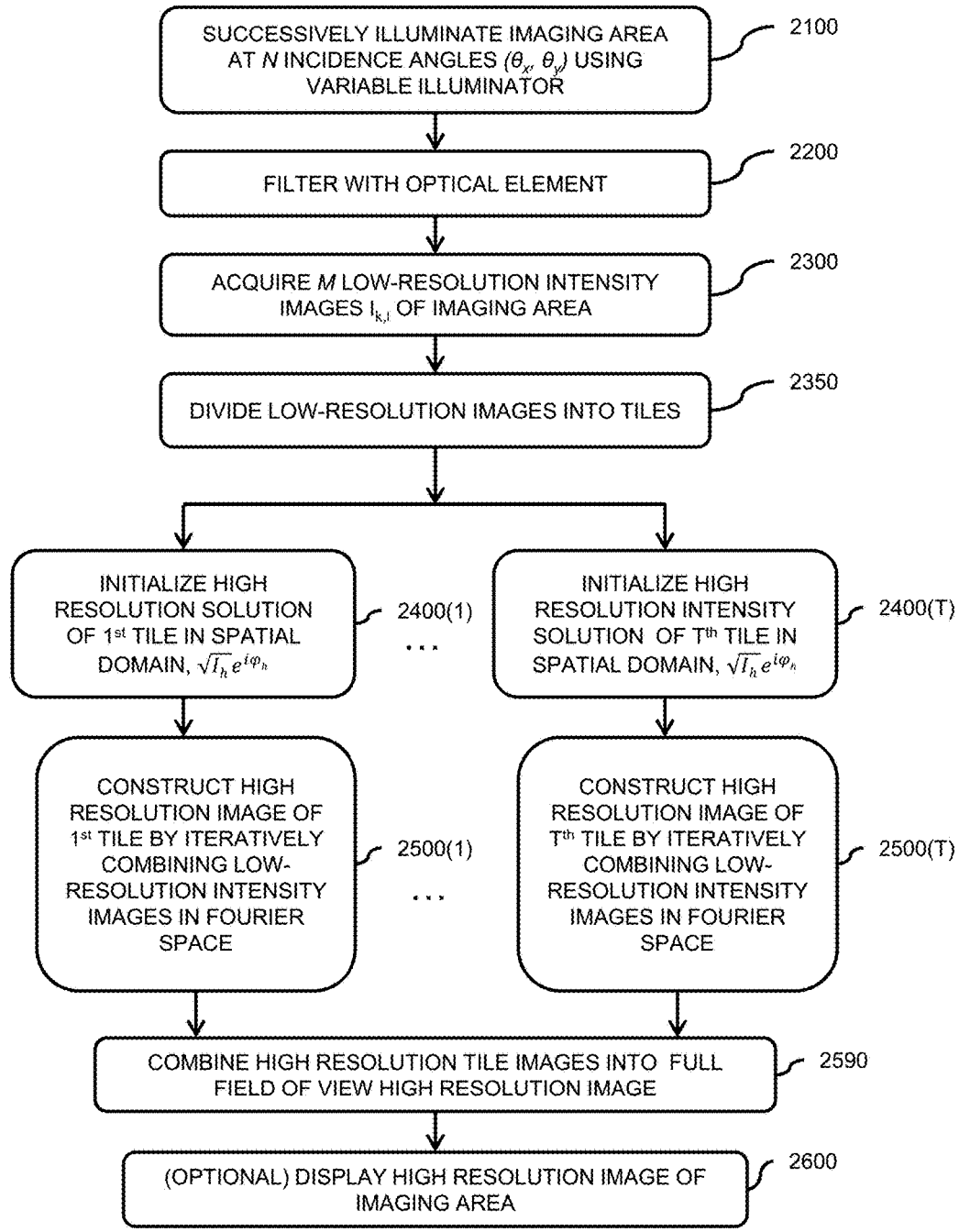
FIG. 22 is a flowchart of a Fourier ptychographic imaging method with tile imaging.

FIG. 22 is a flowchart depicting a Fourier ptychographic imaging method which includes tile imaging, according to an embodiment. This method can be performed by Fourier ptychographic imaging system of certain embodiments. To take advantage of parallel processing capabilities, the processor of the system should be configured with parallel processing capabilities such as, for example, the GPU unit or a processor having multiple cores (i.e. independent central processing units).

In FIG. 22 the Fourier ptychographic imaging method comprises a measurement process (steps 2100, 2200, and 2300), a recovery process (steps 2350, 2400 (i-M), 2500(i-M), 2590), and an optional display process (step 2600). The measurements process (steps 2100, 2200, and 2300) and optional display process (step 2600) are described with reference to FIG. 17.

At step 2350, the processor divides the full field-of-view into a plurality of tiles such as, for example, a two-dimensional matrix of tiles. The dimensions of a two-dimensional square matrix of tiles may be in powers of two such as, for example, a 256 by 256 matrix, a 64×64 matrix, etc. In one example, the processor may divide up a full field of view of 5,280×4,380 pixels into tiles having an area of 150×150 pixels.

Next, the processor initializes the higher-resolution image: $\sqrt{I_h}e^{i\varphi_h}$ in the spatial domain for each tile (1 to T) independently using parallel computing (step 2400(1) . . . step 2400(T)). A Fourier transform is applied to the initial guess. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_{k,l}$ of any low-resolution image of the sample area. Another example of an initial guess is a constant value. The Fourier transform of the initial guess can be a broad spectrum in the Fourier domain.

At step 2500(1) . . . step 2500(T), the processor reconstructs a higher-resolution image of each tile (1 to T) independently using parallel computing. The processor reconstructs the higher-resolution image of each tile by iteratively combining low-resolution intensity images in Fourier space. The recovery process described with respect to FIG. 18, 19, or 23 can be used.

At step 2590, the processor combines the higher-resolution tile images into a full field-of view higher-resolution image. In some cases, combining tile images comprises an imaging-blending process such as, for example, alpha blending.

At optional step 2600, the image data of the recovered higher-resolution two-dimensional image of the sample area is displayed on a display (e.g., display 230). In one aspect, the method with tile imaging may further comprise a procedure that accounts for differences in incident angles between different tiles based on the distance between the tiles and each light element.

C. Refocusing and Auto-Focusing

Conventional high NA microscopes and other imaging devices typically have a limited depth of field. For example, the depth-of-field of a conventional microscope with a 20× objective lens with 0.4 NA is about 5 μm. With a conventional microscope, resolution degrades as the sample moves away from the in-focus plane due to its limited depth-of-field. To improve resolution using a conventional microscope, the operator typically moves the stage to mechanically bring the sample back into focus. In this regard, a precise mechanical stage is needed to bring a sample into the in-focus position with sub-micron accuracy.

In certain aspects, a Fourier ptychographic imaging system can refocus the sample without mechanically moving the sample. For example, the Fourier ptychographic imaging method may comprise steps that refocus an out-of-focus sample during the recovery process. With this refocusing procedure, the Fourier ptychographic imaging system can expand its depth-of focus beyond the physical limitations of its filtering optical element. In certain cases, a Fourier ptychographic imaging system may be able auto-focus the sample.

During operation of a Fourier ptychographic imaging system, the z-position of the sample plane may not be known a priori. In certain aspects, a Fourier ptychographic imaging method may include one or more auto-focusing steps that determines the z-position of the sample plane and uses this z-position to digitally refocus the sample. For example, the a Fourier ptychographic imaging method described with respect to FIG. 19 may further comprise a step during or before step 1520 that computes the z-position of the sample plane. The Fourier ptychographic imaging system may the perform autofocusing by using the processor to perform steps 1520 and 1540 in FIG. 19 using the computed z-position of the sample. To compute the z-position of the sample plane, the method may determine an auto-focusing index parameter. The auto-focusing index is defined by the following equation:

$$\text{Auto-focusing index: } 1/\Sigma abs(\sqrt{I_{lf}}-\sqrt{I_{lfm}}) \quad \text{(Eqn. 4)}$$

Where: $\sqrt{I_{lf}}$ is the amplitude image from the low-pass filtering, and $\sqrt{I_{lfm}}$ is the actual low-resolution measurement The summation in Eqn. 4 is for all oblique incidence angles. After the Fourier ptychographic imaging method computes the estimated z-position of the sample plane, the Fourier ptychographic imaging method can digitally refocus to the estimated z-position. In some cases, the higher-resolution image solution has been found to converge better when using an accurate z-position.

III. Embedded Pupil Function Recovery (EPRY)

A Fourier ptychographic imaging method can be described as a super-resolution technique that employs angularly varying illumination and a phase retrieval algorithm. In some cases, a Fourier ptychographic imaging system employing this method may surpass the diffraction limit of its objective lens. In certain examples described herein, a Fourier ptychographic imaging system may be in the form of a Fourier ptychographic microscope (FPM).

In certain low NA, large field-of-view (FOV) embodiments of the Fourier ptychographic imaging system described herein, the system comprises an optical element with a low NA. This low NA, large FOV system can employ a Fourier ptychographic imaging method that can scale up the space-bandwidth product (SBP) by more than an order of magnitude. An example of a description of SBP can be found in A. Lohmann, R. Dorsch, D. Mendlovic, Z. Zalevsky, and C. Ferreira, "Space-bandwidth product of optical signals and systems," J. Opt. Soc. Am. A13(3), 470-473 (1996), which is hereby incorporated by reference for this SBP description. In these low NA, large FOV embodiments, an aberration in the low NA objective lens or other system aberrations can become the limiting factor to further increasing SBP of the system.

In certain embodiments, the wavefront correction process described in Section II(A) can be implemented into the Fourier ptychographic imaging method to correct for a spatially varying aberration of the objective lens in the system. In one example discussed in reference to G. Zheng, R. Horstmeyer, & C. Yang, "Wide-field, high-resolution Fourier ptychographic microscopy," Nature Photonics, 7(9), 739-745 (2013), a Fourier ptychographic microscope that implements this wavefront correction process was able to produce a high-resolution (e.g., about 0.78 um, 0.5 NA), wide-FOV (e.g., about 120 mm$^2$) microscope with a final SBP of about 1 gigapixel microscope. This Fourier ptychographic microscope provides imaging capabilities that may be suited for many biomedical applications such as digital pathology, haematology and immunohistochemistry.

Typically, the wavefront correction process described in Section II(A) uses a single pre-characterized spatially varying aberration of the Fourier ptychographic imaging system in its process. In many cases, the spatially varying aberration of the Fourier ptychographic imaging system is measured in a calibration process and used as input into the Fourier ptychographic imaging method. Examples of calibration techniques that can be used to characterize spatially varying aberrations are described in G. Zheng, X. Ou, R. Horstmeyer, and C. Yang, "Characterization of spatially varying aberrations for wide field-of-view microscopy," Opt. Express 21(13), pp. 15131-15143 (2013), H. Nomura and T. Sato, "Techniques for measuring aberrations in lenses used in photolithography with printed patterns," Appl. Opt. 38(13), pp. 2800-2807 (1999), J. Wesner, J. Heil, and Th. Sure, "Reconstructing the pupil function of microscope objectives from the intensity PSF," in Current Developments in Lens Design and Optical Engineering III, R. E. Fischer, W. J. Smith, and R. B. Johnson, eds., Proc. SPIE 4767, pp. 32-43 (2002), all of which are hereby incorporated by reference for the description of calibration techniques for measuring spatially varying aberrations in lenses. These described calibration techniques are typically computationally onerous and sensitive to the movement of components in the system or other changes to the system. For example, any movement of the objective lens or a switch of the imaging camera (e.g., radiation detector) can change the spatially varying aberration and require re-characterization of the aberration.

Some conventional adaptive wavefront correction processes can make wavefront corrections adaptively with aberration measurements taken periodically over time. An example of an adaptive wavefront correction process is described in Z. Bian, S. Dong, and G. Zheng, "Adaptive system correction for robust Fourier ptychographic imaging," Opt. Express 21(26), 32400-32410 (2013). However, this example and other conventional adaptive wavefront correction processes typically involve a global optimization technique that is computationally expensive. The heavy computational burden of this process may limit the orders of aberrations that can be corrected within the time restrictions of the imaging process and/or of the computational resources.

In certain embodiments, a Fourier ptychographic imaging system may be configured to employ a Fourier ptychographic imaging method implementing an embedded pupil function recovery (EPRY) technique that does not require a priori knowledge of the aberration and does not use global optimization. Instead, the EPRY technique can be implemented into the Fourier ptychographic imaging method to recover both the Fourier spectrum of the sample and the pupil function of the Fourier ptychographic imaging system simultaneously from the captured sequence of intensity images. In these embodiments, an aberration-free, high-resolution image of the sample can be recovered and the aberration behavior of the Fourier ptychographic imaging system can be estimated from the recovered pupil function without the need of a calibration process to pre-characterize the spatially varying aberration. Moreover since this EPRY technique does not require optimization techniques or other computationally expensive process, a Fourier ptychographic imaging method that employs the EPRY technique is more computationally efficient than conventional adaptive wavefront correction. Furthermore, an imaging system that uses a Fourier ptychographic imaging method that employs the EPRY technique may be able to provide higher quality images than conventional adaptive wavefront correction systems since it can more efficiently (less time) process images based on greater numbers of low order aberrations.

The approach used by the Fourier ptychographic imaging method and conventional ptychography differ in many respects. In conventional ptychography, probe illumination is spatially panned across the sample while the far field diffraction patterns are imaged and recorded. In conventional ptychography, the phase retrieval methods rely on accurate characterization of the probe function. In conventional ptychography, the inaccuracies of the characterization may be based on the features of the aperture (or focusing optics) that generates the illuminating beam. In contrast, Fourier ptychographic imaging uses a different illumination approach to provide oblique plane wave illumination at different incidence angles, resulting in a sequence of shift version of the sample Fourier spectrum. In Fourier ptychographic imaging, the phase retrieval methods rely on accurate characterization of the pupil function of the optical system. In Fourier ptychographic imaging, the inaccuracies of the characterization may be based on the aberration of the imaging system.

Implementing the EPRY Technique into the Fourier Ptychographic Imaging Method

In certain embodiments, a Fourier ptychographic imaging system employs a Fourier ptychographic imaging method that implements the EPRY technique. The Fourier ptychographic imaging method generally comprises an acquisition process, an image reconstruction process, and an optional display process. The image acquisition process comprises illuminating the sample with oblique plane waves from N varying incidence angles ($\theta_{x_{i,j}}$, $\theta_{y_{i,j}}$) and capturing a sequence of M images. The acquisition process may be generally expressed as a complex multiplication $e(r)=s(r) \exp(iU_M \cdot r)$ where $s(r)$ is the exit light wave from a thin sample, which is illuminated by the oblique plane wave with a wavevector and where r=(x, y) is the coordinate in the spatial domain and u=($k_x$, $k_y$) is the coordinate in the spatial frequency domain (Fourier domain). The light wave that propagates to the radiation detector is the convolution of the exit wave and the spatially invariant point spread function p(r) of the Fourier ptychographic imaging system where the intensity is recorded, i.e. $I_{U_M} = |e(r) \hat{\times} p(r)|^2$. In the Fourier domain:

$$I_{I_M} = |F^{-1}\{F[e(r)]*F[p(r)]\}|^2 = |F^{-1}\{S(u-U_M)*P(u)\}|^2 \quad \text{(Eqn. 5)}$$

Where: S(u)=F{s(r)} is the Fourier spectrum of the sample, and

P(u)=F{p(r)} is the pupil function of the image system

In some cases, the image reconstruction process recovers S(u) and P(u) that satisfy Eqn. 5 for all M measured intensity images. In Section III, P(u) refers to the pupil function distribution, S(u) refers to the sample Fourier spectrum distribution (also referred to as $\tilde{I}_h$ in previous sections), s(r) refers to a sample spatial distribution, M refers to the number of captured images, B refers to the total number of outer loops executed, a refers to the inner loop index variable and b refers to the outer loop index variable.

In some Fourier ptychographic imaging methods described in previous sections (e.g., an example of the method described with respect to flowchart in FIG. 18), a pupil function is initially estimated from the pre-characterized aberration. If the estimated pupil estimation is precise, the iterative process determines an S(u) that satisfies Eqn. 5. Since the image reconstruction process in these iterations only renews the sample spectrum while keeping the pupil function unchanged, an imprecise estimated pupil function will result in a poor recovery. Inaccuracy in the estimated pupil function can be caused, for example, by limited orders of aberration considered in the pre-characterization calibration process or by mechanical or optical changes in the imaging system.

Figure 23:
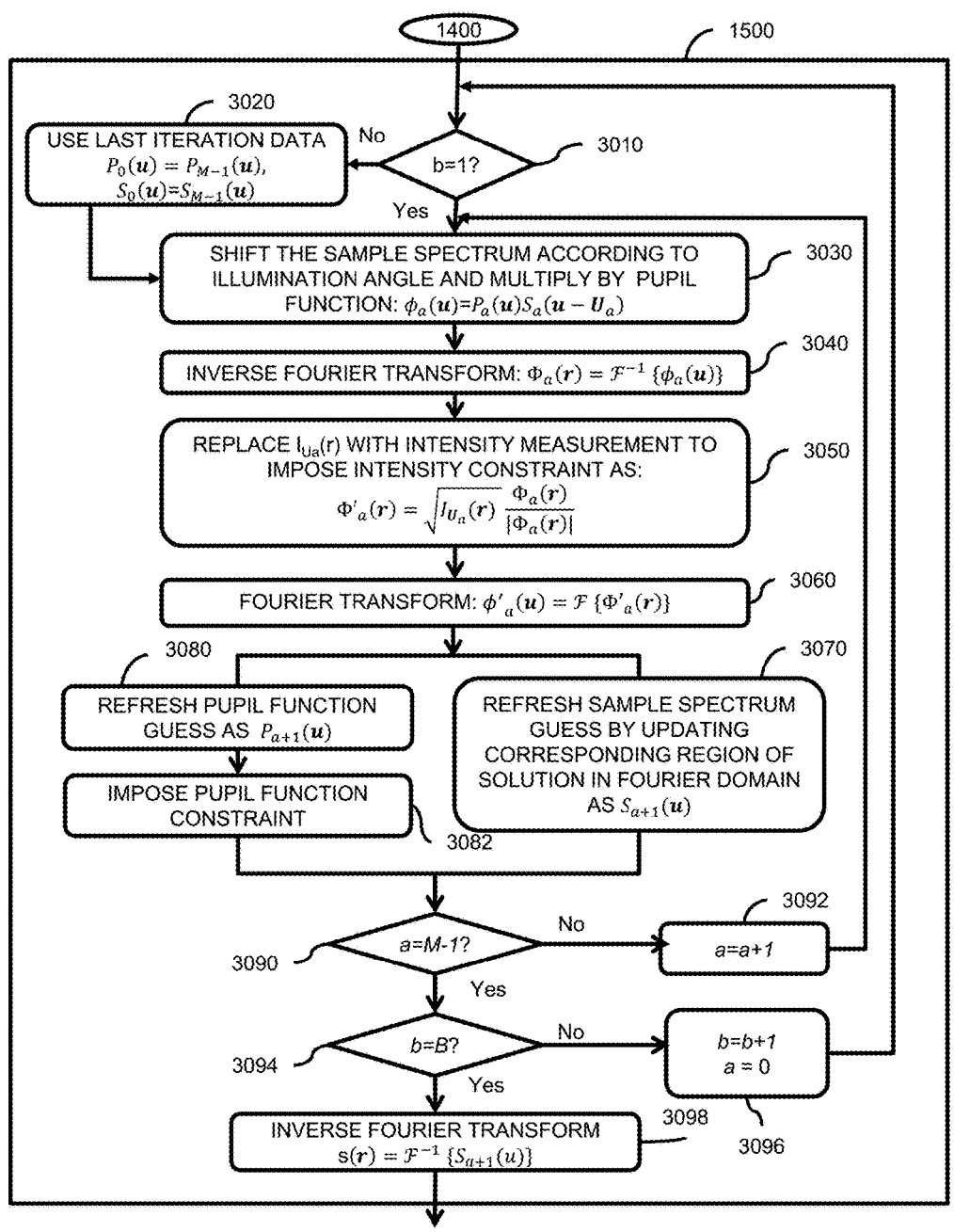
FIG. 23 is a flowchart depicting details of a Fourier ptychographic imaging method that implement an Embedded Pupil Function Recovery (EPRY) technique, according to an embodiment.

In embodiments of a Fourier ptychographic imaging system that employ a method that implements the EPRY technique, a pre-characterized aberration is not required. Instead, the EPRY technique can recover both the Fourier spectrum of the sample and the pupil function of the system simultaneously during its iterative process. The method is generally described with respect to the flowchart shown in FIG. 17. The details of the steps of the acquisition portion (steps 1100, 1200, and 1300) and the optional display portion (step 1600) are similar to those described with respect to the flowchart shown in FIG. 17. The image acquisition process comprises illuminating the sample with oblique plane waves from N varying incidence angles ($\theta x_{i,j}$, $\theta y_{i,j}$) and capturing a sequence of M images. Details of steps 1400 and 1500 of the reconstruction process are described in detail with respect to the flowchart shown in FIG. 23. FIG. 23 is a flowchart depicting details of the steps 1400 and 1500 that implement the EPRY technique into the Fourier ptychographic imaging method, according to an embodiment.

At step 1400, the sample spectrum and pupil function are initialized as $S_0(u)$ and $P_0(u)$ respectively. In addition, the outer loop index variable, b, is set to 1 (first iteration) and the inner loop index variable, a, is set to 0. Outer loop index variable, b is the index incrementing the reconstruction process iterations and inner loop index variable, a, is the index incrementing the incidence angle. In the cycles of the inner loop, M captured images are addressed in the sequence: $I_{U_a}(r)$, a=0 to M−1, where M is the number of captured images, and each is considered in turn, with both the pupil function and sample spectrum updated at each loop.

In one embodiment, the initial sample spectrum $S_0(u)$ may be determined by first initialized a sample image in the spatial domain, and then applying a Fourier transform to obtain an initialized sample spectrum in the Fourier domain. In some cases, the initial guess may be determined as a random complex matrix (for both intensity and phase). In other cases, the initial guess may be determined as an interpolation of the low-resolution intensity measurement with a random phase. An example of an initial guess for $S_0(u)$ may be interpolated from one of the captured intensity images. Another example of an initial guess is a constant value. The Fourier transform of the initial guess can be a broad spectrum in the Fourier domain.

In some embodiments, the initial pupil function guess $P_0(u)$ may be a circular shaped low-pass filter, with all ones inside the pass band, zeros out of the pass band and uniform zero phase. In one example, the radius of the pass band is NA×2π/λ, where NA is the numerical aperture of the filtering optical element (e.g., objective lens) and λ is the illumination wavelength. An example of an initial pupil function guess would be based on assuming the system is aberration free, phase=0.

At step 3010, it is determined whether b=1 i.e. it is the first iteration of the outer loop. If it is determined that it is not the first iteration, then the initial pupil function and the sample spectrum in the Fourier domain are set to the data determined in the last cycle of the inner loop: $S_0(u)=S_{M-1}(u)$ and $P_0(u)=P_{M-1}(u)$ at step 3020. If it is determined that it is the first iteration, then the method proceeds to step 3030.

In the $a^{th}$ cycle of the inner loop, with the knowledge of the reconstructed $S_a(u)$ and $P_a(u)$ from the previous cycle of the inner loop, the exit wave at the pupil plane while the sample is illuminated by a wavevector $U_n$ can be simulated using: $\phi_a(u)=P_a(u)S_a(u-U_n)$ with the $S_a(u)$ and $P_a(u)$ from the previous cycle. At step 3030, the processor shifts the sample spectrum according to the illumination angle and multiplies by the pupil function according to: $\phi_a(u)=P_a(u)S_a(u-U_n)$. The pupil function comprises both an amplitude and a phase factor. The phase factor of the pupil function is generally associated with defocus or other aberration associated with the optical system. The amplitude of the pupil function is usually associated with the objective lens aperture shape of the optical system. By multiplying the sample spectrum by the pupil function in the Fourier domain, the processor both filters the higher-resolution solution by multiplying by the modulus (computed amplitude component) of the pupil function and also multiplies by the phase factor of the pupil function. Multiplying the sample spectrum by the modulus filters the higher-resolution image in the Fourier domain for a particular plane wave incidence angle ($\theta_x^a$, $\theta_y^a$) with a wave vector $U_a=(k_x, k_y)$. An image captured with illumination $U_a$ based on the $a^{th}$ illumination incidence angle is referred to in this section as $I_{U_a}(r)$. By multiplying the sample spectrum by the modulus, the processor filters a region from the sample spectrum S(u) in the Fourier domain. In cases with a filtering optical element in the form of an objective lens, this region takes the form of a circular pupil aperture with a radius of NA*$k_0$, where $k_0$ equals 2π/λ (the wave number in vacuum), given by the coherent transfer function of an objective lens. The center of the circular region in Fourier space corresponds to the associated illuminating incidence angle of this $a^{th}$ cycle of the inner loop. For an oblique plane wave incidence with a wave vector $U_a=(k_x, k_y)$, the region is centered about a position ($k_x, k_y$) in the Fourier domain.

At step 3040, the processor takes the inverse Fourier transform as follows: $\phi_a(r)=F^{-1}\{\phi_a(u)\}$. At step 3050, the processor imposes an intensity constraint. In this step 3050, the modulus (computed amplitude component) of the simulated region in Fourier space is replaced with the low resolution intensity measurement $I_{U_a}(r)$ captured by the radiation detector associated with an illumination wavevector $U_a$. The computed amplitude component is replaced by the square-root of the real intensity measurement $I_{U_a}(r)$ according to:

$$\phi'_a(r) = \sqrt{I_{U_a}(r)} \frac{\phi_a(r)}{|\phi_a(r)|}.$$

This forms an updated lower resolution image.

At step 3060, a Fourier transform is applied to the updated lower resolution image. In this step, an updated exit wave is calculated via a Fourier transform according to: $\phi'_a(u) = F\{\Phi'_a(r)\}$.

At step 3070, the processor refreshes the Fourier spectrum guess of the higher resolution solution by updating the exit wave data and replacing data in a corresponding region of the Fourier domain as the updated exit wave data associated with incidence wave vector $U_n=(k_x, k_y)$. The processor updates the exit wave data using a sample spectrum update function. An example of a sample spectrum update function is given by:

$$S_{a+1}(u) = S_a(u) + \alpha \frac{P_a^*(u+U_a)}{|P_a(u+U_a)|_{max}^2}[\phi'_a(u+U_a) - \phi_a(u+U_a)] \quad (\text{Eqn. 6})$$

By using such a spectrum update function, the updated value of the sample spectrum may be extracted from the difference of the two exit waves by dividing out the current pupil function. By multiplying with the conjugates using Eqn.6 and Eqn. 7, the sample spectrum can be separated from the pupil function so that the sample spectrum can be refreshed separately from the pupil function. In some cases, a correction is added to the sample spectrum guess with weight proportional to the intensity of the current pupil function estimate. The constant a adjusts the step size of the update. In one example, $\alpha=1$. During the cycles of the inner loop, the data is updated as overlapping regions in the Fourier domain.

Concurrently with step 3070, at step 3080 the processor refreshes the guess of the pupil function in the Fourier domain as: $P_{a+1}(u)$. An example of a pupil update function that can be used here is given by:

$$P_{a+1}(u) = SP_a(u) + \beta \frac{S_a^*(u+U_a)}{|S_a(u+U_a)|_{max}^2}[\phi'_a(u) - \phi_a(u)] \quad (\text{Eqn. 7})$$

The constant β adjusts the step size of the pupil function update and β=1 is used in this paper. Using this pupil update function, the correction of the pupil function is extracted from the difference of the two exit waves by dividing out the current sample spectrum estimate, and added to the current pupil function guess with weight proportional to the intensity of the current sample spectrum estimate. By multiplying by the conjugate using Eqn. 7, the pupil function can be separated from the sample spectrum and refreshed separately.

At step 3082, the processor imposes a pupil function constraint on the updated pupil function. Imposing the pupil function constraint may suppress noise. In the example of a microscope system, a physical circular aperture stop may be set to define the NA, thus the area in the pupil function that corresponds to the stop should always be zero. The non-zero points in the updated pupil function in the region corresponding to the stop are caused by the noise in image acquisition, and are set to zero to eliminate the noise.

The inner loop of the method continues to cycle until all M captured images in the sequence $I_{U_a}(r)$ are used to update the pupil and sample spectra, at which point an iteration of the outer loop is complete. The cycles run from a=0 to M−1. At step 3090, the processor determines whether a=M−1. If the processor determines that a does not equal M−1, then not all the M captured images have been used. In this case, the loop index a will be incremented at step 3092, and the method will return to step 3030 based on the next captured image associated with another incidence angle.

If the processor determines that a does equal M−1, the method continues to step 3094. If the processor determines that a does not equal M−1, the method continues to step 3092. At step 3092, the outer loop index is incremented a=a+1 to the next incidence angle. The method will then return to start a new cycle at step 3030.

At step 3094, the processor determines whether b=B. If the processor determines that b does not equal B, the loop index b will be incremented at step 3096 to b=b+1 and the loop index a will be reset to 0. The method will then return to start a new iteration at step 3010.

If the processor determines that b does equal B, then the iterations stop and the method continues to step 3098. At step 3098, the inverse Fourier transformed back to the spatial domain to generate a high resolution, modulus and phase distribution of the sample. A high resolution image of the sample can be generated from this data. The method then returns to optional step 1600 in FIG. 17 to send data to display a high resolution modulus and phase image of the image on a display (e.g., display 230 in FIG. 1).

Figure 24:
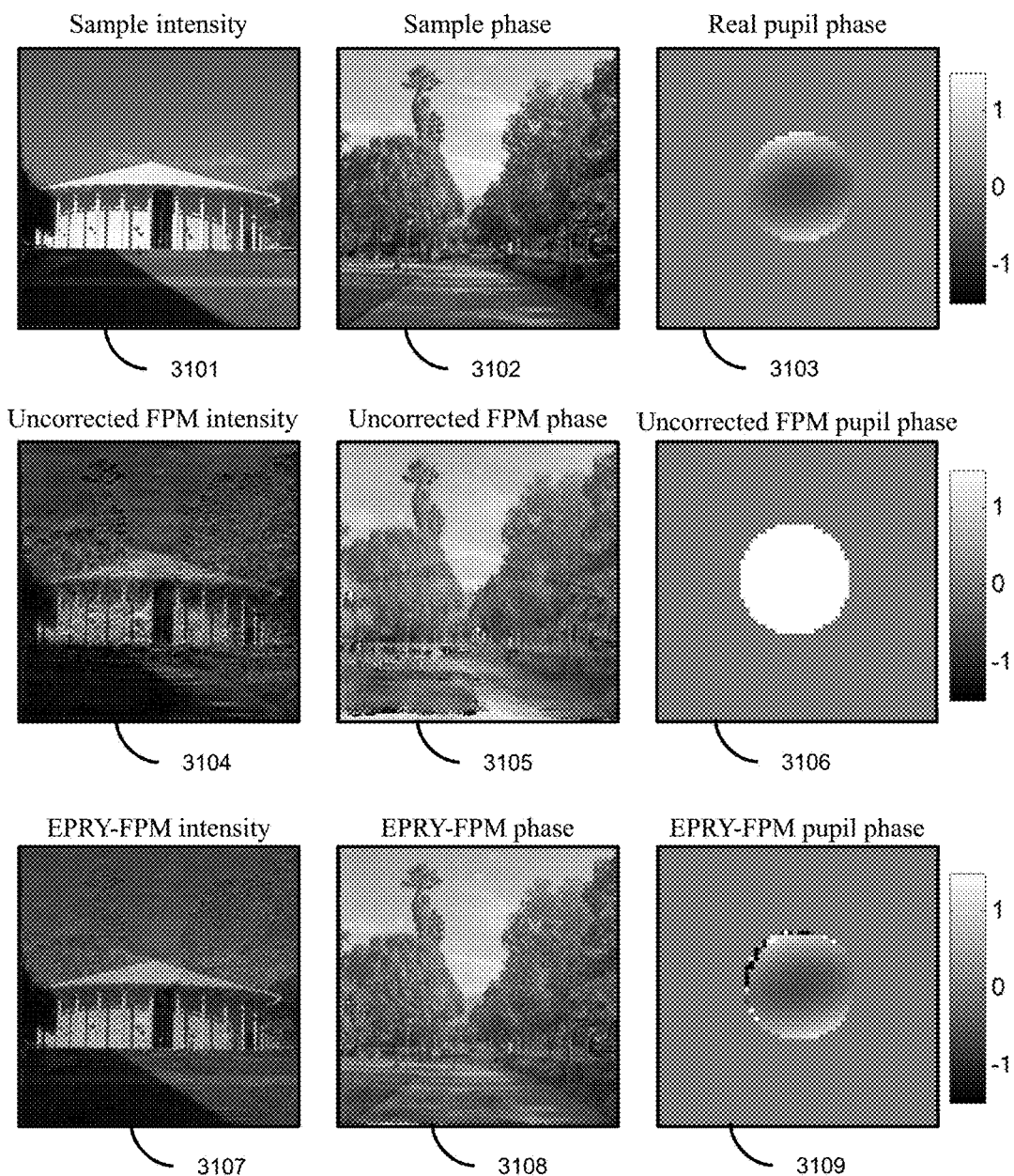
FIG. 24 illustrates nine images resulting recovered from a Fourier ptychographic imaging method using aberration correction with and without the EPRY technique, according to embodiments.

Fourier Ptychographic Imaging Method Implementing EPRY Technique Compared to Fourier Ptychographic Imaging Method Without Aberration Correction FIG. 24 illustrates nine images, the first row of images, 3101, 3102, and 3103, corresponds to datasets used as the modulus and phase of the sample and pupil function phase for simulation, the second row of images, 3104, 3105, and 3106, corresponds image data resulting from B iterations of a Fourier ptychographic imaging method that does not use aberration correction, and the third row of images, 3107, 3108, and 3109, corresponds to image data resulting from B iterations of a Fourier ptychographic imaging method that implements the EPRY technique, according to embodiments. The first column corresponds to intensity, the second column corresponds to phase, and the third column corresponds to the pupil function phase. The first two images of the first row, 3101 and 3102, are the ground truth sample modulus (intensity) and phase. The third image of the first row, 3103, is the pupil function phase. The simulated dataset is based on a simulated microscope system having an NA=0.08 with a wavefront aberration, resulting in a circularly shaped pupil function with a radius of 13 pixels and a pupil function phase as shown in a3. Each of the images 3101 and 3102 contains 512*512 pixels with pixel size 0.2 um.

The same initial guess of the pupil phase is used in both the Fourier ptychographic imaging method with and without implementing the EPRY technique. The pupil function has a circular shape with a low pass filter size which is the same size as the phase circle. In these runs, 225 images are measured with different plane wave illuminations with overlap in Fourier domain of about 70%. In both runs, the initial guess of the pupil function is set as a circular shape low-pass filter radius of 13 pixels with zero phase, as shown in 3106 of FIG. 24, and the first image in the sequence is up-sampled and Fourier transformed to serve as the initial guess of sample spectrum. Both methods were run for 100 iterations and the results are shown in 3104 and 3105 and 3107, 3108, and 3109 in FIG. 24.

The image reconstruction from the method without aberration correction results in the image data in 3104 and 3105. The results of image reconstruction from the method with the EPRY technique are in 3107, 3108, and 3109. In this example, the results with EPRY provide improved quality results, which is because the aberated wavefront of the pupil function repeatedly influenced the low and high frequency components of the sample spectrum. In addition, there may be a significant degree of crosstalk between the modulus and phase images resulting from the lack of knowledge about the pupil function phase distribution. In contrast, the method implementing the EPRY technique separates the pupil function from the sample spectrum, resulting in an improved quality image and an accurate measurement of the real pupil function phase. Because the illuminations do not cover the entire Fourier spectrum of the sample, there exists a small amount of crosstalk in the modulus and phase image, and also, resulting in several phase-wrapped pixels in the reconstructed pupil function.

One advantage of implementing the EPRY technique may be improved convergence and consequently fewer iterations and computational resources required. Convergence may be a measure of the normalized mean square error metrics in each iteration given by:

$$E^2(m) = \frac{\sum_u |S(u) + \alpha S_b(u)|^2}{\sum_u |S(u)|^2} \qquad \text{(Eqn. 8)}$$

$$\text{Where parameter } \alpha = \frac{\sum_u S(u) S_b^*}{\sum_u |S_a(u)|^2}$$

Figure 25:
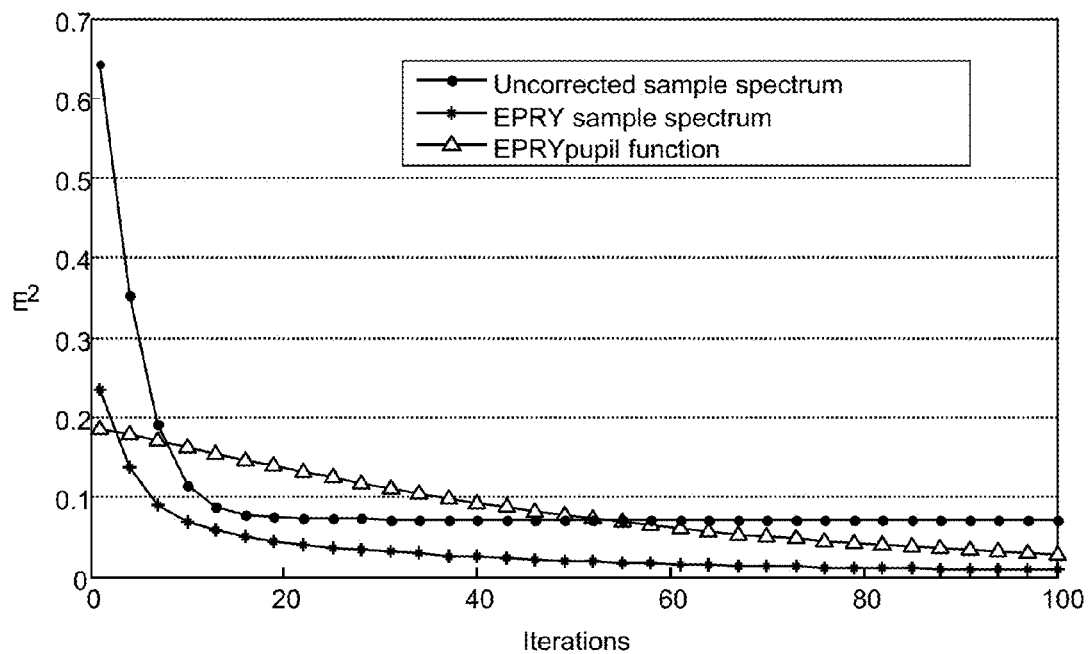
FIG. 25 is a plot of mean square error $E^2$ (b) vs. iterations to convergence for runs of a Fourier ptychographic imaging method with and without the EPRY technique, according to embodiments.

Here, S(u) refers to the actual sample spectrum distribution and $S_b(u)$ refers to the reconstructed sample distribution after b iterations. FIG. 25 is a plot of mean square error $E^2(b)$ vs. iterations to convergence for runs of a Fourier ptychographic imaging method that implements the EPRY technique and one that does not implement the EPRY technique, according to embodiments. In these runs, the $E^2(b)$ is calcuated over the center 128×128 pixel area. For the reconstructed sample spectrum, the method implementing EPRY technique has a significantly faster convergence rate compared to the method that does not use EPRY. The method that does not implement the EPRY technique results in an error of less than 0.01. The method that does not implement the EPRY technique, which does not iteratively correct the pupil function, and the error in the sample spectrum does not decrease below 0.08 after 20 iterations, which is the limit imposed by the uncorrected pupil function. As we can see in the plot, the convergence of the reconstructed pupil function using the EPRY technique converges slower than the sample spectrum at the first few iterations, then the final result has an error of about 0.05.

Comparison of Method With EPRY Technique to a Method Without Aberration Correction on Experimental Data In some cases, implementing the EPRY technique may not only improve image quality output from the Fourier ptychographic imaging system and make its method more computationally efficient, but also the pupil function can be recovered and used to characterize the spatially varying aberration in the system. Section V describes an example of a Fourier ptychographic imaging system implementing the EPRY technique and configured to characterize the spatially varying aberration of its optical system. In one case, such a system can then be configured to adaptively correct for the spatially varying aberration determined at each iteration.

In one example, Fourier ptychographic imaging system may comprise an objective lens (2×, NA=0.08 objective) and specimen receptacle of a conventional microscope, a variable illuminator such as a programmable color LED matrix, a radiation detector, and a computing device in communication with the radiation detector and/or LED matrix. The radiation detector may be, for example, a CCD camera as a radiation detector mounted on top of the objective lens. The setup may be similar to the one shown in FIGS. 4 and 5.

Figure 26:
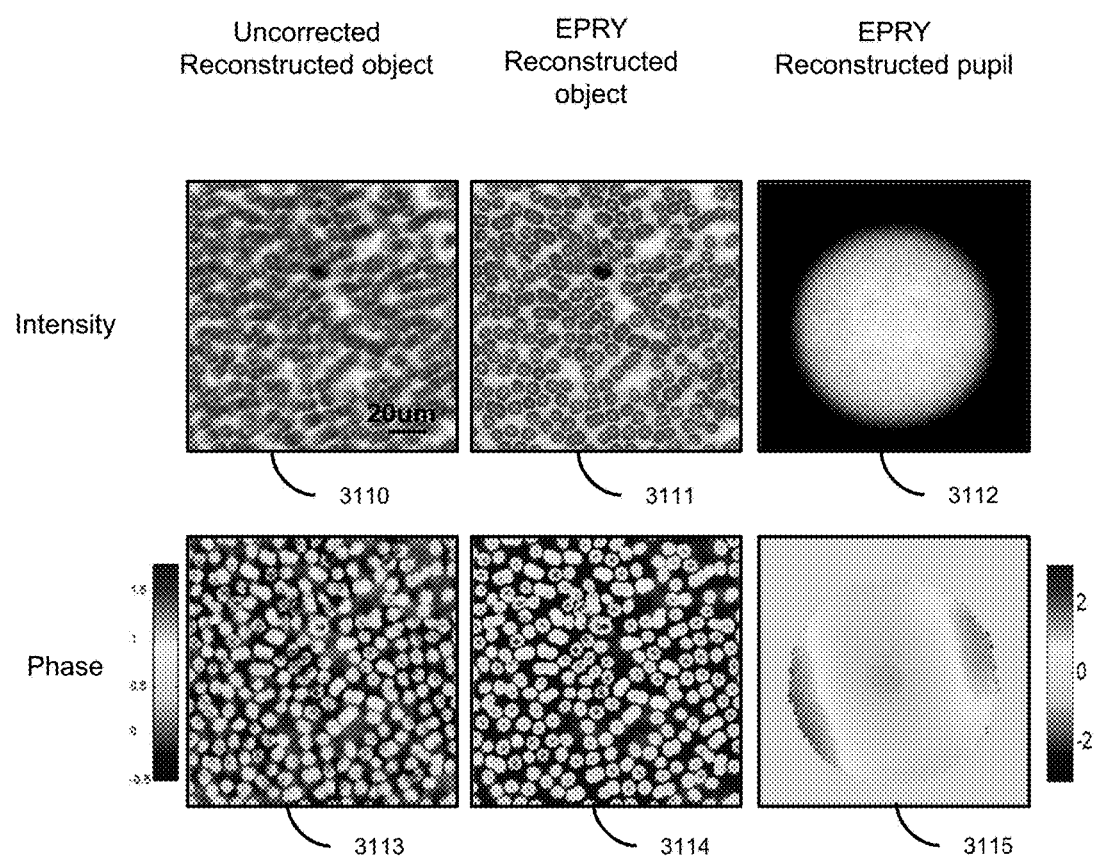
FIG. 26 depicts six (6) images of reconstructed image data recovered from a Fourier ptychographic imaging method without aberration correction and a Fourier ptychographic imaging method implementing the EPRY technique, according to embodiments.
Figure 27:
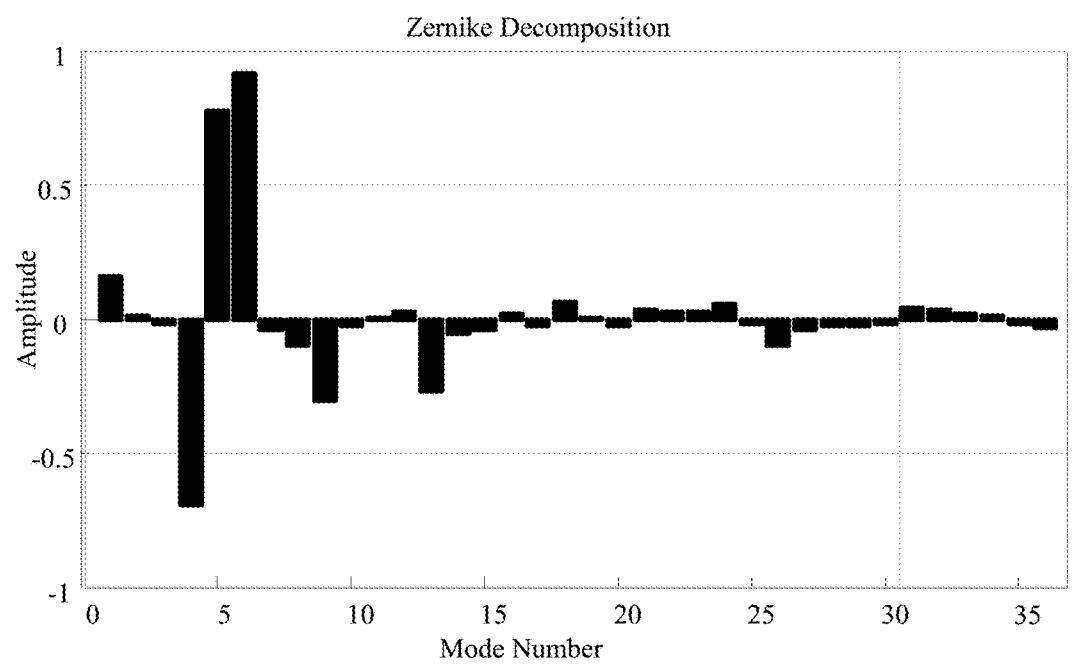
FIG. 27 is a plot of an example of a decomposition of different types of aberration from low order to high order according to the mode number, according to an embodiment.

FIG. 26 are six (6) images of reconstructed image data generated by such a Fourier ptychographic imaging system that employs a Fourier ptychographic imaging method without aberration correction and a Fourier ptychographic imaging method implementing the EPRY technique, according to embodiments. Each of the methods used a blood smear dataset. In both cases, the initial guess of the pupil function was a circular shape low pass filter, whose radius was determined by the NA, with no phase, and the reconstructed region is located 35% from the center of the field of view, and the first image was up-sampled and Fourier transformed to serve as the initial guess of sample spectrum. In both cases, 225 intensity images were captured using 15 by 15 red LEDs. In both cases, an area of 150 um×150 um of the sample was analyzed from the sample, located at 35% to the edge from the center of the FOV of the imaging system, where the aberration is non-negligible.

The first column images, 3110 and 3113, are the reconstructed sample intensity and phase using the Fourier ptychographic imaging method without aberration correction. The second column images, 3111 and 3114, are the reconstructed sample intensity and phase using the Fourier ptychographic imaging method implementing the EPRY technique. The third column images, 3112 and 3115, are reconstructed pupil function modulus an phase using the Fourier ptychographic imaging method implementing the EPRY technique.

Images 3110 and 3113 show the intensity and phase distribution of the blood smear using the Fourier ptychographic imaging method without aberration correction. In this example, the image is relatively blurry due to objective aberration at that location in the field of view. As shown, the contour of the blood cells is not clearly recognizable which makes it difficult to distinguish white blood cells from red blood cells.

In comparison, images 3111 and 3114 based on a method implementing the EPRY technique show a relatively higher quality image. In this example, the morphology of blood cells is clear, the zone of central pallor for the red blood cells is obvious, and the shape of the nucleus of the white blood cell is recognizable. From the phase image 3114, we can also see the donut shape of the red blood cell. The pupil function for this field of view is also recovered by implementing the EPRY technique and the recovered pupil function data is illustrated in images 3112 and 3115.

The recovered pupil function can be used to determine the properties of the optical system. For one example, the size and shape of the modulus of the pupil function reflects the shape and position of the physical aperture stop. In this case, the modulus part of the pupil function approximately remains the same as the initial guess, meaning that the numerical aperture is well defined by a circular shape aperture. Also, since the pupil function should be centered, but is showing a slight shift of the pupil function to the bottom right, which indicates an imprecise estimation of the wavevector $U_n$ that is caused by the shift of the LED matrix from the originally aligned position. In this case, the system implementing the EPRY technique can be further configured to correct for this aberration.

As another example, the phase of the pupil function represents the wavefront aberration. A decomposition of the pupil function phase component in Zernike polynomials shows that the coefficient of each Zernike polynomial represents the extent of aberration corresponding to this Zernike polynomial. In the example system described above, the decomposition is executed and the coefficients of the first 30 Zernike polynomials are shown in FIG. 18. Different Zernike polynomials represent different types of aberration, from low order to high order according to the mode number. Mode number 1 represents the piston term, which will cause a constant phase shift to the entire aperture and is not considered as an aberration. The three dominant modes for the wavefront aberration are mode number 4, 5 and 6, which represent defocus aberration, astigmatism in the x direction and astigmatism in the y direction respectively. Coma aberration (mode 7 and 8) is not severe for this FOV but there are some higher order aberrations that are non-negligible for this position, such as mode 9 (trefoil) and mode 13.

Variations of Recovered Pupil Function Across Field of View and Spectrally

In imaging systems with large field of view, aberration and, by extension, pupil function typically exhibit spatial variations across the field of view and also vary spectrally.

In certain embodiments, a Fourier ptychographic imaging method implementing an EPRY technique can use steps similar to those described in the flowchart shown in FIG. 22 except that steps 1400 and 1500 described with reference to FIG. 23 replace steps 2400 and 2500. By using this tile approach, the entire field of view can be segmented into smaller tiles. In one example, the Fourier ptychographic imaging system has a 6 mm radius field of view and the entire area is segmented into tiles sized 350 um×350 um. To ensure the effectiveness of the EPRY-FPM algorithm, the entire field of view was segmented into small tiles where in each tile the aberration was considered as constant. A Fourier ptychographic imaging method implementing an EPRY technique as described in FIG. 23 is used to reconstruct an image for each tile independently. The reconstructed high resolution, aberration eliminated images for the tiles are combined together to form a full FOV high resolution image.

In certain aspects, the method may assume that the pupil function varies continuously. In these cases, the reconstructed pupil function from the adjacent tile is used as the initial pupil function guess (instead of a flat phase initial guess) for the current tile to increase the convergence rate of the iterations in the Fourier ptychographic imaging method.

Figure 28:
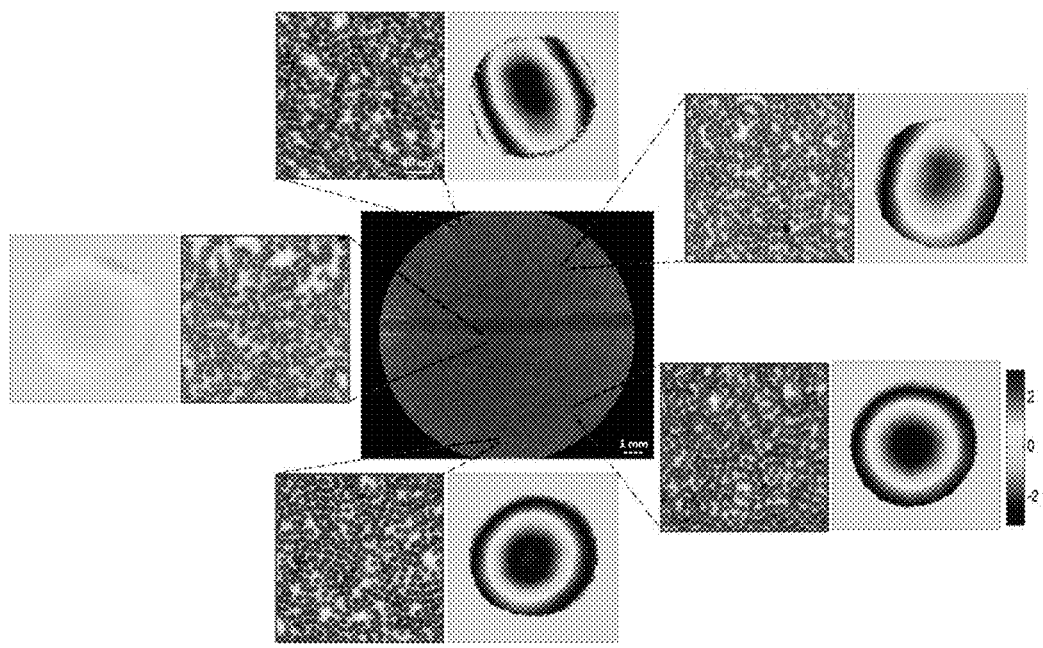
FIG. 28 depicts reconstructed sample image and wavefront aberration images at different regions over the field of view (FOV) from a run of a Fourier ptychographic imaging method implementing the EPRY technique, according to the embodiments.

In one embodiment, a Fourier ptychographic imaging system employing a method implementing the EPRY technique with the tile approach and using the reconstructed pupil function from the adjacent tile is used as the initial pupil function guess for the current tile is used. FIG. 28 includes the reconstructed sample image and wavefront aberration of five regions over the field of view resulting from a run of this system, according to the embodiments. FIG. 28 includes a full high resolution monochrome image reconstruction of blood smear as a center image. The entire field of view is segmented into smaller tiles, and the aberration is treated as constant for each tile. A method implementing the EPRY technique is run on each time and the reconstructed high resolution images are mosaicked together. FIG. 28 also includes five insets showing the detail of a reconstructed image (left side) and also the wavefront aberration (right side) at five tile locations across the field of view. As shown, the aberration at the edge is more severe as compared to the center. The reconstructed images show a stable image quality from center to edge resulting from the run of the method implementing the EPRY technique.

Figure 29:
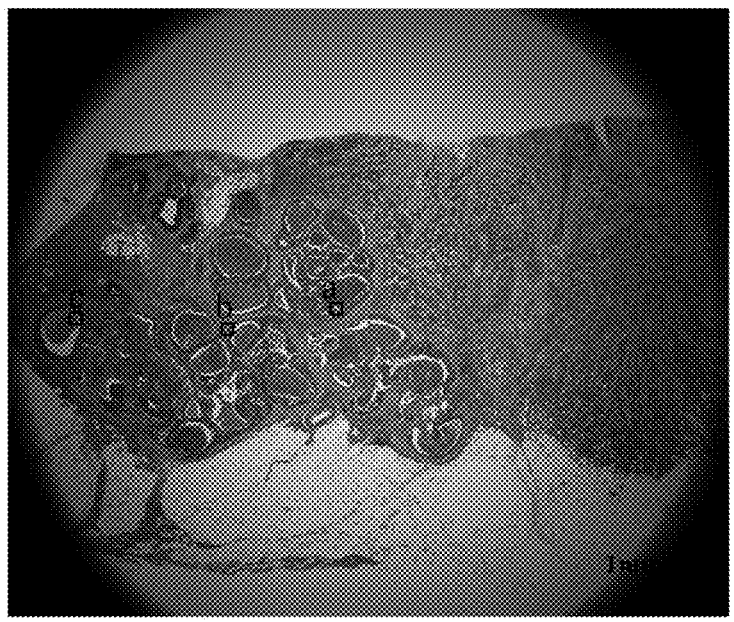
FIG. 29 is a wide FOV color image of a pathology slide, according to an embodiment.
Figure 30:
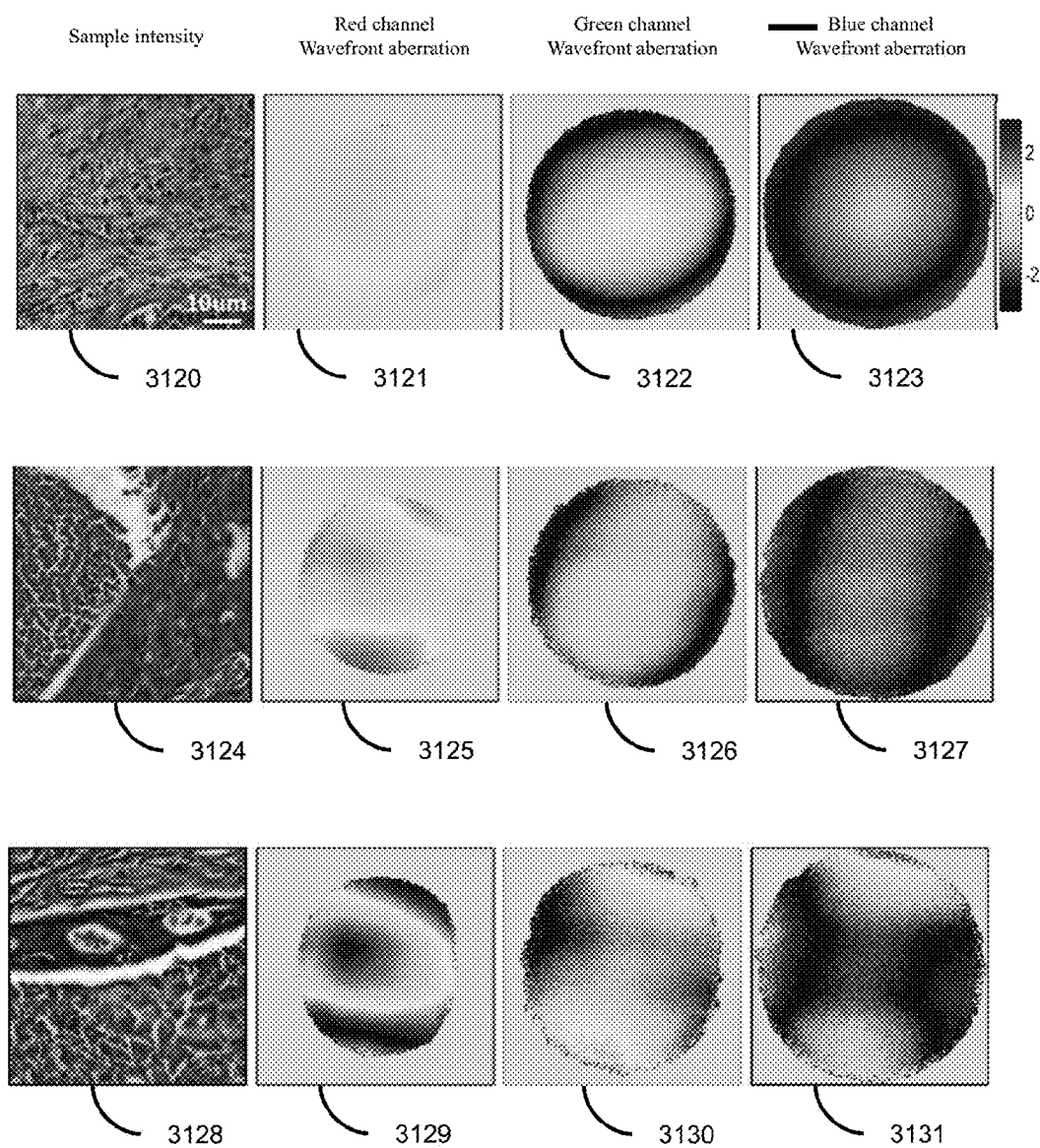
FIG. 30 depicts the reconstructed sample image and wavefront aberration images from three different regions of the FOV color image of FIG. 29 over the field of view from a run of a Fourier ptychographic imaging method implementing the EPRY technique, according to an embodiment.

In a similar embodiment, a Fourier ptychographic imaging system employing a method implementing the EPRY technique with the approach was used to render a high resolution, large FOV color image of a pathology slide shown in FIG. 29. In this example, the variable illuminator comprises a LED matrix where the center 15×15 red, green and blue LEDs on the LED matrix are lit up individually and 3 intensity distribution datasets are captured by a CCD camera for each of the red, green, and blue illuminations. For each color channel, the same segmentation and reconstruction processes are executed as described with respect to the example above. For each tile, because the pupil function which contains the defocus aberration is separated from the sample spectrum in the EPRY reconstruction process, each color channel is focused at its focal plane. In other words, the axial chromatic aberration, which is caused by different wavelengths focused at different planes, is correctable by the EPRY technique. Before combining red, green and blue channel images in the same tile together, green and blue images are slightly shifted spatially relative to the red channel to correct for lateral chromatic aberration. The processor can run instructions to determine the correct amount of shift that maximizes the correlation of the red-green image pair and red-blue image pair respectively. Finally, all the color tiles are mosaicked together for form the full FOV high resolution color image reconstruction of pathology slide shown in FIG. 29. FIG. 30 includes the reconstructed sample intensity and wavefront aberration of the three regions. The three channels are combined to generate RGB image. The images 3120, 3124, and 3128 are the reconstructed and zoomed in sample intensity images of three regions in the field of view. The images 3121, 3125, and 3129 are the red channel wavefront aberration of the three regions. The images 3122, 3126, and 3130 are the green channel wavefront aberration of the three regions. The images 3123, 3127, and 3131 are the blue channel wavefront aberration of the three regions. The different sizes of circles between the different color channels are caused by the different wavelengths. The shape of the pupil function changed from a circle to an ellipse significantly as moving towards the edge of the image because the 2× objective being used is not strictly a telecentric lens and, as such, the aperture shape can be expected to change asymmetrically.

Figure 31:
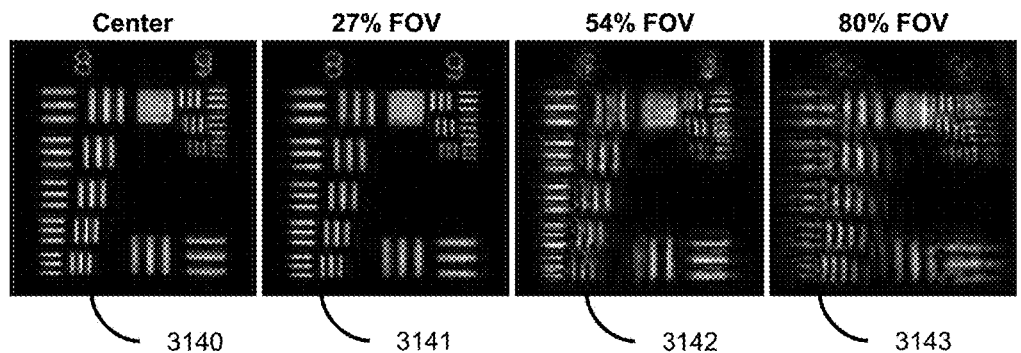
FIG. 31 depicts reconstructed images of a USAF target at different fields of view recovered from a Fourier ptychographic imaging method without aberration correction, from a Fourier ptychographic imaging method with a pre-characterized aberration correction, and from a Fourier ptychographic imaging method implementing EPRY technique without a pre-characterized aberration, according to embodiments.
Figure 31:
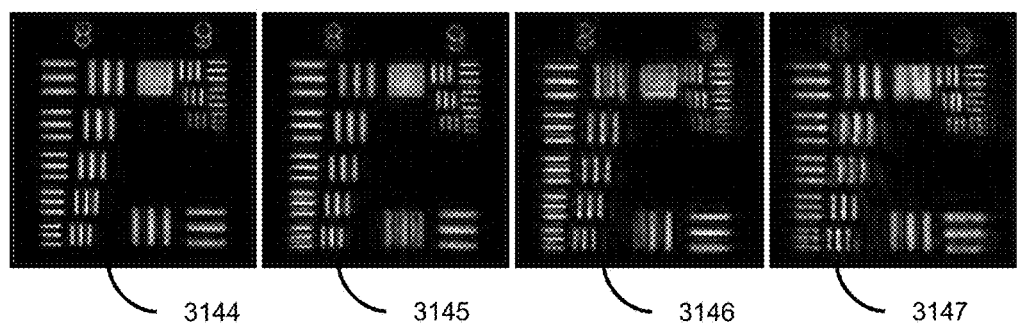
Figure 31:
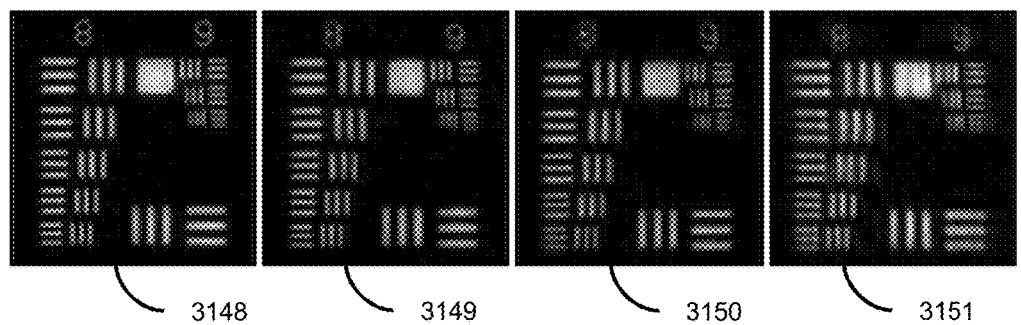

Image Quality Improvement With Fourier Ptychographic Imaging Method Implementing EPRY Technique FIG. 31 includes reconstructed images of a USAF target at different fields of view. The images were reconstructed from three configurations of the Fourier ptychographic imaging method: 1) a Fourier ptychographic imaging method without aberration correction, 2) a Fourier ptychographic imaging method with a pre-characterized aberration correction, and 3) a Fourier ptychographic imaging method implementing EPRY technique without a pre-characterized aberration, according to embodiments. The USAF target is placed at 0%, 27%, 54% and 80% of the entire FOV from the center, and four sets of images are captured respectively using the red LED. Images 3140, 3141, 3142, and 3143 are reconstructed by using the Fourier ptychographic imaging method without aberration correction. Images 3144, 3145, 3146, and 3147 are reconstructed by using the Fourier ptychographic imaging method with a pre-characterized aberration correction. Images 3148, 3149, 3150, and 3151 are reconstructed by using the Fourier ptychographic imaging method implementing EPRY technique aberration without pre-characterized aberration.

By comparing the images, image quality is shown to degrade due to the aberration in 3142 and 3143 at the 54% and 80% FOV locations. In images 3146 and 3147, it is shown that after aberration correction of defocus and astigmatism, the line on Group 9 (line width<1 μm) can be vaguely resolved at 3146 and 3147. The method using aberration correction with a pre-characterized aberration correction typically does not correct for higher orders of wavefront aberration and only accounts for lower orders. The reason that higher order aberration were not included is this method is that the higher order aberration information may be overwhelmed by the noise of the imaging system using this method of measurement, resulting in imprecise measurement of the higher order aberration. In addition, these aberrations are highly sensitive to mechanical or optical system drifts.

In contrast, a Fourier ptychographic imaging method implementing the EPRY technique can characterize the entire or nearly entire pupil function including the higher orders of wavefront aberration. In these embodiments, the method can improve image quality since it accounts for higher orders of wavefront aberration. In these cases, the method may be more computationally efficient than conventional methods and have a more robust aberration characterization of the involved lens system.

A Fourier ptychographic imaging system employing a Fourier ptychographic imaging method implementing an EPRY technique can recover both the expanded sample spectrum and the pupil function of the imaging system using the intensity images captured by the radiation detector. The implementation of EPRY technique may improve image quality due to the fact that the entangled sample spectrum and pupil function are isolated from the captured images during the recovery process. Moreover, the recovered pupil function which contains wavefront aberration information of the system can be used to characterize the behavior of the lenses of the system. In some cases, the Fourier ptychographic imaging method with the EPRY technique can be employed to characterize optical system aberrations. For example, it can be used to benchmark the quality of imaging systems for comparison purposes. Alternately, the recovered system aberration data can be used to design appropriate correction optics as discussed in Section V. Examples of some details of Fourier ptychographic imaging are described in Ou, Xiaoze, Guoan Zheng, and Changhuei Yang, "Embedded pupil function recovery for Fourier ptychographic microscopy" Optics Express 22, no. 5 (2014): 4960-4972 and G. Zheng, R. Horstmeyer and C. Yang, "Wide-field, high-resolution Fourier ptychographic microscopy," Nature Photonics, 2013, which are hereby incorporated by reference in their entirety.

V. Sharp Focus Generation Via EPRY and Adaptive Optics

Some conventional microscope systems include a highly focused beam such as, for example, a confocal microscope, a second-harmonic imaging microscope, optical tweezers, etc. A high numerical aperture objective is typically used to generate the finely focused light spot in these systems. Due to the aberration caused by technological limitations on material and lens design, the focused light spot size in these systems cannot reach the diffraction limit.

In some embodiments, a Fourier ptychographic imaging system employing a method that implements the EPRY technique can be used to simultaneously recover the extended complex Fourier spectrum of the sample and the pupil function of the system. This system can use the recovered pupil function can be used to characterize the wavefront aberration of the optical system including, for example, an objective lens. In some cases, the Fourier ptychographic imaging system comprises adaptive optics configured to modulate the incident wavefront and correct for the spatially varying aberration in the optical system to generate an aberration free, diffraction-limited focused light spot.

Figure 32:
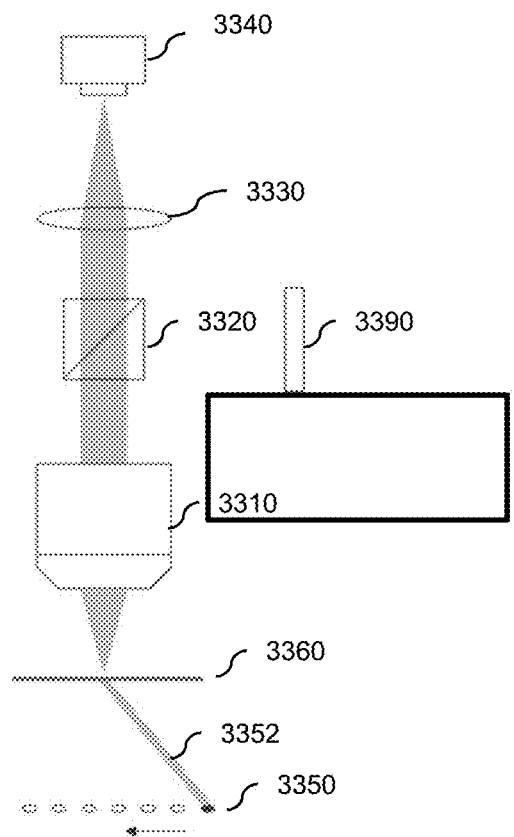
FIG. 32 is a side view of a Fourier ptychographic imaging system that uses adaptive optics to correct for an aberration determined from a pupil function recovered by the EPRY technique, according to an embodiment.
Figure 33:
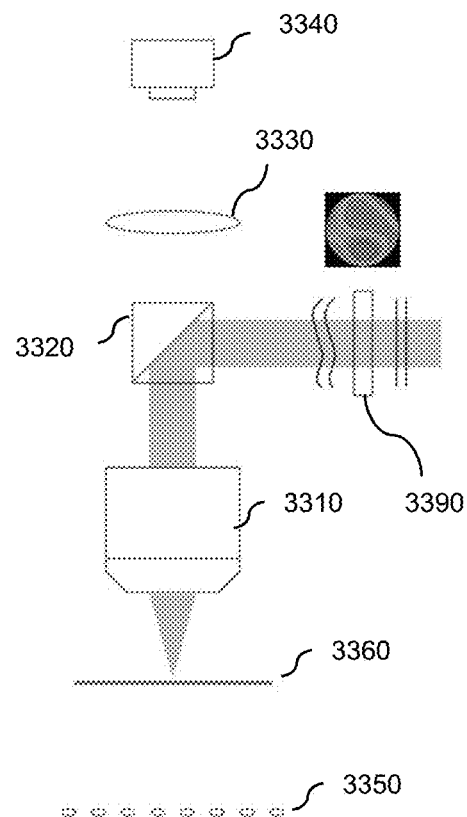
FIG. 33 is a side view of a Fourier ptychographic imaging system that uses adaptive optics to correct for an aberration determined from a pupil function recovered by the EPRY technique, according to an embodiment.

FIGS. 32 and 33 are side views of a Fourier ptychographic imaging system 3330 that includes adaptive optics and employs an operational method that implements the EPRY technique, according to an embodiment. The Fourier ptychographic imaging system 3330 comprises an optical system comprising an objective lens 3310, a beam splitter 3320, and a tube lens 3330. The Fourier ptychographic imaging system 3330 also comprises a radiation detector 3340, for example, a CCD camera. The Fourier ptychographic imaging system 3330 also comprises a variable illuminator 3350, for example, a square LED array having discrete light elements. In this example, the variable illuminator 3350 is a square array of 8×8 light discrete light elements. In addition, the Fourier ptychographic imaging system 3330 comprises a wavefront modulator 3390 configured to modulate an incident wavefront to adaptively correct for the spatially varying aberration in the optical system determined during operation. The beam-splitter 3320 is configured to reflect illumination incident from a 45 degree angle from the wavefront modulator 3390 to the objective lens 3100 and transmits light incident from a 90 degree angle from the objective lens 3310.

In FIG. 32, one of the discrete light elements is illuminated and providing an illumination beam 3352 to a focused spot on the sample plane 3360. During an image acquisition process, a sample being imaged is placed at the sample plane 3360. In FIG. 33, the wavefront modulator 3390 is modulated an incident wavefront.

In a first step of an exemplary operation, the Fourier ptychographic imaging system characterizes the aberration of the objective lens of the optical system. In this first step, the radiation detector 3340 acquires a sequence of images associated with different illumination incidence angles. During a recovery process, the Fourier ptychographic imaging system uses a method implementing the EPRY technique to recover the pupil function of the system and the associated wavefront aberration. In a second step of the exemplary operation, the wavefront aberration information is used to modulate the incident wavefront and generate aberration free, diffraction-limited focused light spot at the sample plane. In this second step, the wavefront aberration information is communicated to the wavefront modulator 3390. The wavefront modulator 3390 uses the wavefront aberration information to modulate the incident plane wave. Because the aberration of the objective lens is compromised by the modulated wave front, an aberration free, diffraction-limited focused light spot can be generated at the sample plane.

In some embodiments, components of a Fourier ptychographic imaging system may be configured to replace existing components or add components to an existing imaging system in order to characterize the aberration of the existing optical system from the pupil function and adaptively correct for its aberration. For example, a square array LED may replace the original light source of an existing microscope system to provide angularly varying illumination. A CCD camera can be mounted to the tube lens to acquire images. A beam splitter and/or wavefront modulator can be added that can adaptively correct for the aberration characterized by the system. Components of a computing device such as a processor may also be added to the system to perform certain process steps.

The schematic of the process is shown in FIGS. 32 and 33. In the first step, a square array LED is used to substitute the original light source of the microscope system to provide angularly varying illumination. A sequence of images is captured following the FPM principle, and EPRY algorithm is implemented to recover the pupil function of the microscope system. In the second step, the wavefront aberration information is sent to the wavefront modulator to modulate the incident plane wave. Some examples of suitable wavefront modulators that can be used include a digital micromirror device, liquid crystal spatial light modulator, and the like. Because the aberration of the objective lens is compromised by the modulated wave front, an aberration free, diffraction-limited focused light spot can be generated at the sample plane.

VI. Subsystems

Figure 34:
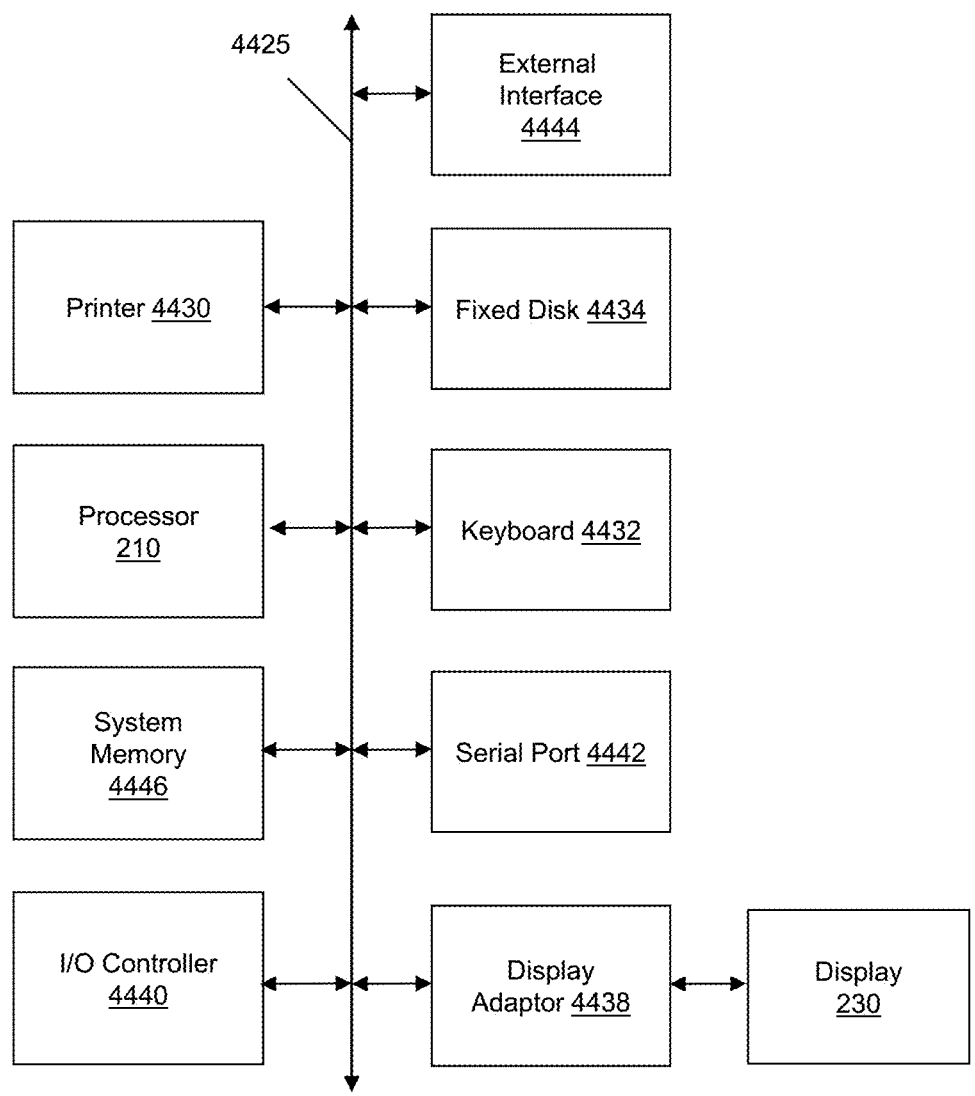
FIG. 34 is a block diagram of subsystems that may be present in a Fourier ptychographic imaging system.

FIG. 34 is a block diagram of subsystems that may be present in certain Fourier ptychographic imaging system described herein. For example, a Fourier ptychographic imaging system may include a processor. The processor may be a component of the Fourier ptychographic imaging system in some cases. The processor may be a component of the radiation detector in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 34. The subsystems shown in FIG. 34 are interconnected via a system bus 4425. Additional subsystems such as a printer 4430, keyboard 4432, fixed disk 4434 (or other memory comprising computer readable media), display 230, which is coupled to display adapter 4438, and others are shown. Peripherals and input/output (I/O) devices, which couple to I/O controller 4440, can be connected by any number of means known in the art, such as serial port 4442. For example, serial port 4442 or external interface 4444 can be used to connect the computing device 200 to a wide area network such as the Internet, a mouse input device, or a scanner. The interconnection via system bus 4425 allows the processor to communicate with each subsystem and to control the execution of instructions from system memory 4446 or the fixed disk 4434, as well as the exchange of information between subsystems. The system memory 4446 and/or the fixed disk 4434 may embody the CRM 220 in some cases. Any of these elements may be present in the previously described features.

In some embodiments, an output device such as the printer 4430 or display 230 of the aperture scanning Fourier ptychographic system can output various forms of data. For example, the aperture scanning Fourier ptychographic system can output 2D color/monochromatic images (intensity and/or phase), data associated with these images, or other data associated with analyses performed by the aperture scanning Fourier ptychographic system.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that certain features of embodiments of the disclosure described above can be implemented in the form of control logic using computer software in a modular or integrated manner. Based on the disclosure and teachings provided herein, a person of ordinary skill in the art will know and appreciate other ways and/or methods to implement certain features using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A method of Fourier ptychographic imaging with embedded pupil function recovery, the method comprising:
   (a) receiving image data for a plurality of intensity images of a sample, the intensity images acquired sequentially by a light detector while the sample is being illuminated at different oblique incidence angles and the light detector is receiving light issuing from the illuminated sample through an optical system having a lens;
   (b) Fourier transforming the image data;
   (c) simultaneously updating a pupil function of the optical system and a sample spectrum, wherein the sample spectrum is updated in overlapping regions with the Fourier-transformed intensity image data, and the overlapping regions correspond to the different oblique illumination angles; and (d) inverse Fourier transforming the updated sample spectrum to determine an image of the sample having a higher resolution than the plurality of intensity images.

2. The method of claim 1, wherein each of the overlapping regions has an area corresponding to the numerical aperture of the lens.

3. The method of claim 2, wherein the lens is an objective lens, wherein the overlapping regions are in the form of circular pupil apertures.

4. The method of claim 3, wherein the numerical aperture of the lens is in a range between about 0.02 and about 0.13.

5. The method of claim 3, wherein the numerical aperture of the lens is about 0.08.

6. The method of claim 2, further comprising calculating an aberration in the optical system using the updated pupil function.

7. The method of claim 6, further comprising adaptively correcting an incident wavefront based on the calculated aberration.

8. The method of claim 6, further comprising determining a substantially aberration-free image of the sample using the calculated aberration.

9. The method of claim 6, further comprising re-focusing the sample using the calculated aberration.

10. The method of claim 2, wherein adjacent overlapping regions overlap in area by between 20% and 90%.

11. The method of claim 1, repeating (c) until the updated sample spectrum is self-consistent.

12. A method of Fourier ptychographic imaging with embedded pupil function recovery, the method comprising:
receiving image data for a plurality of intensity images of a sample, the intensity images acquired sequentially by a light detector while the sample is being illuminated at different oblique incidence angles and the light detector is receiving light issuing from the illuminated sample through an optical system having a lens;
Fourier transforming the image data;
simultaneously updating a pupil function of the optical system and a sample spectrum, wherein the sample spectrum is updated in overlapping regions with the Fourier-transformed intensity image data, and the overlapping regions correspond to the different oblique illumination angles; and
calculating an aberration in the optical system using the updated pupil function.

13. The method of claim 12, further comprising decomposing a phase component of the updated pupil function into coefficients of Zernike polynomials.

14. The method of claim 13, further comprising determining wavefront aberration based on coefficients of lower order modes of Zernike polynomials.

15. The method of claim 13, further comprising determining wavefront aberration based on coefficients of or one or more of a mode associated with defocus aberration, a mode associated with a stigmatism in the x-direction, and a mode associated with a stigmatism in one or two directions.

16. The method of claim 13, further comprising determining coma aberration based on coefficients of one or more modes of Zernike polynomials.

17. The method of claim 12, further comprising adaptively correcting an incident wavefront based on the calculated aberration.

18. The method of claim 12, further comprising inverse Fourier transforming the updated sample spectrum to determine an image of the sample having a higher resolution than the plurality of intensity images.

19. The method of claim 18, further comprising determining a substantially aberration-free image of the sample using the calculated aberration.

20. The method of claim 18, further comprising: decomposing a phase component of the updated pupil function to determine a coefficient of a mode associated with defocus aberration; calculating defocus aberration from the coefficient; and re-focusing the higher resolution image of the sample using the calculated defocus aberration.

21. A Fourier ptychographic imaging system employing embedded pupil function recovery, comprising: a variable illuminator configured to illuminate a sample being imaged at a plurality of oblique illumination angles; an optical system having an objective lens configured to collect light issuing from the illuminated sample; a radiation detector configured to receive light issuing from the illuminated sample and transmitted by the optical system, and configured to acquire a plurality of intensity images based on the light received; a processor configured to: simultaneously update a pupil function and a separate sample spectrum, wherein the sample spectrum is updated in overlapping regions with the Fourier-transformed intensity image data, and the overlapping regions correspond to the different oblique illumination angles; and calculate an aberration in the optical system using the updated pupil function.

22. The Fourier ptychographic imaging system of claim 20, further comprising a wavefront modulator configured to adaptively correct an incident wavefront based on the calculated aberration.

23. The Fourier ptychographic imaging system of claim 20, wherein the objective lens has a numerical aperture between about 0.02 and 0.13.

24. The Fourier ptychographic imaging system of claim 20, wherein the objective lens has a numerical aperture numerical aperture of about 0.08.

25. The Fourier ptychographic imaging system of claim 20, wherein the variable illuminator comprises a circular array of discrete light elements.

26. The Fourier ptychographic imaging system of claim 20, wherein the processor is further configured to decompose a phase component of the updated pupil function into coefficients of Zernike polynomials.

27. The Fourier ptychographic imaging system of claim 25, wherein the processor is further configured to determine wavefront aberration based on coefficients of or one or more of a mode associated with defocus aberration, a mode associated with a stigmatism in the x- direction, and a mode associated with a stigmatism in one or two directions.

28. The Fourier ptychographic imaging system of claim 25, wherein the processor is further configured to determine coma aberration based on coefficients of one or more modes of Zernike polynomials.

29. The Fourier ptychographic imaging system of claim 27, wherein the processor is further configured to determine coma aberration based on coefficients of one or more modes of Zernike polynomials.

30. The Fourier ptychographic imaging system of claim 20, wherein the processor is further configured to inverse transform the updated sample spectrum to determine an image of the sample, wherein the image has a higher resolution than the captured intensity images.

31. The Fourier ptychographic imaging system of claim 27, wherein the processor is further configured to determine a substantially aberration-free image of the sample using the calculated aberration.

32. The Fourier ptychographic imaging system of claim 27, wherein the processor is further configured to:

decompose a phase component of the updated pupil function to determine a coefficient of a mode associated with defocus aberration;

calculate defocus aberration from the coefficient; and re-focus the higher resolution image of the sample using the calculated defocus aberration.

33. A method of Fourier ptychographic imaging with embedded pupil function recovery, the method comprising:

providing plane wave illumination at a plurality of oblique incidence angles to a sample being imaged;

collecting light issuing from the sample using an optical system having a lens;

acquiring a plurality of intensity images of the sample using a radiation detector;

simultaneously updating a pupil function of the optical system and a separate sample spectrum, wherein the sample spectrum is updated in overlapping regions with Fourier transformed intensity image data, wherein the overlapping regions corresponds to the plurality of oblique incidence angles; and inverse Fourier transforming the recovered sample spectrum to recover an image with a higher resolution than the acquired intensity images.

34. The method of claim 33, further comprising determining an aberration from the updated pupil function.

35. The method of claim 34, further comprising adaptively correcting for the determined aberration using a wavefront modulator.

36. The method of claim 34, wherein the overlapping regions overlap by between 20% and 90% in area.

* * * * *